United States Patent
Fehr

(10) Patent No.: US 11,944,041 B2
(45) Date of Patent: Apr. 2, 2024

(54) APPARATUSES AND METHODS FOR DRYING HAY BALES

(71) Applicant: Travis M. Fehr, Morden (CA)

(72) Inventor: Travis M. Fehr, Morden (CA)

( * ) Notice: Subject to any disclaimer, the term of this patent is extended or adjusted under 35 U.S.C. 154(b) by 251 days.

(21) Appl. No.: 17/205,156

(22) Filed: Mar. 18, 2021

(65) Prior Publication Data

US 2021/0298239 A1 Sep. 30, 2021

(30) Foreign Application Priority Data

Mar. 24, 2020 (CA) .................... CA 3076779

(51) Int. Cl.
*A01F 25/12* (2006.01)
*A01D 87/12* (2006.01)
*F26B 3/06* (2006.01)
*F26B 9/10* (2006.01)
*F26B 21/00* (2006.01)
*F26B 25/02* (2006.01)

(52) U.S. Cl.
CPC ............ *A01F 25/12* (2013.01); *A01D 87/127* (2013.01); *F26B 3/06* (2013.01); *F26B 9/10* (2013.01); *F26B 21/00* (2013.01); *F26B 21/004* (2013.01); *F26B 25/02* (2013.01); *F26B 2200/02* (2013.01); *F26B 2200/10* (2013.01); *Y02A 40/51* (2018.01)

(58) Field of Classification Search
CPC ......... A01F 25/12; A01D 87/127; F26B 3/06; F26B 9/10; F26B 21/00; F26B 21/004; F26B 25/02; F26B 2200/02; F26B 2200/10; Y02A 40/51
USPC ............................................. 34/487
See application file for complete search history.

(56) References Cited

U.S. PATENT DOCUMENTS

| 3,375,940 | A | * | 4/1968 | Thompson | ........... | A01D 85/005 |
| | | | | | | 414/794 |
| 3,724,684 | A | * | 4/1973 | Butler | .................... | A01D 90/08 |
| | | | | | | 414/789.3 |
| 3,820,197 | A | * | 6/1974 | Jeanmaire | ................ | D01G 7/08 |
| | | | | | | 19/80 A |
| 11,582,916 | B1 | * | 2/2023 | Peer | ........................ | A01F 29/01 |
| 2019/0024973 | A1 | * | 1/2019 | Martin | .................... | F26B 9/106 |

* cited by examiner

*Primary Examiner* — John P McCormack
(74) *Attorney, Agent, or Firm* — Kyle R Satterthwaite; Ryan W Dupuis; Ade & Company Inc.

(57) ABSTRACT

A hay bale dryer features a support frame inside of which there is delimited at least one bale space and at least one manifold carrying a set of aeration spears movable between a deployed position penetrating the bale space and a retracted position withdrawn therefrom. The manifold is moved between the positions by way of an actuator driven linkage, and the aeration spears comprise hollow elongated bodies of tapered thickness toward their distal ends for more effective penetration of the hay bales. A manufacturing method uses a hydraulic press to produce the hollow elongated bodies from lengths of originally cylindrically pipe. Horizontal feeding tables and upright feeding racks feature displaceable bale movers for moving queued hay bales along one or more queuing lanes into one or more bale dryers.

20 Claims, 37 Drawing Sheets

SECTION C-C

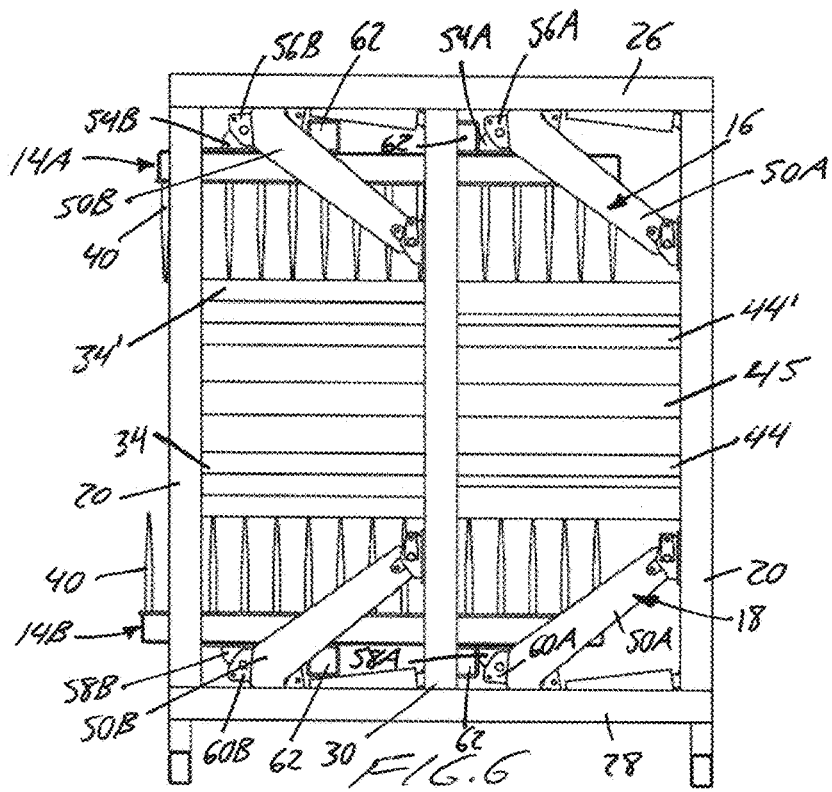
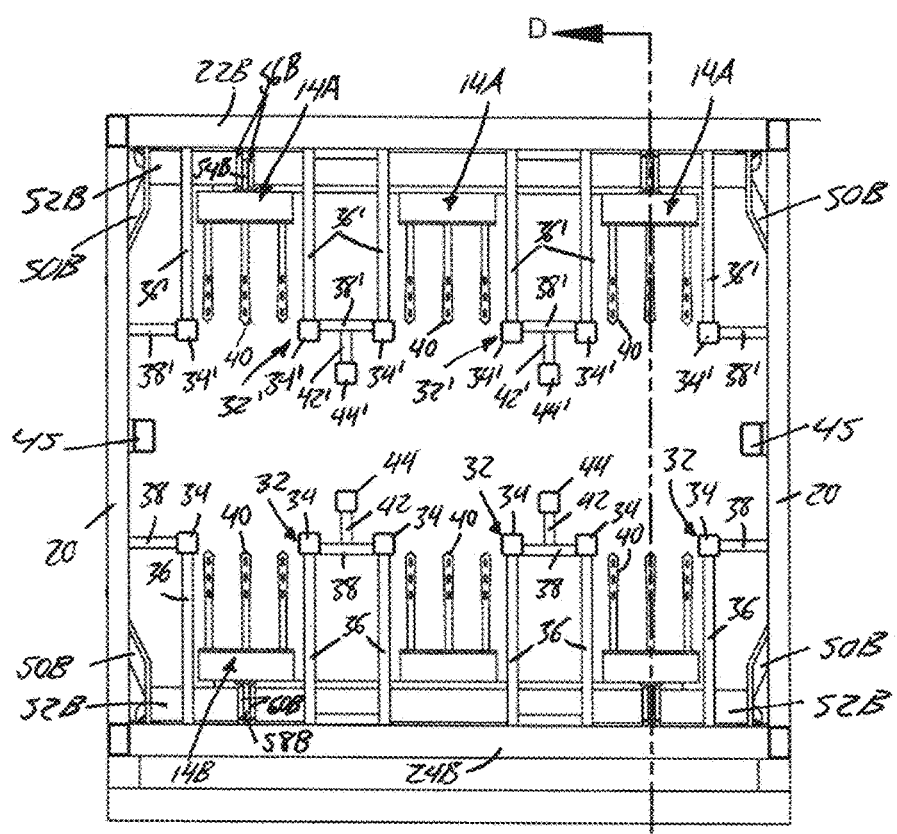

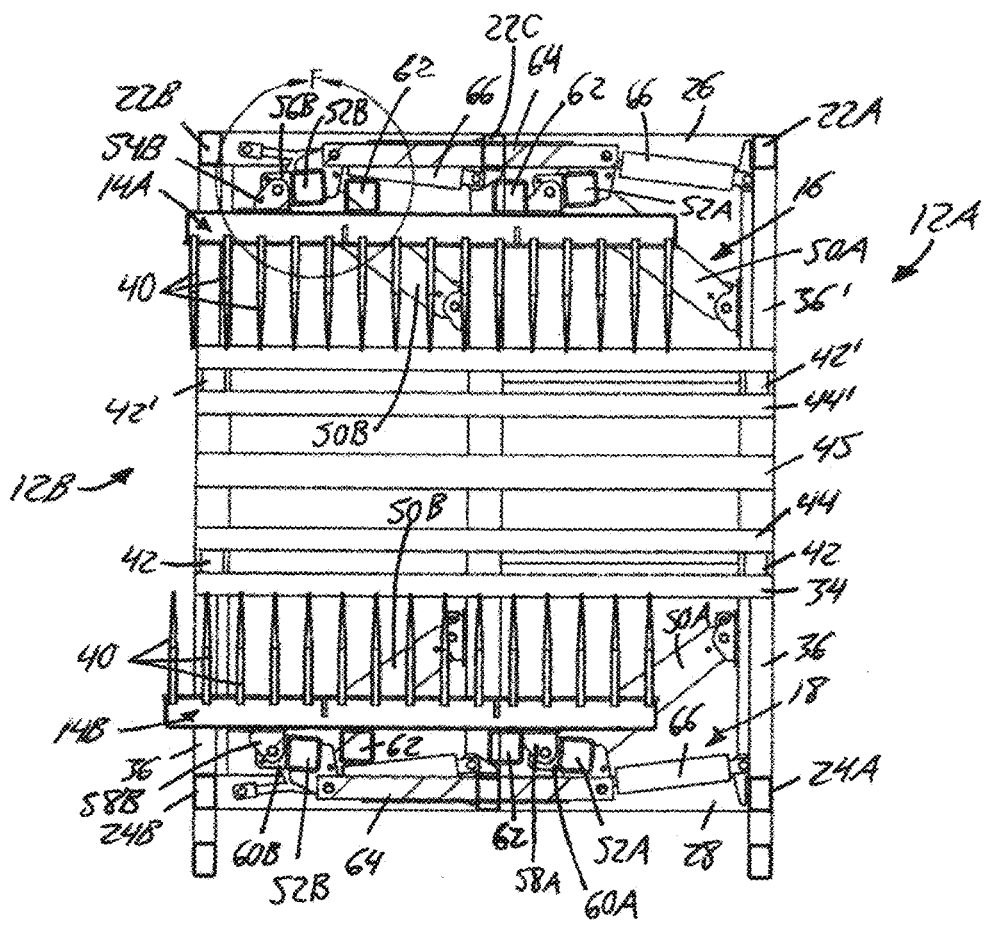
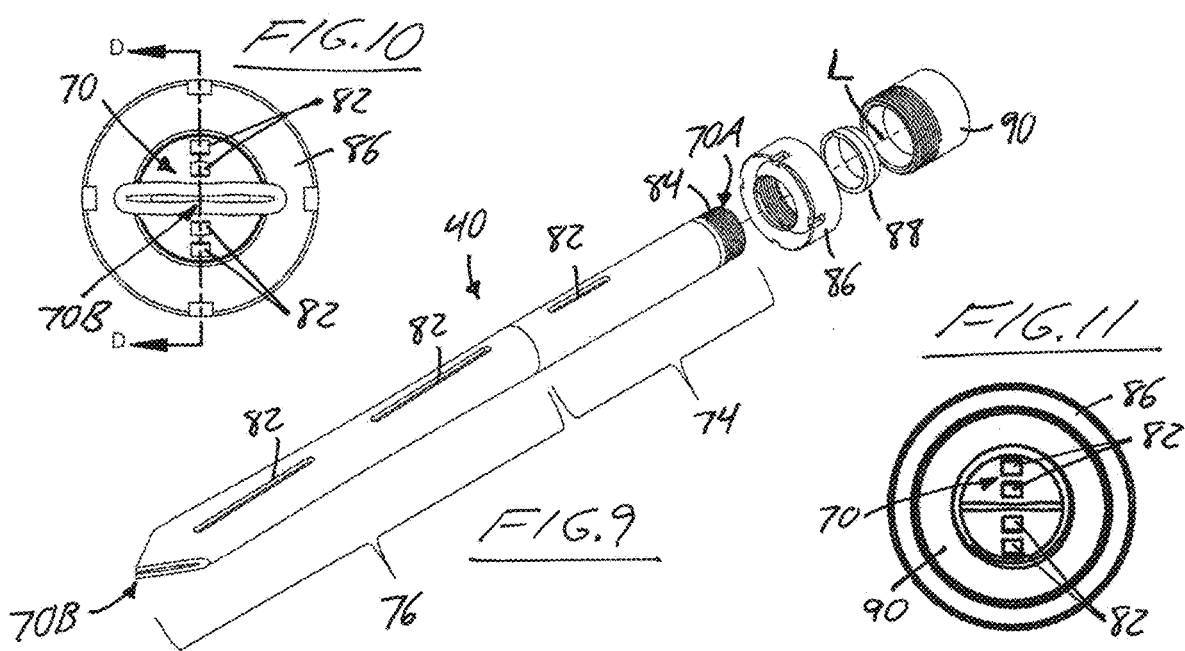

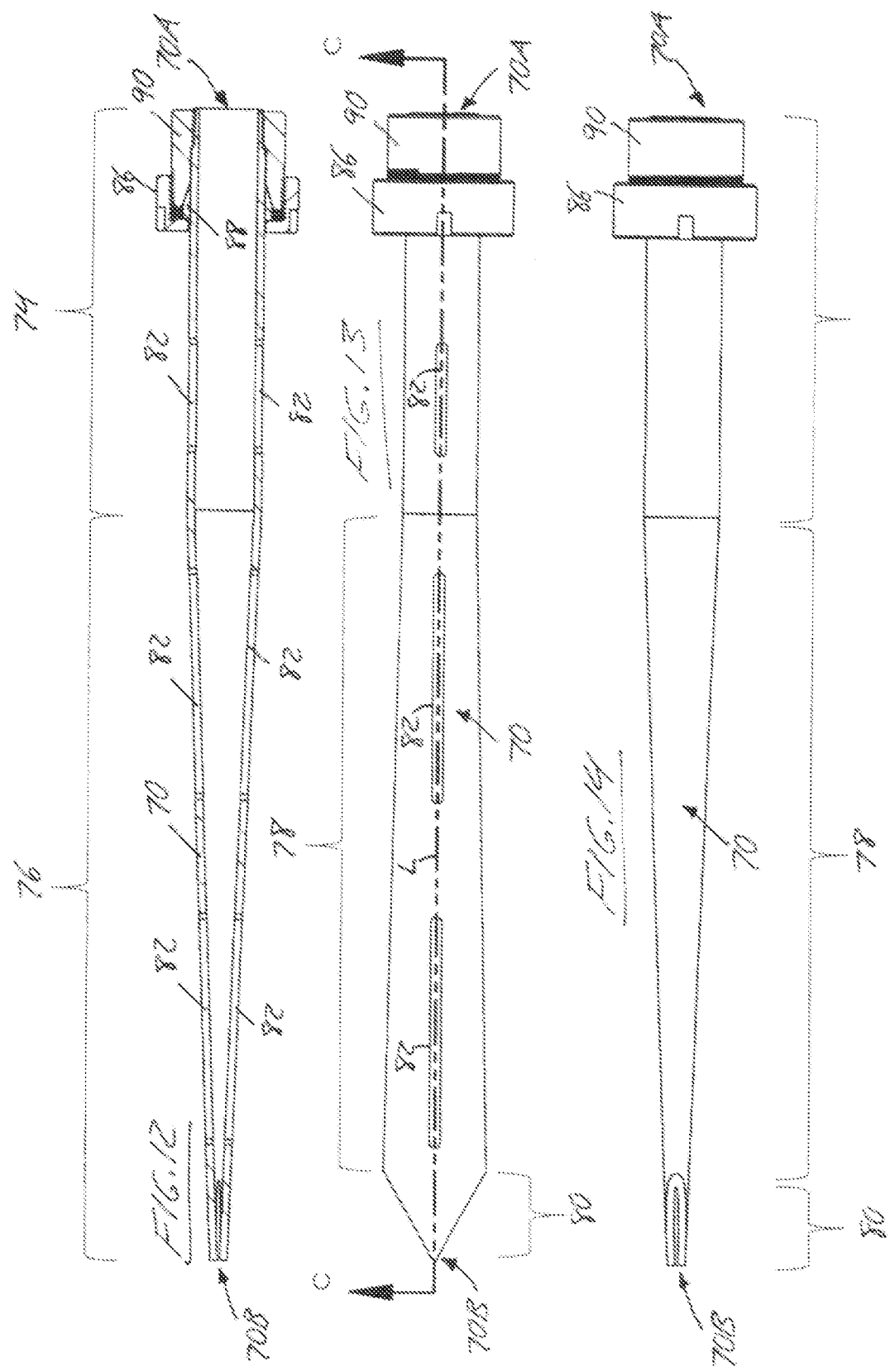

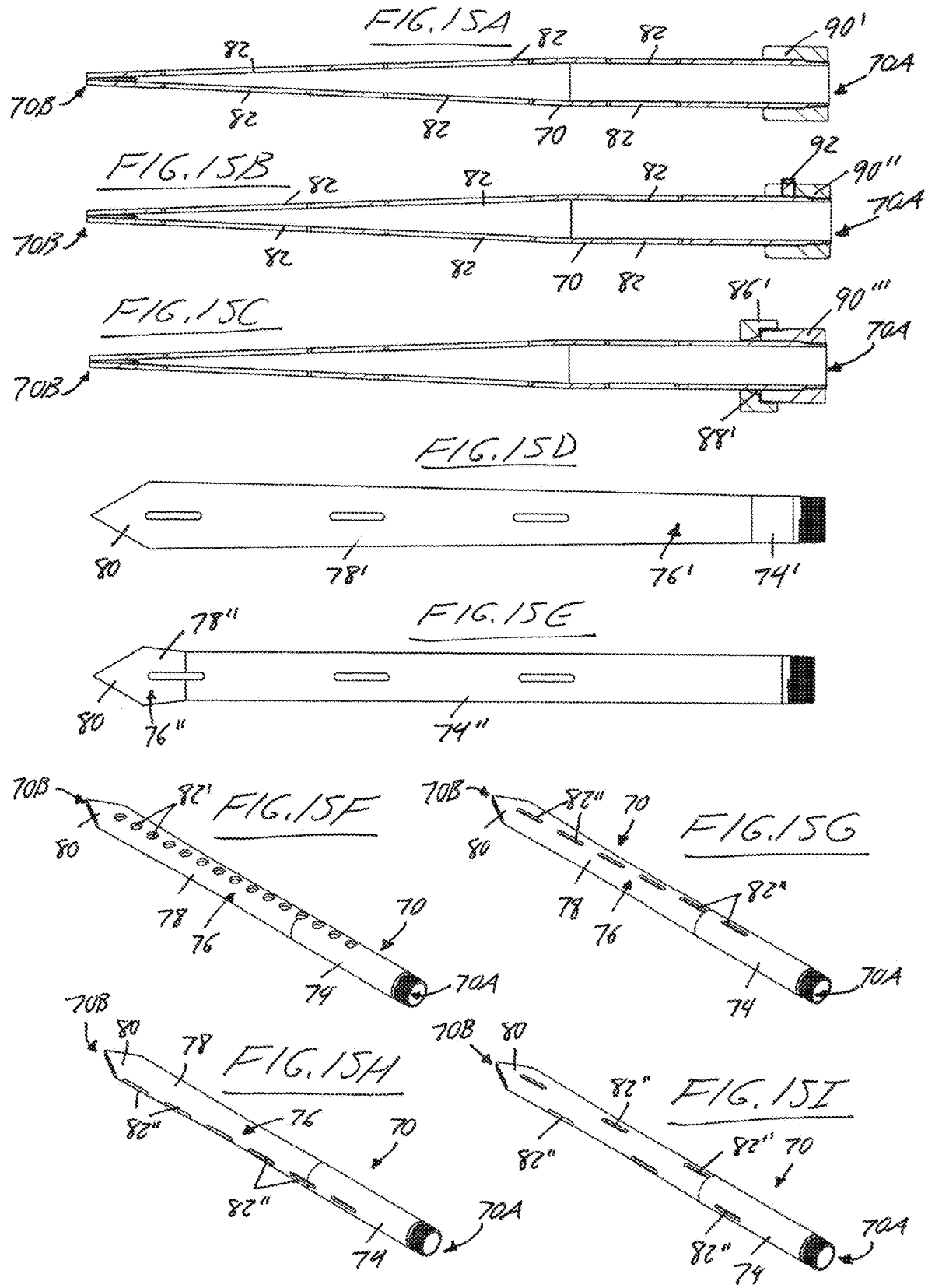

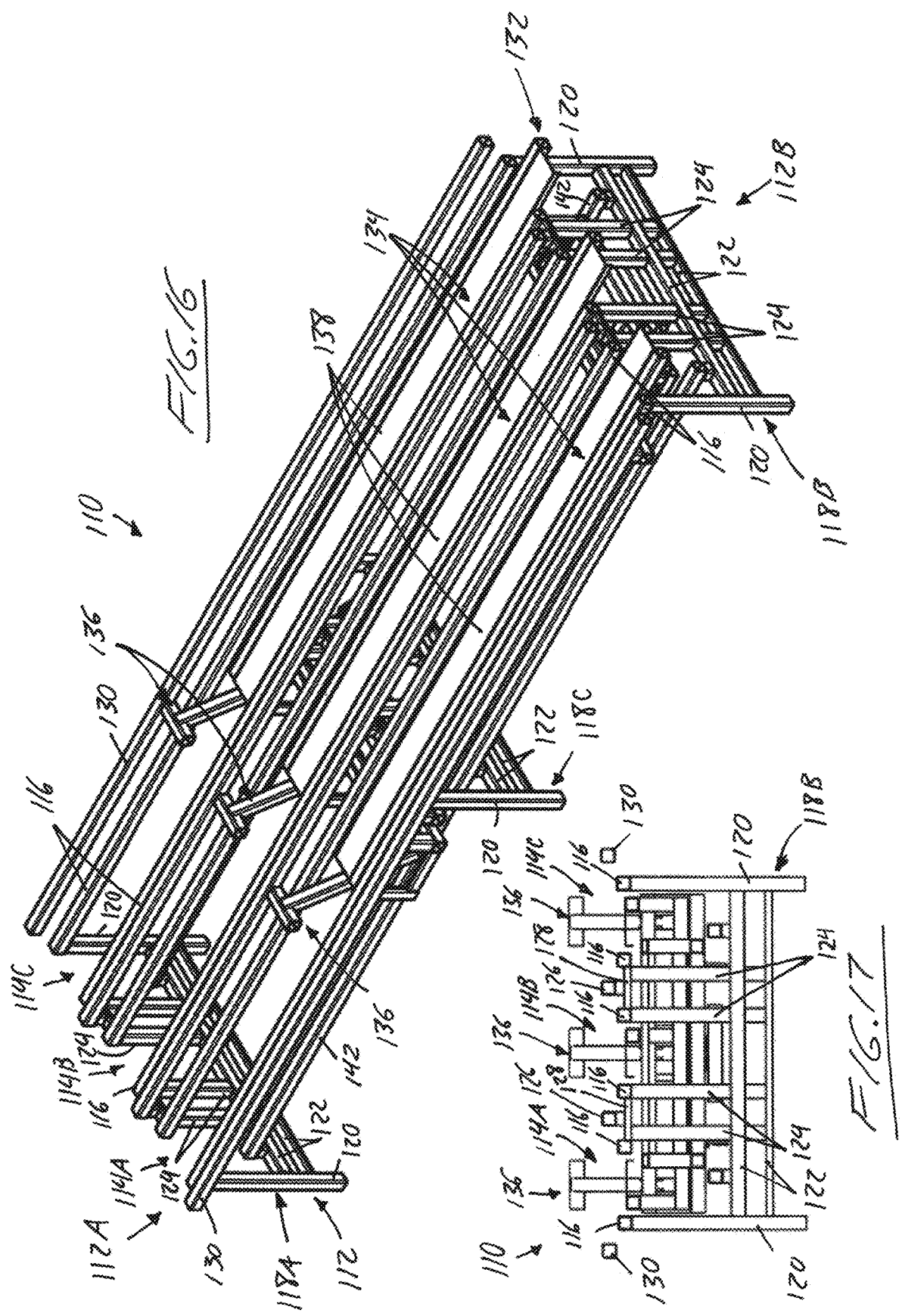

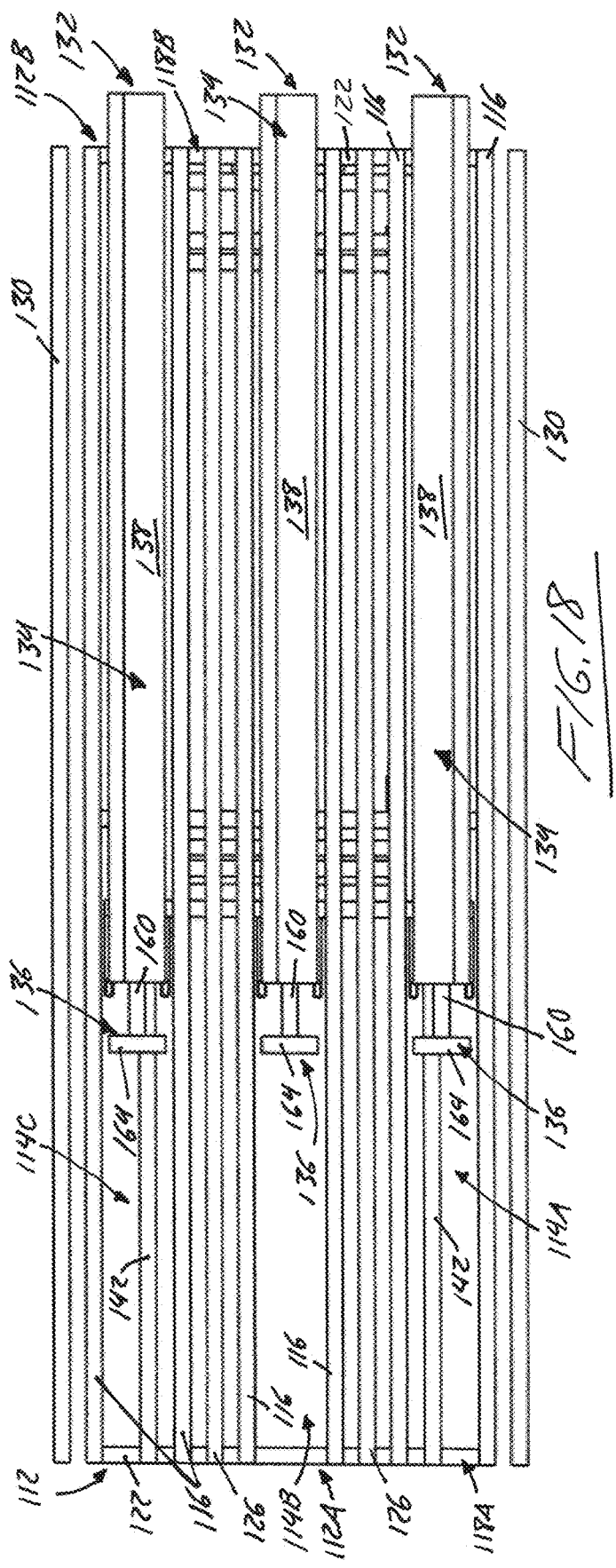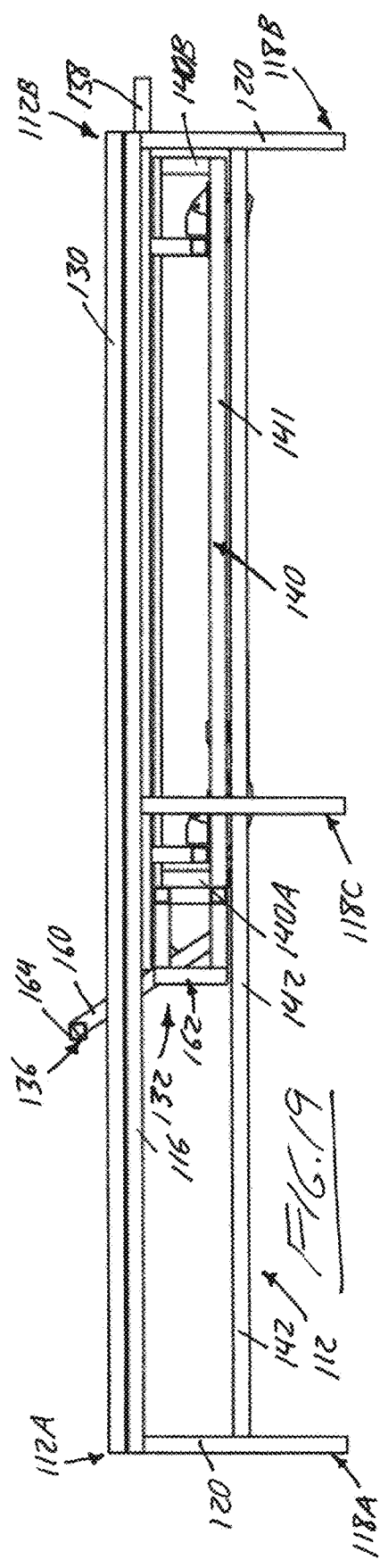

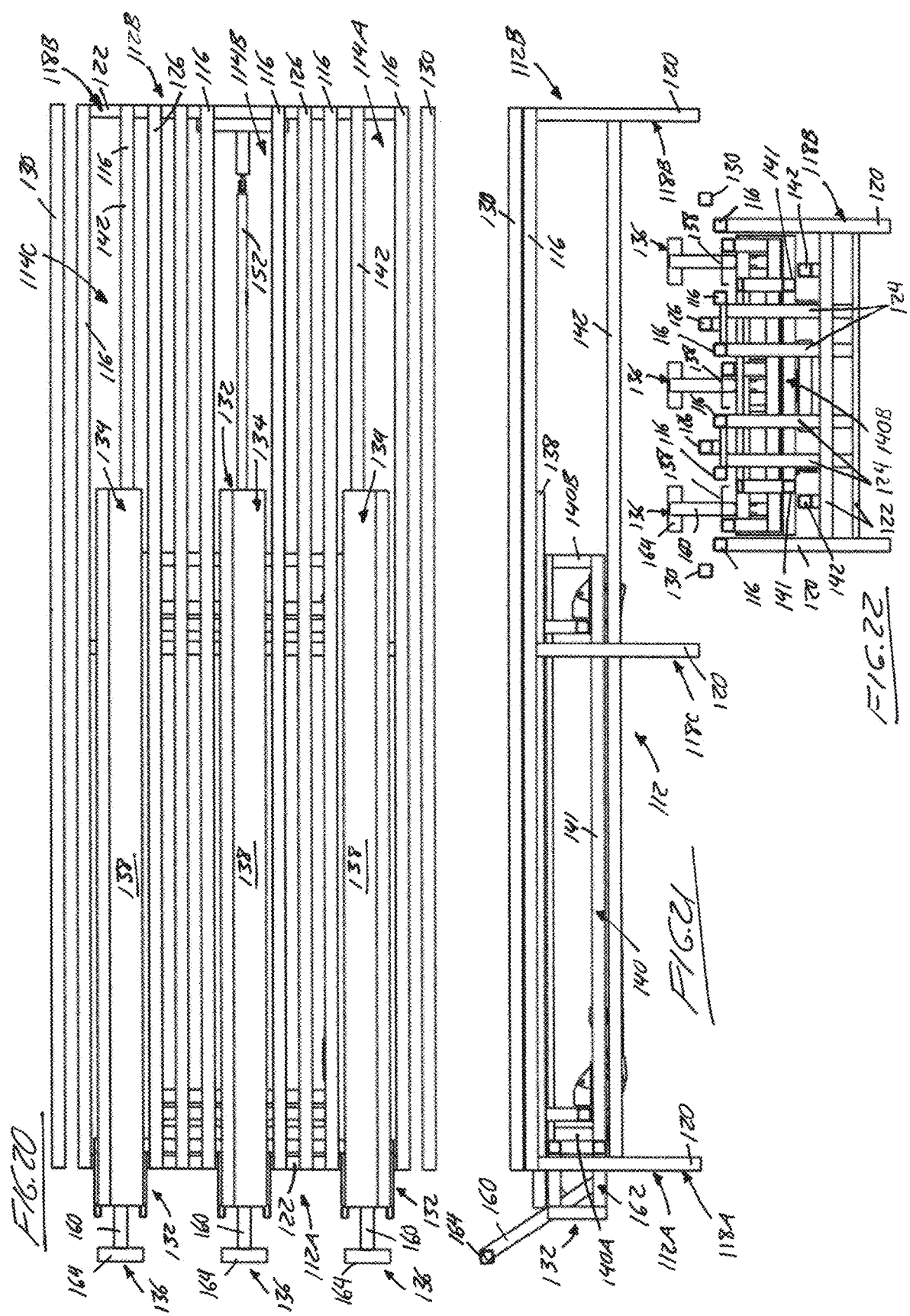

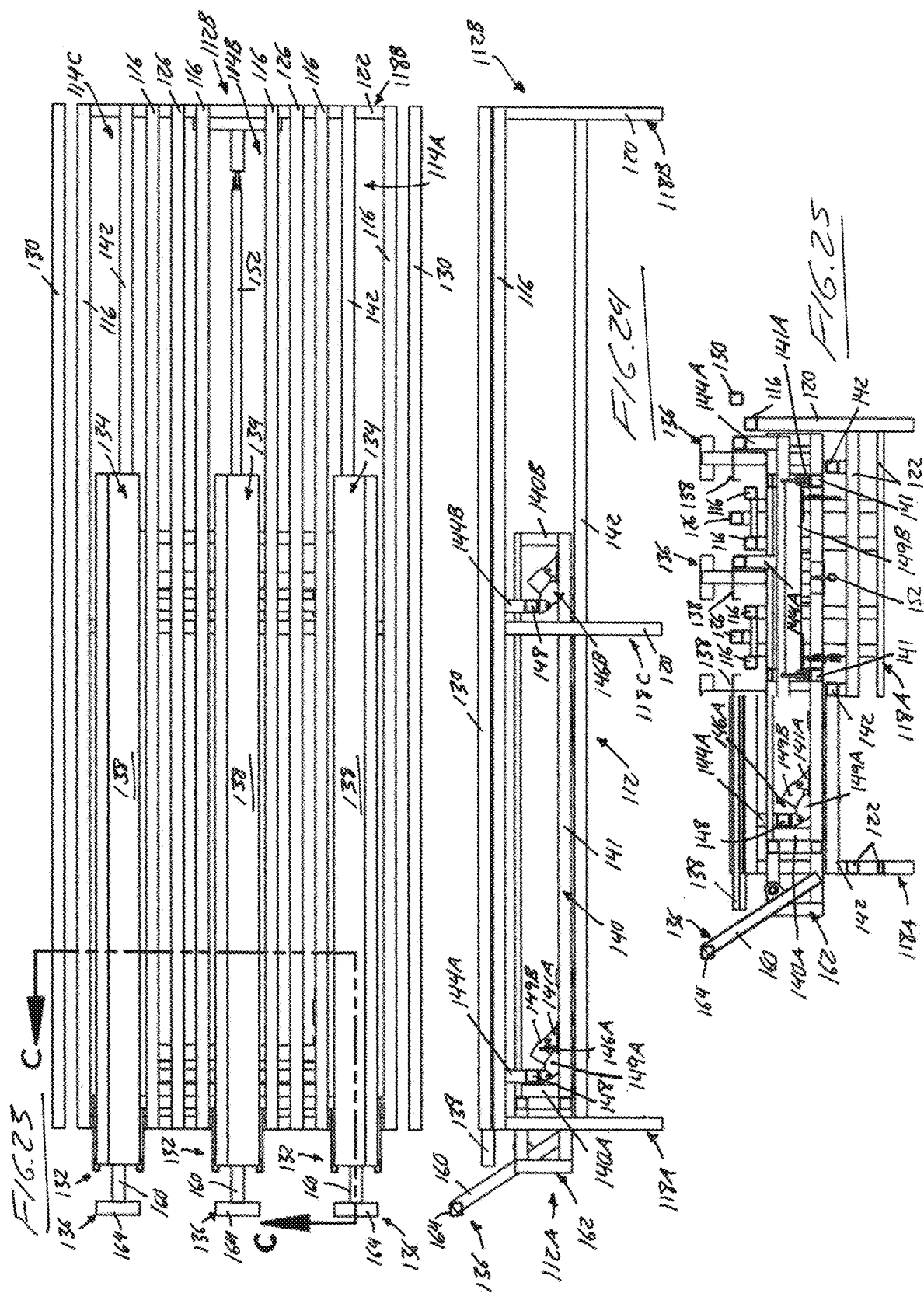

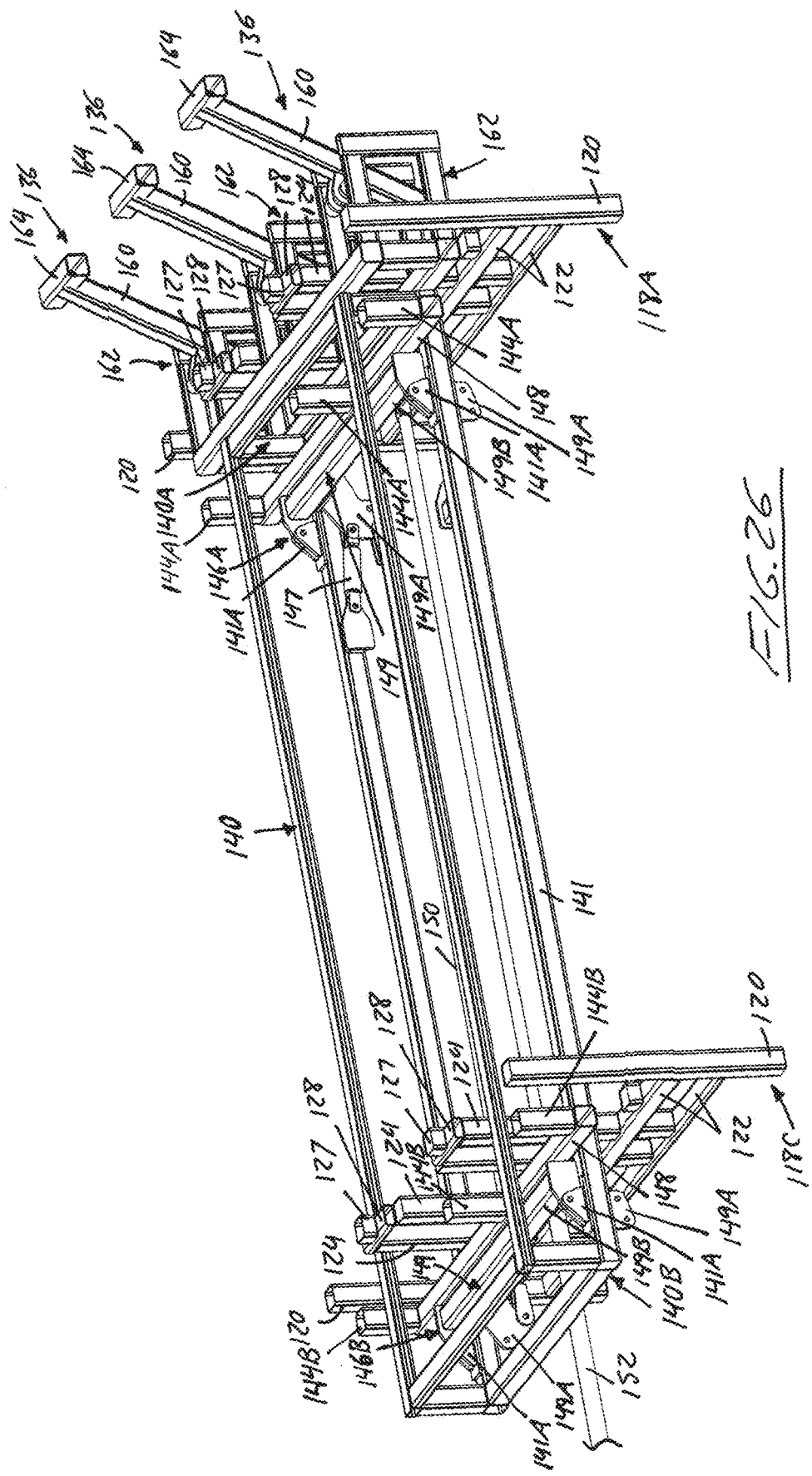

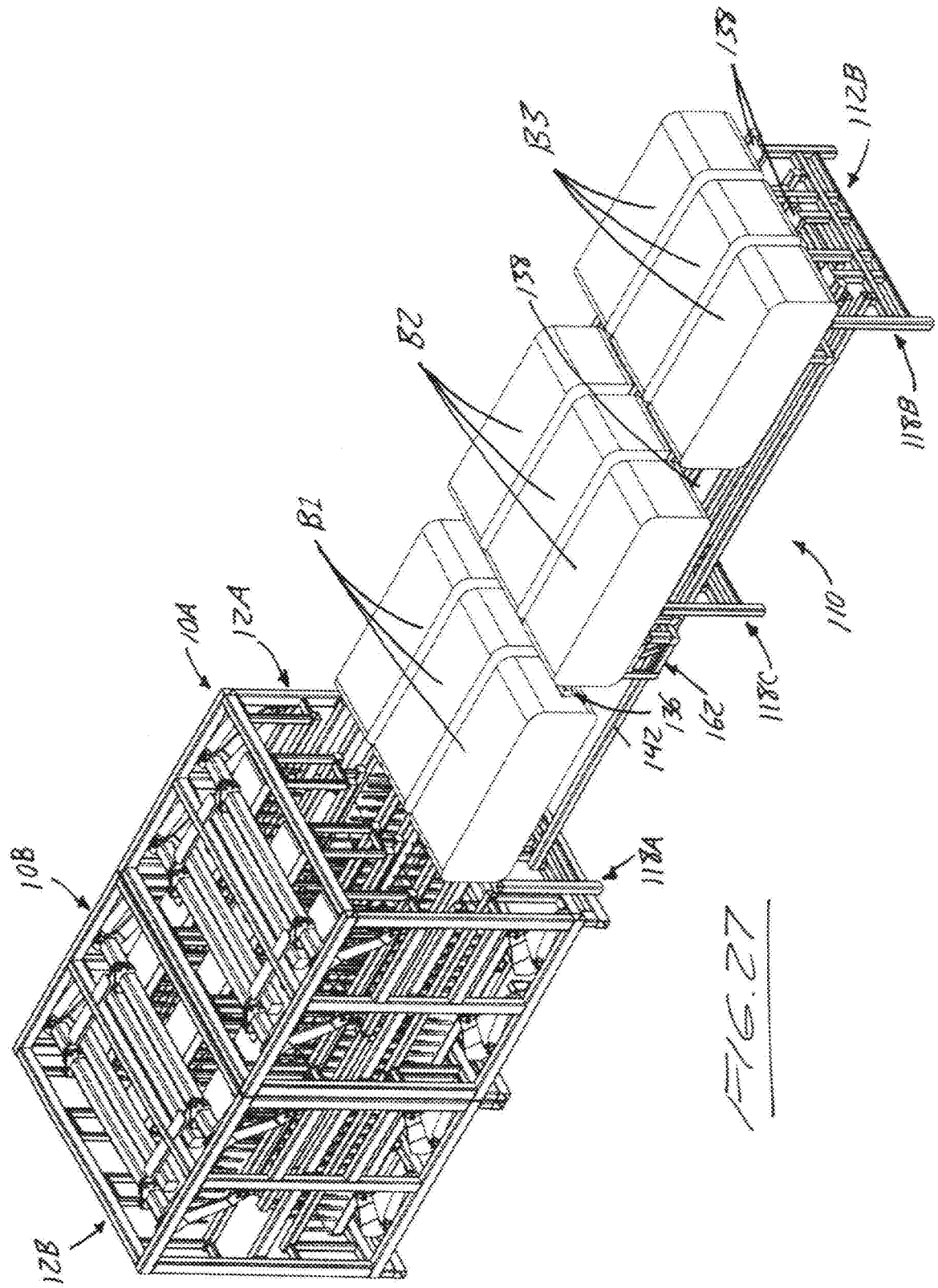

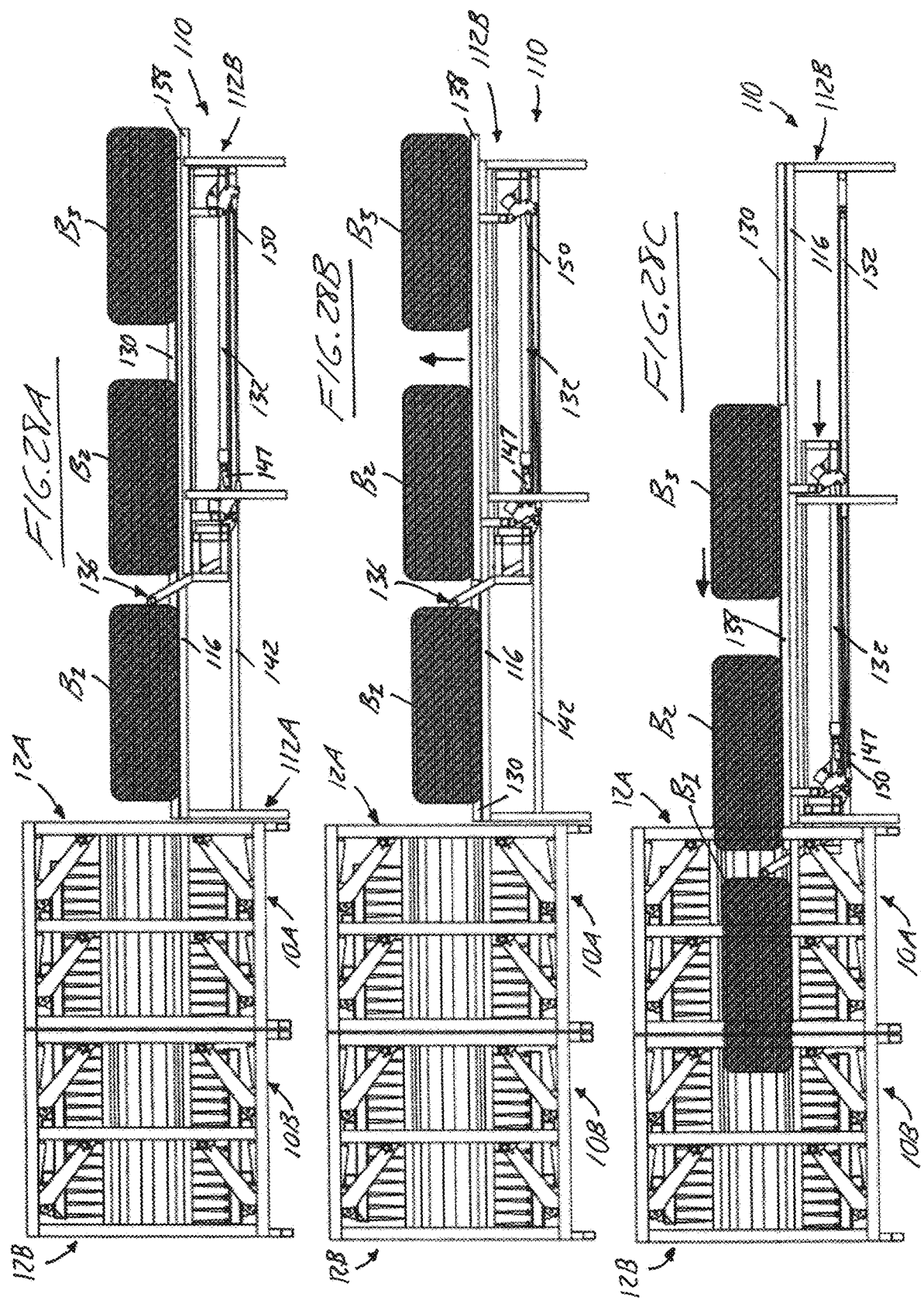

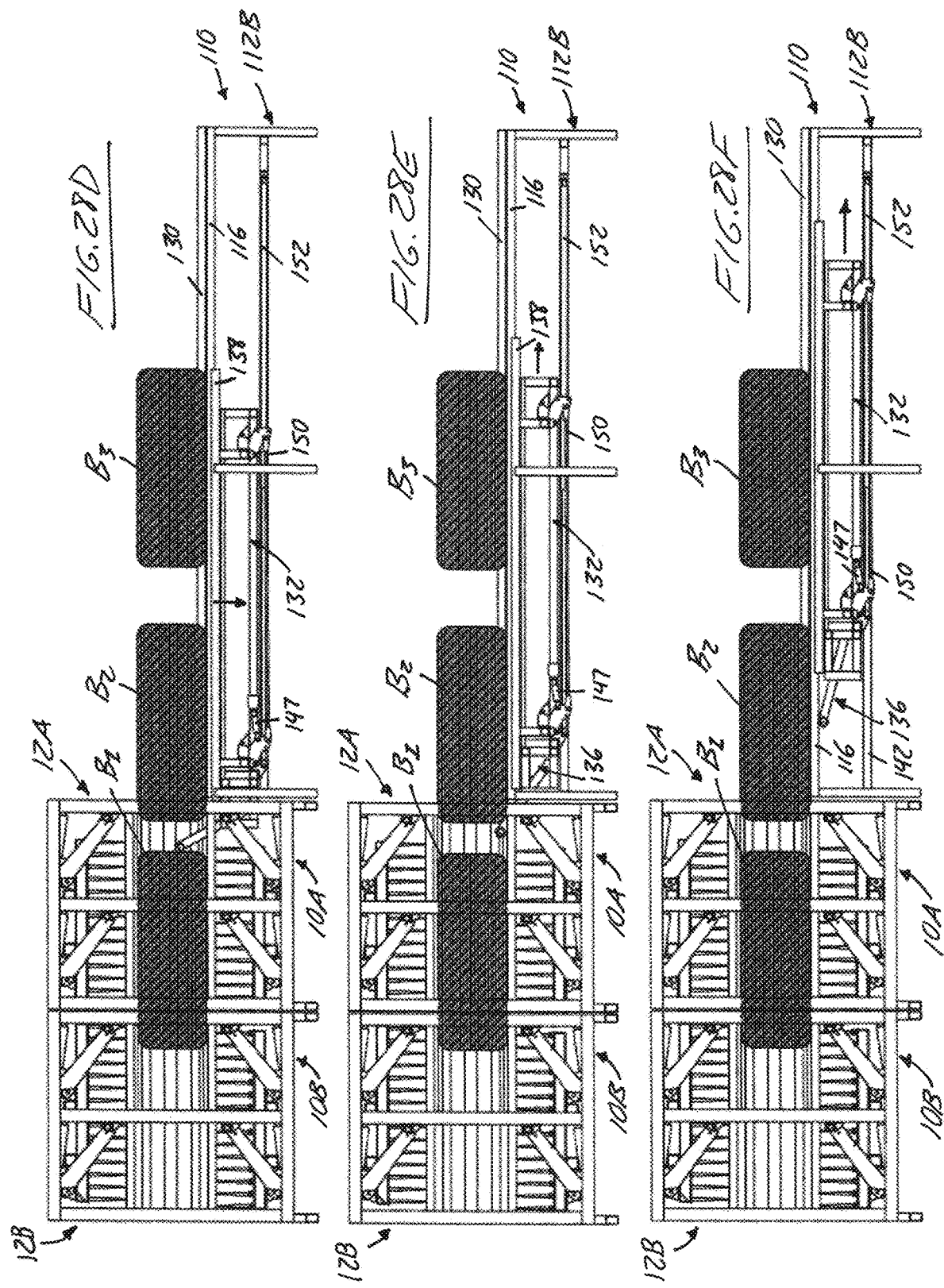

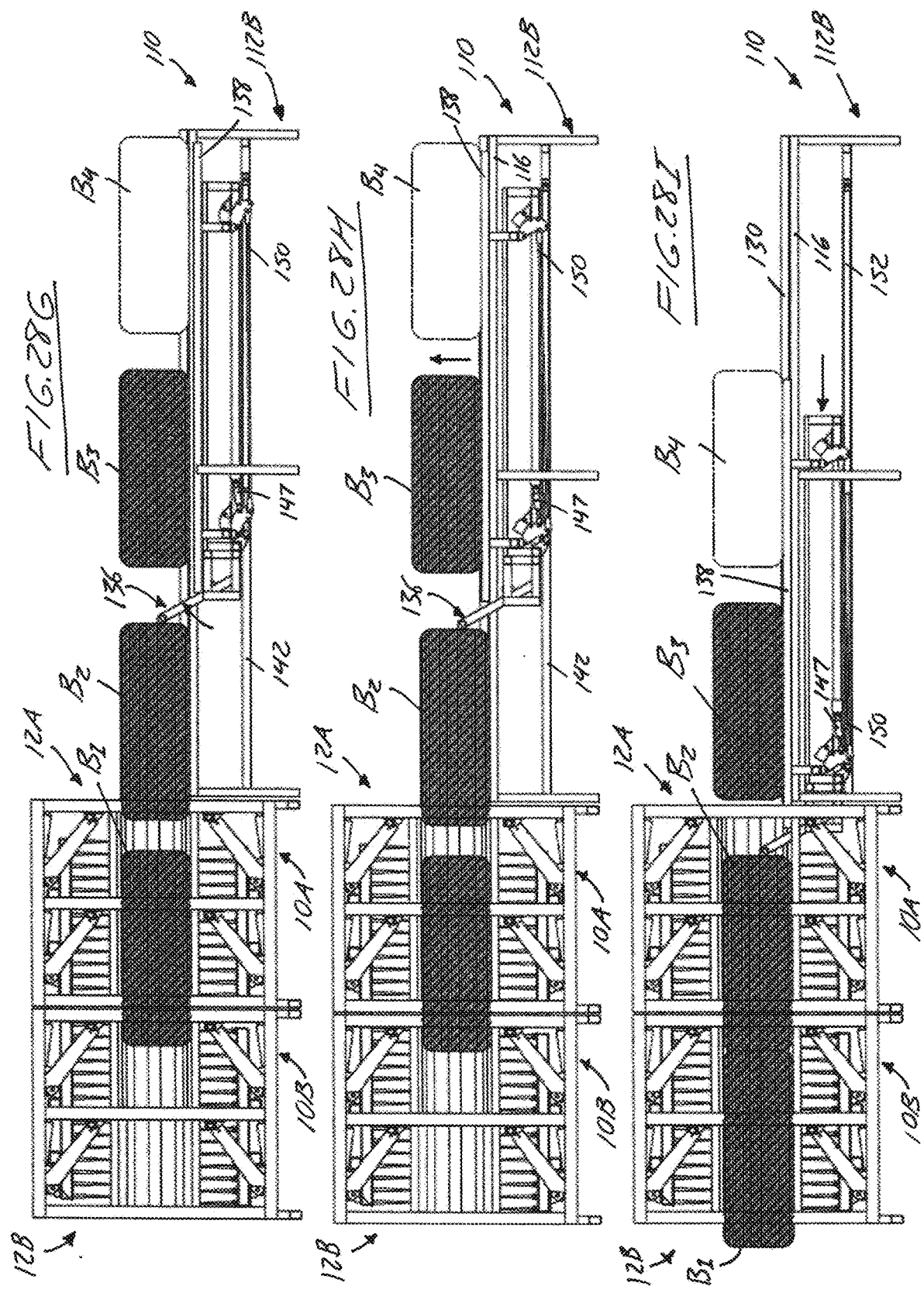

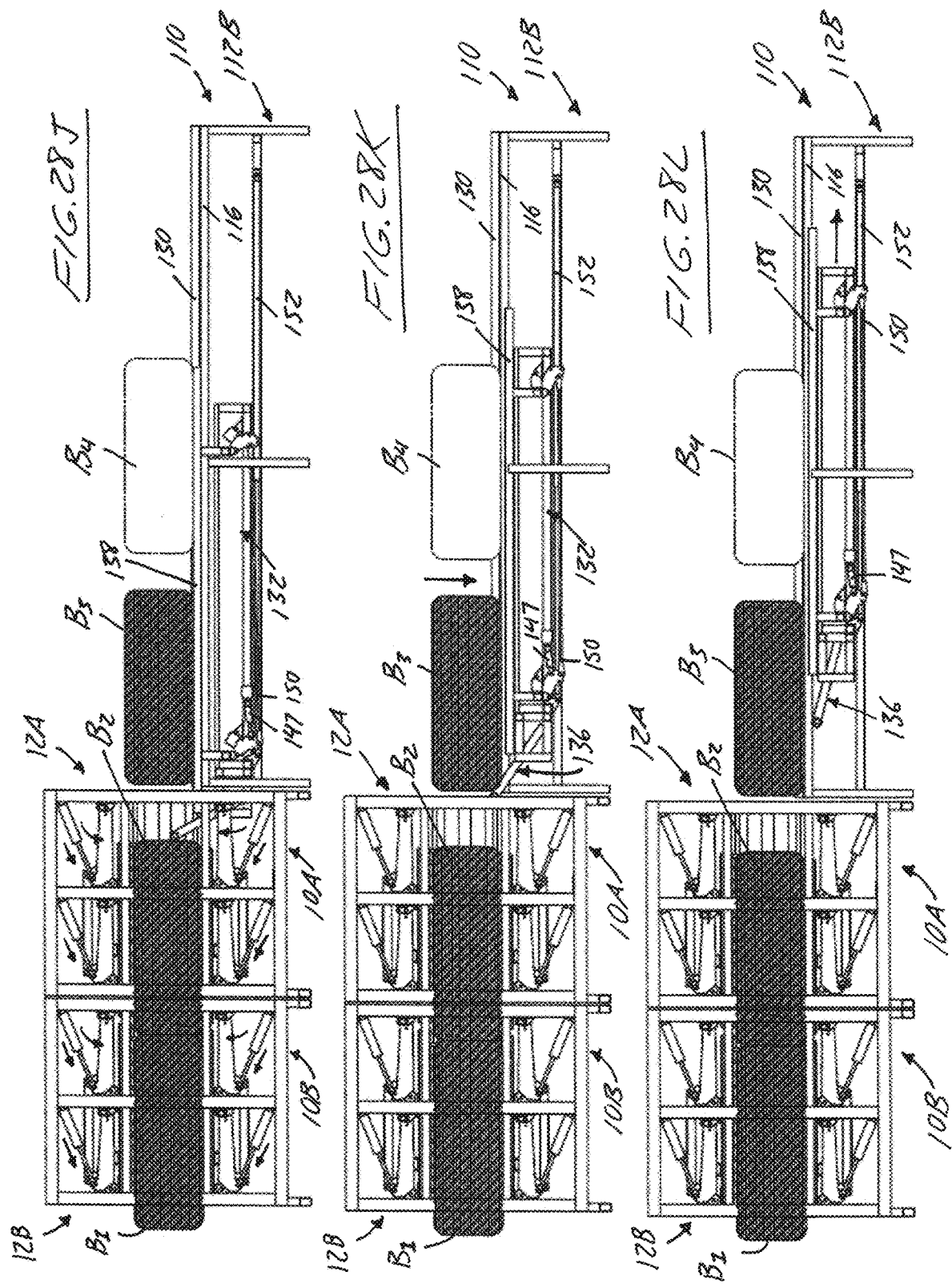

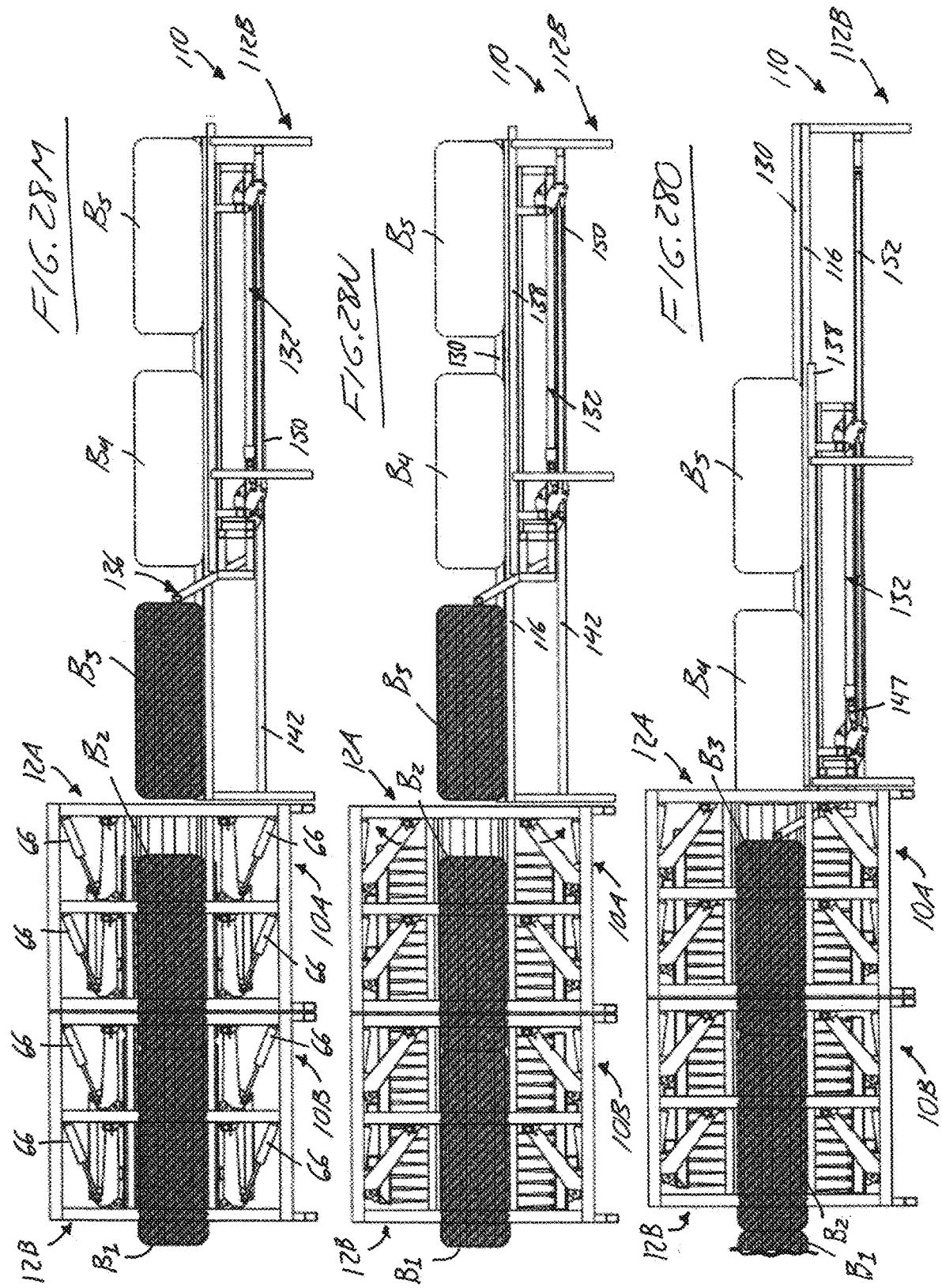

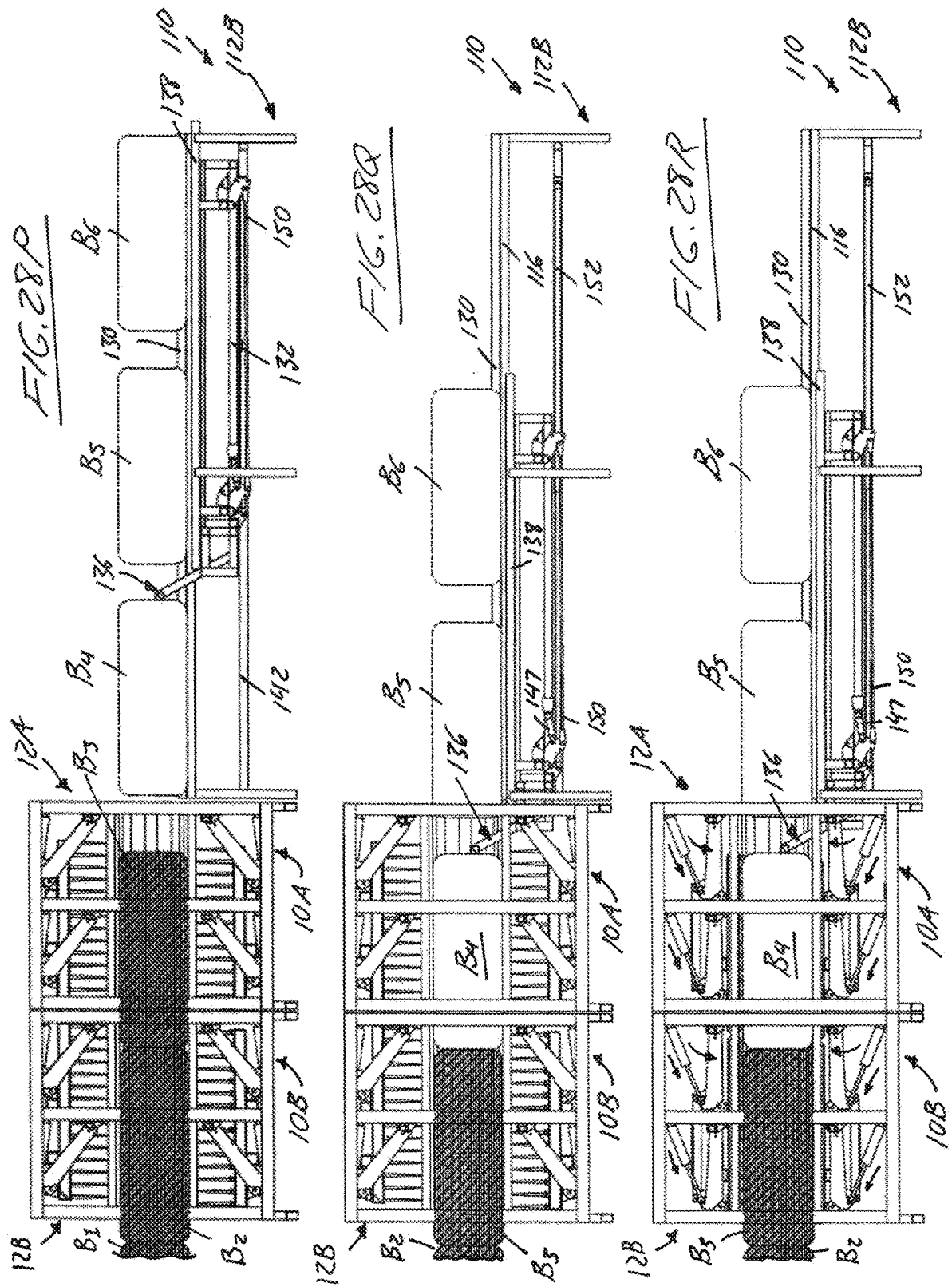

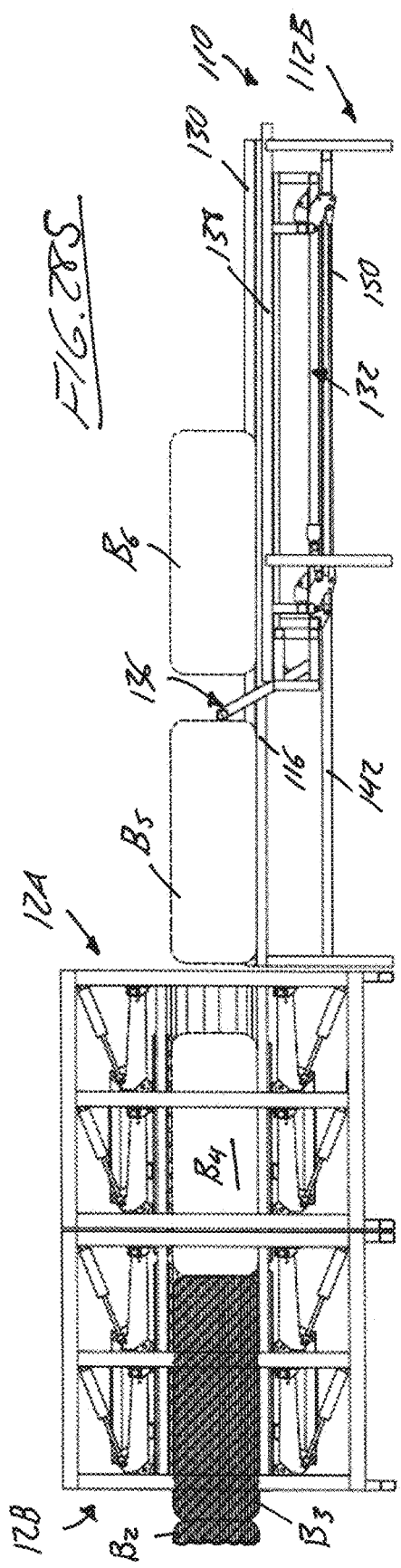

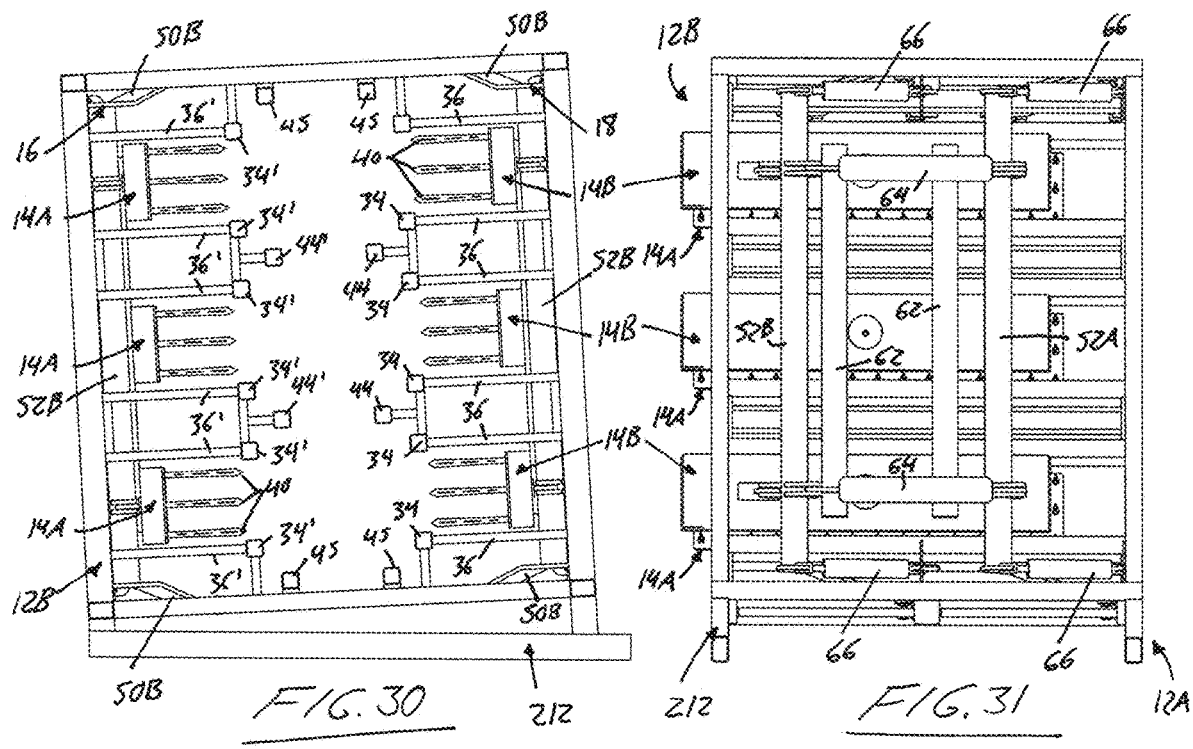
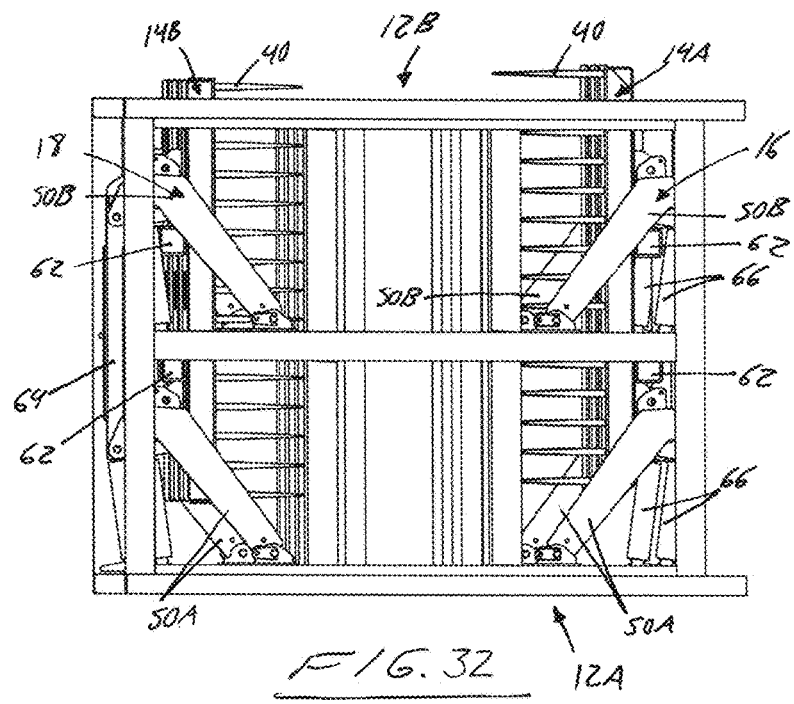

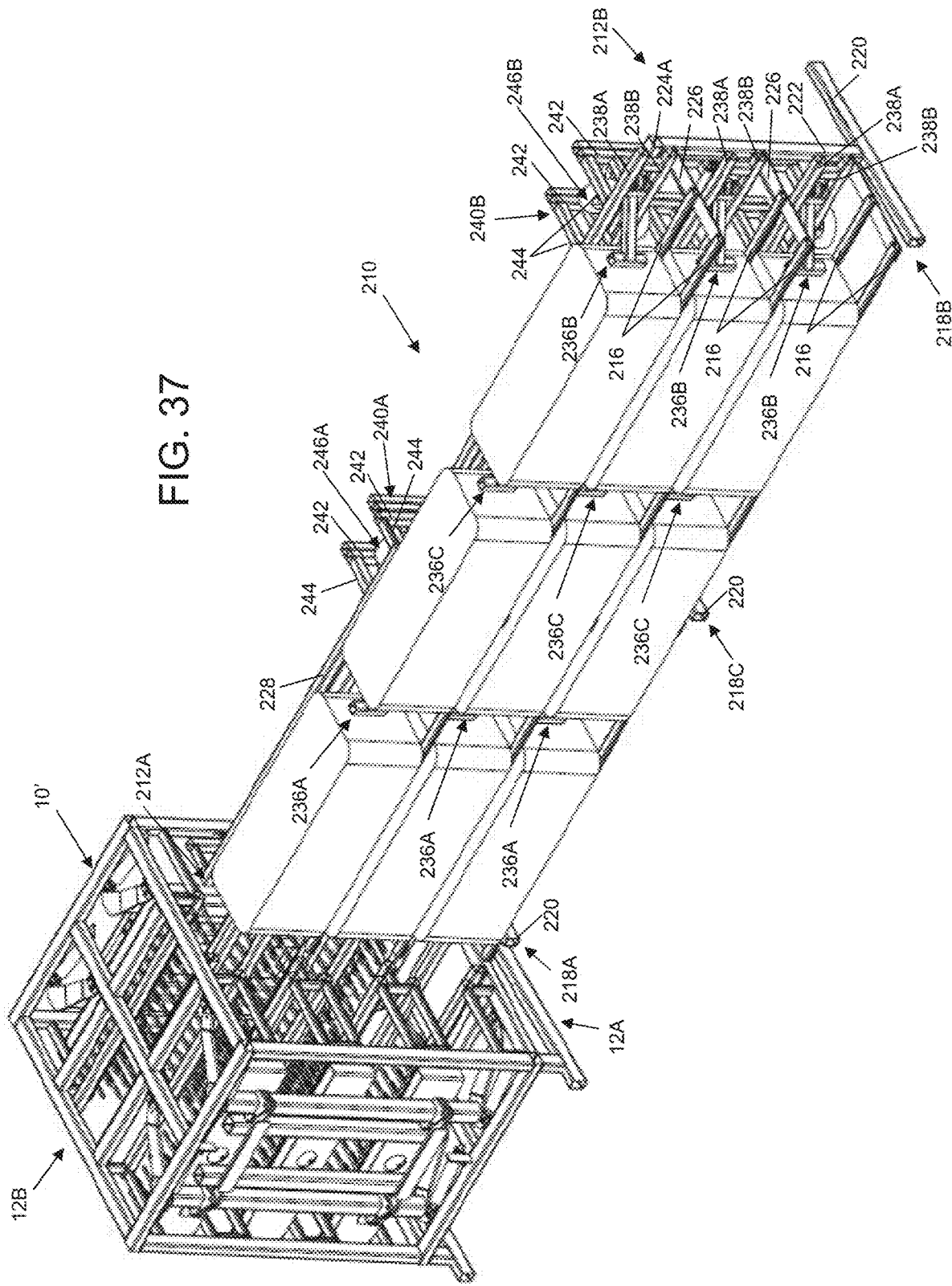

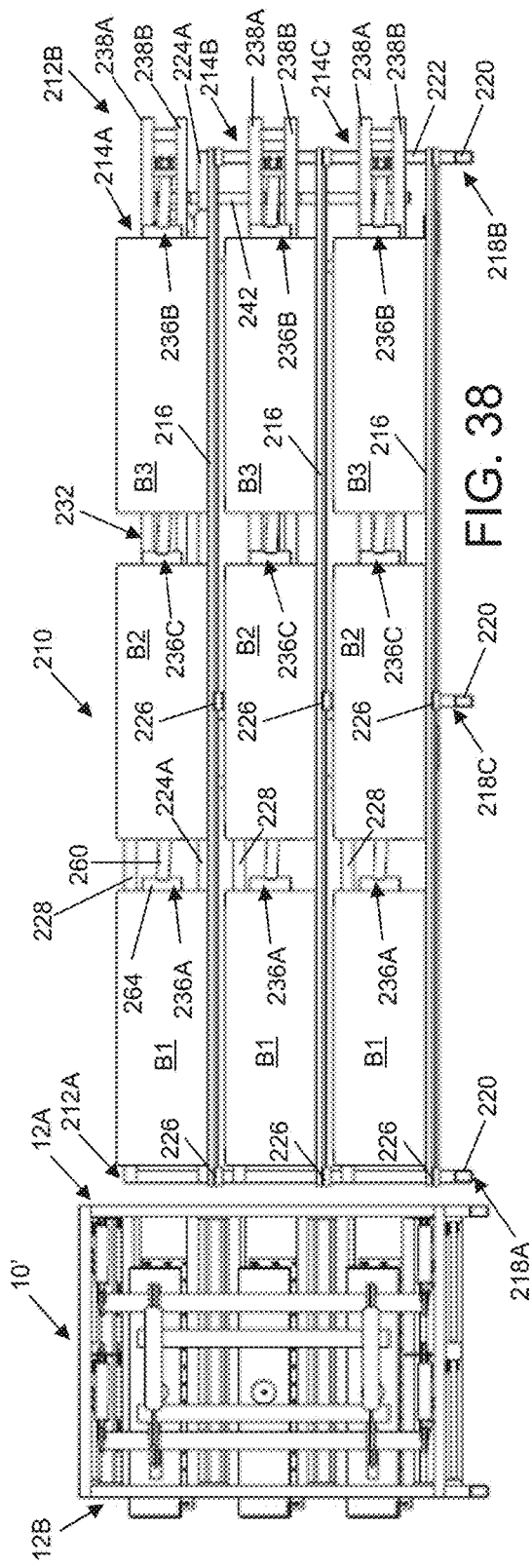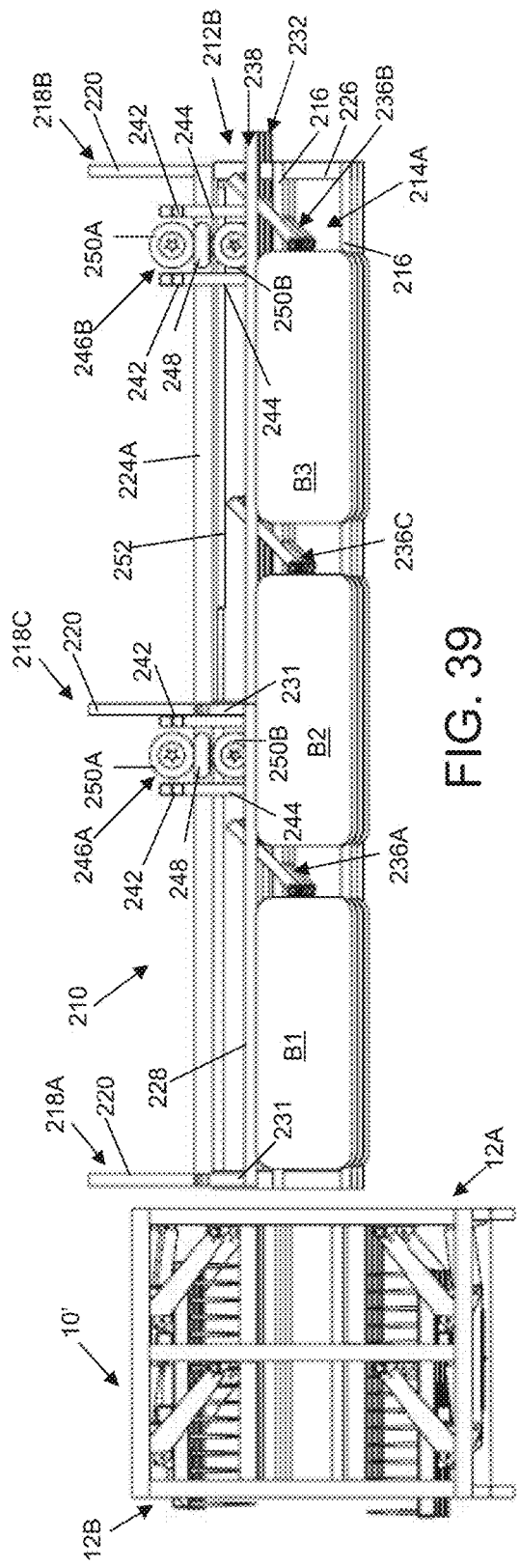

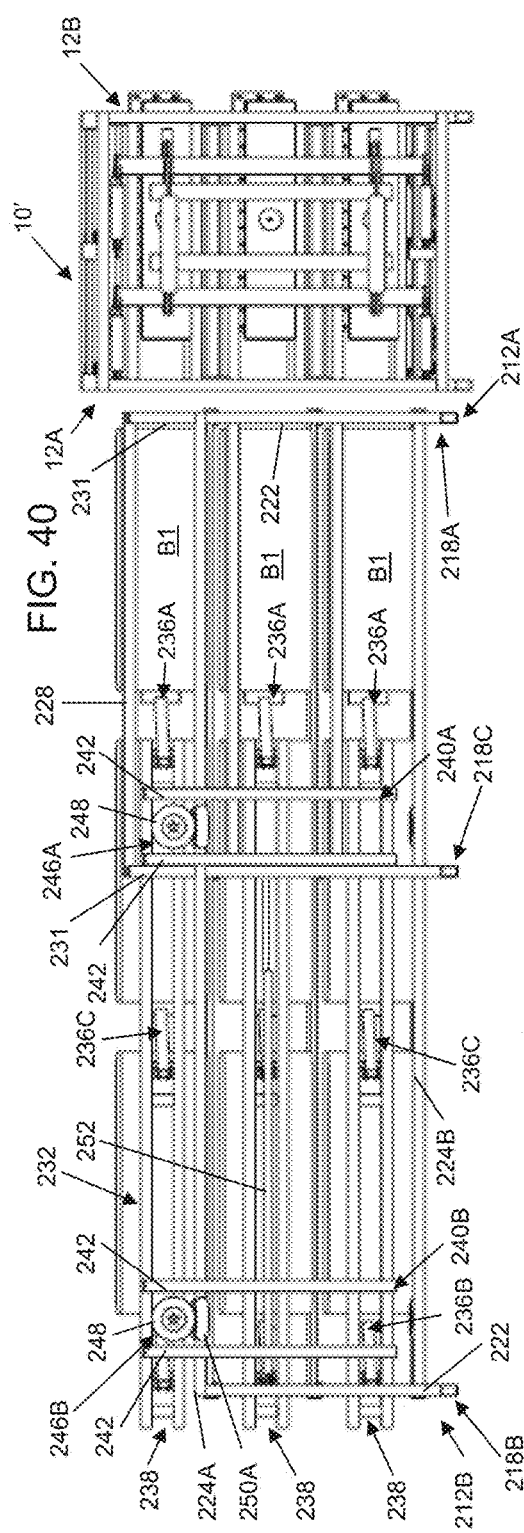
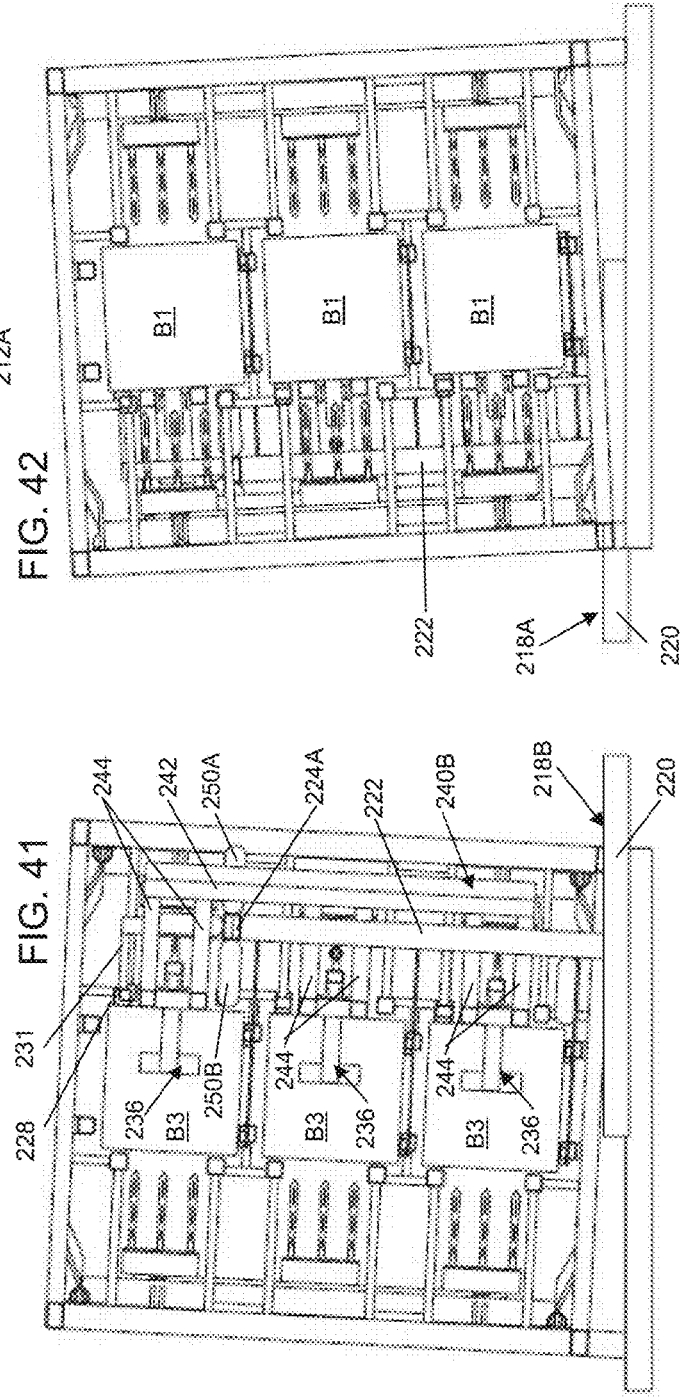
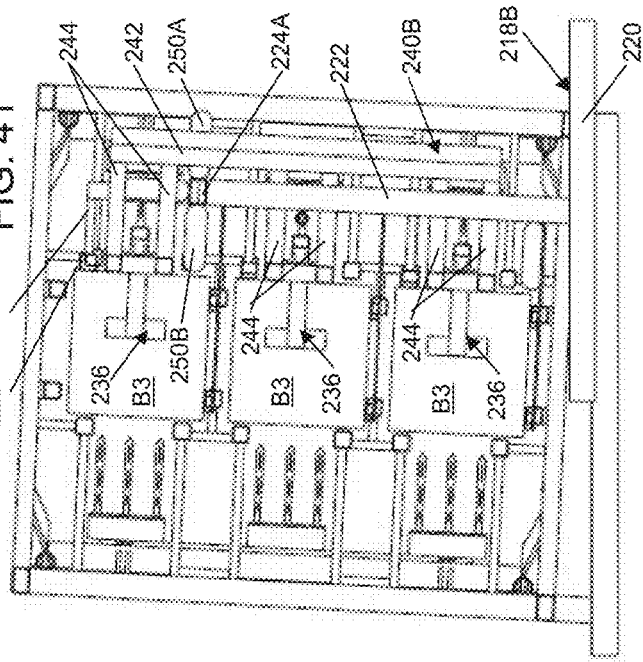
FIG. 40
FIG. 41
FIG. 42

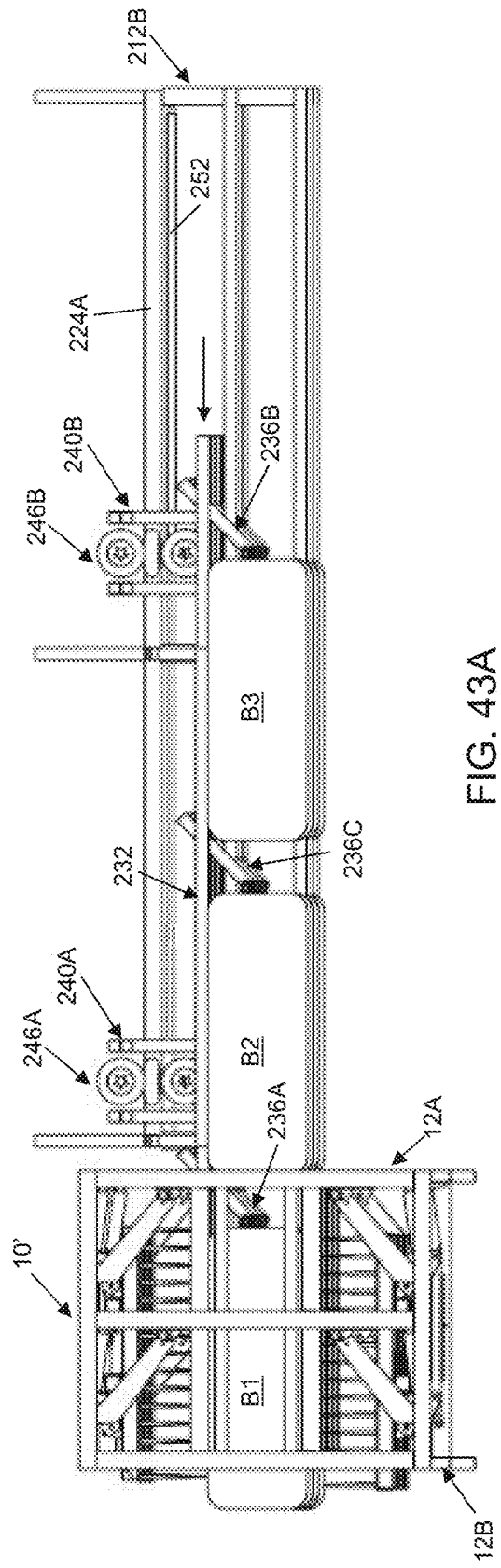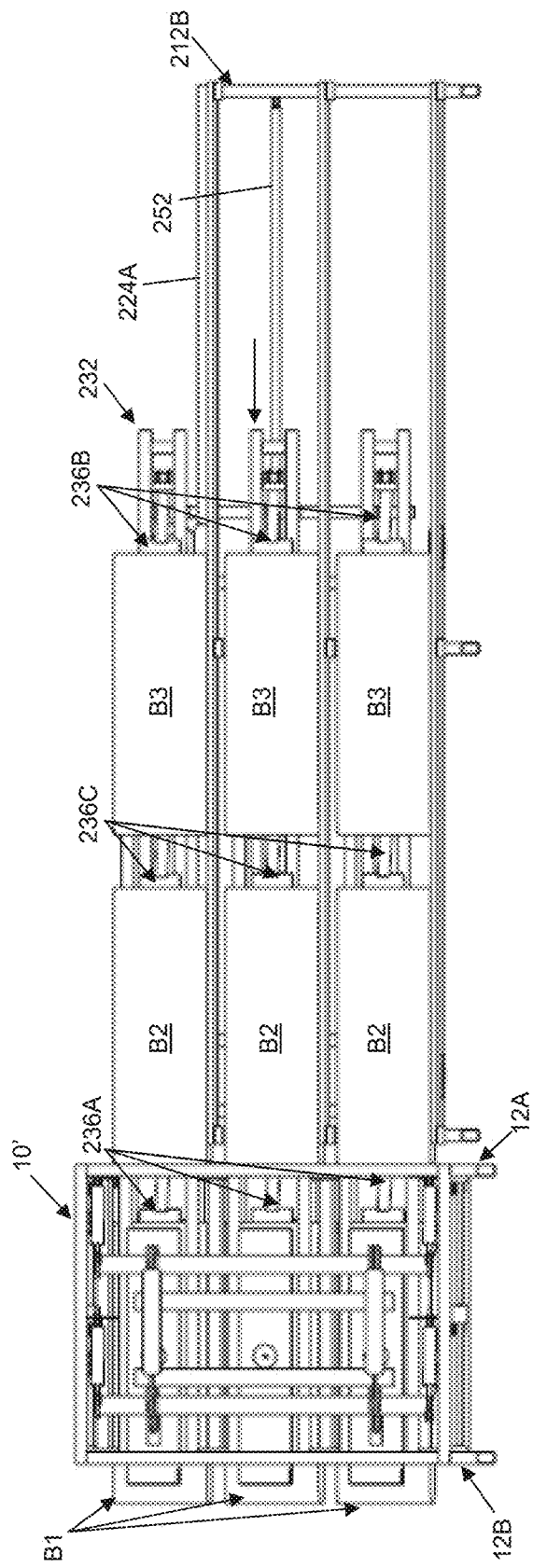
FIG. 43A

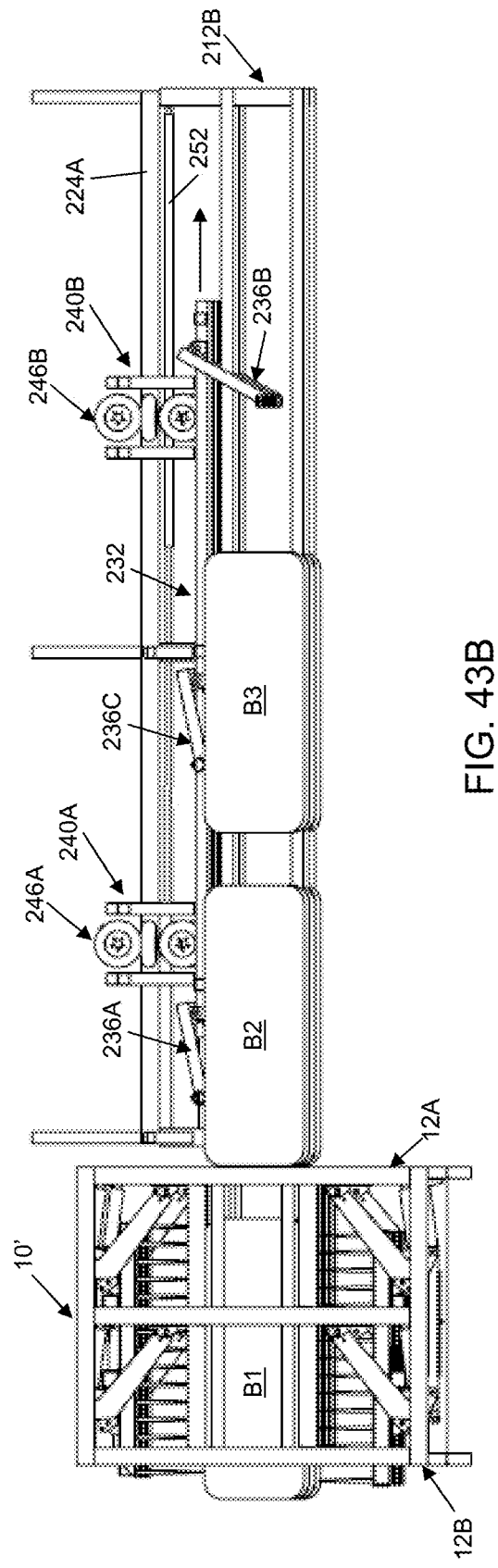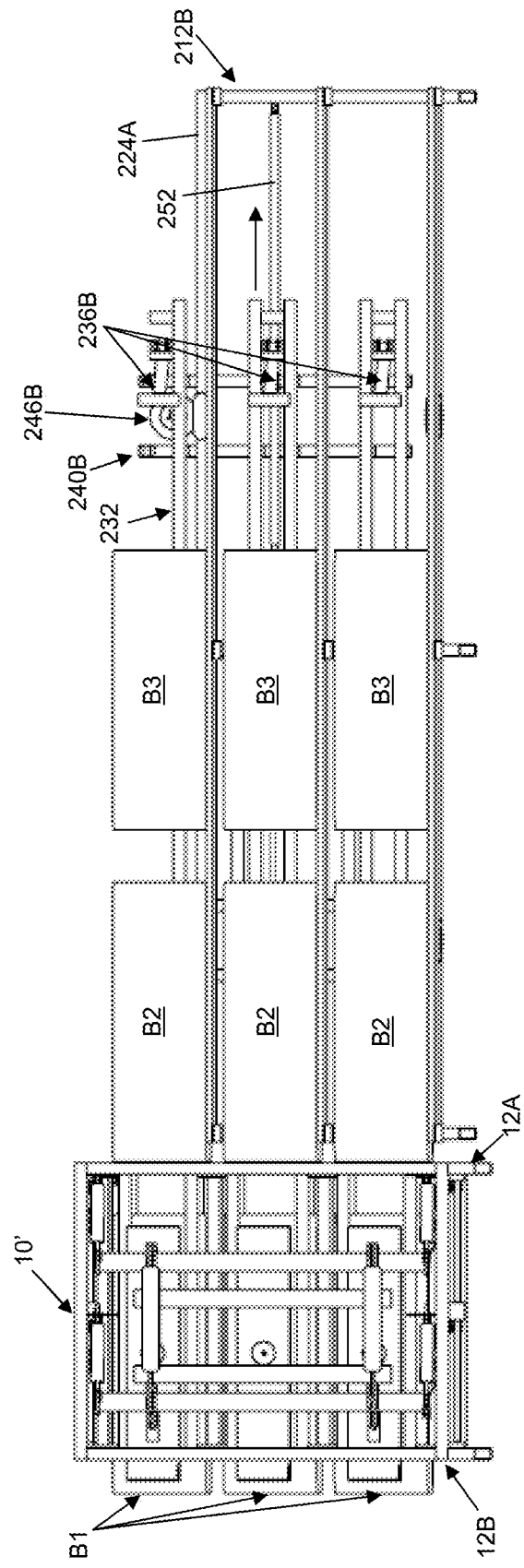
FIG. 43B

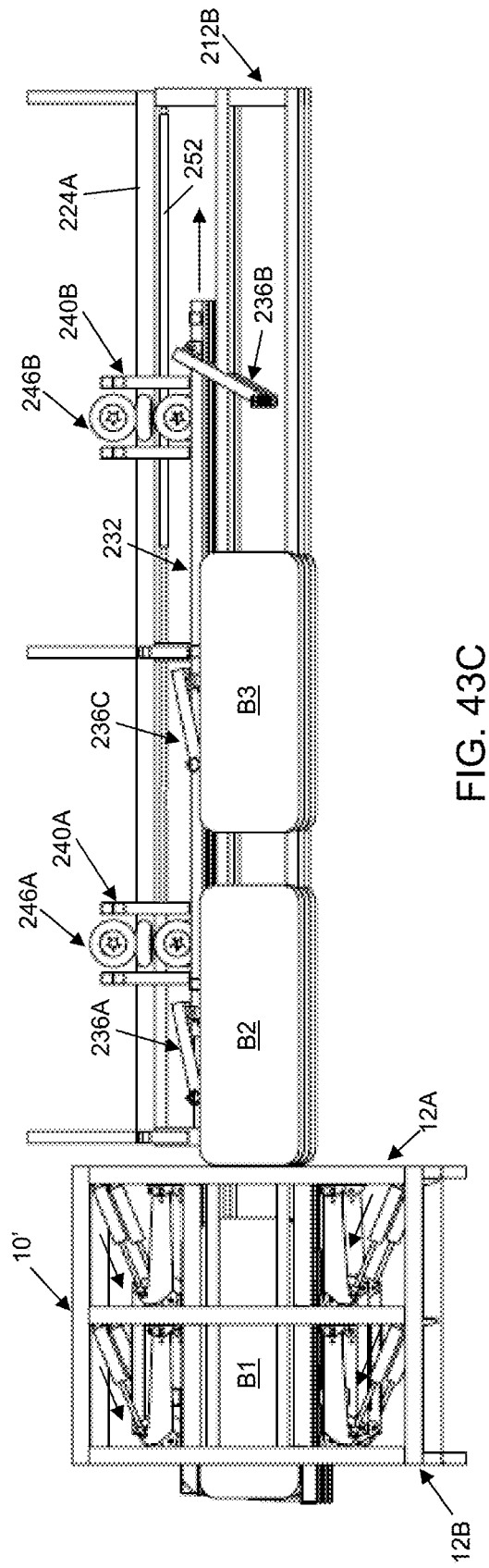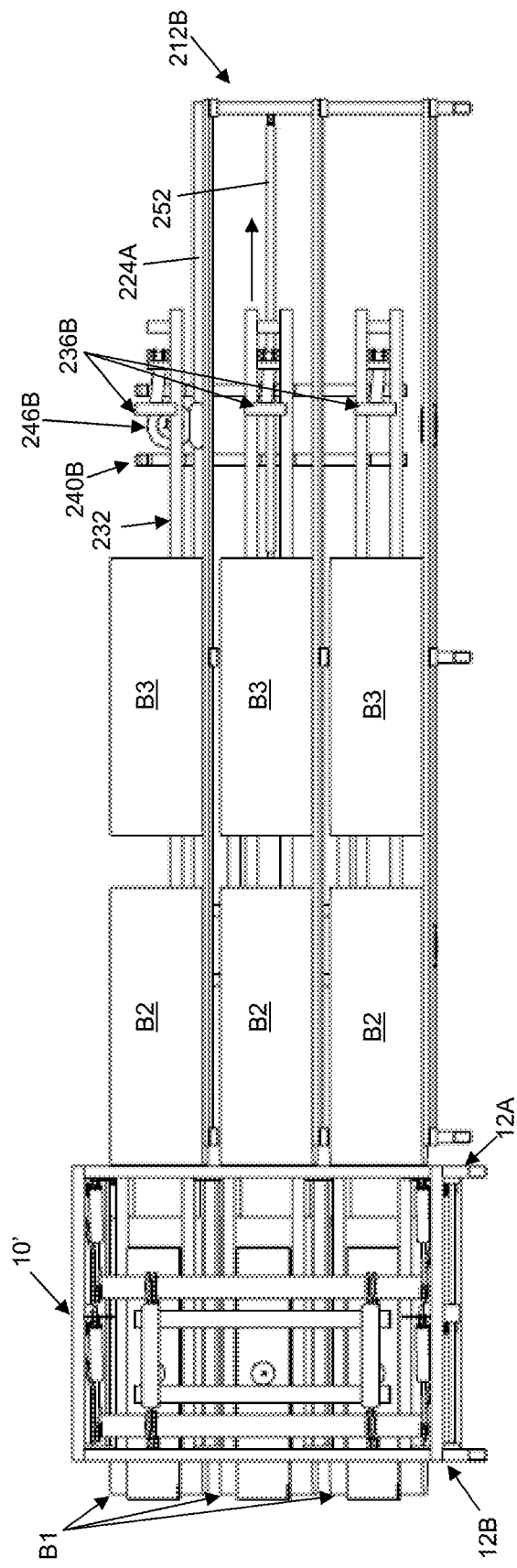
FIG. 43C

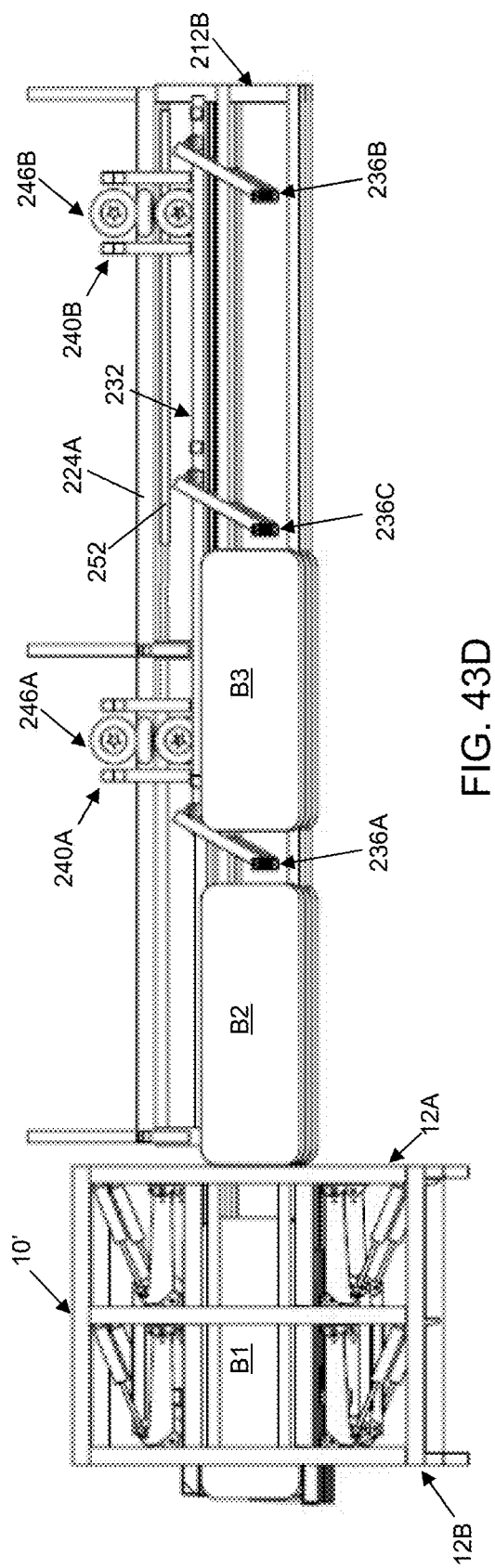
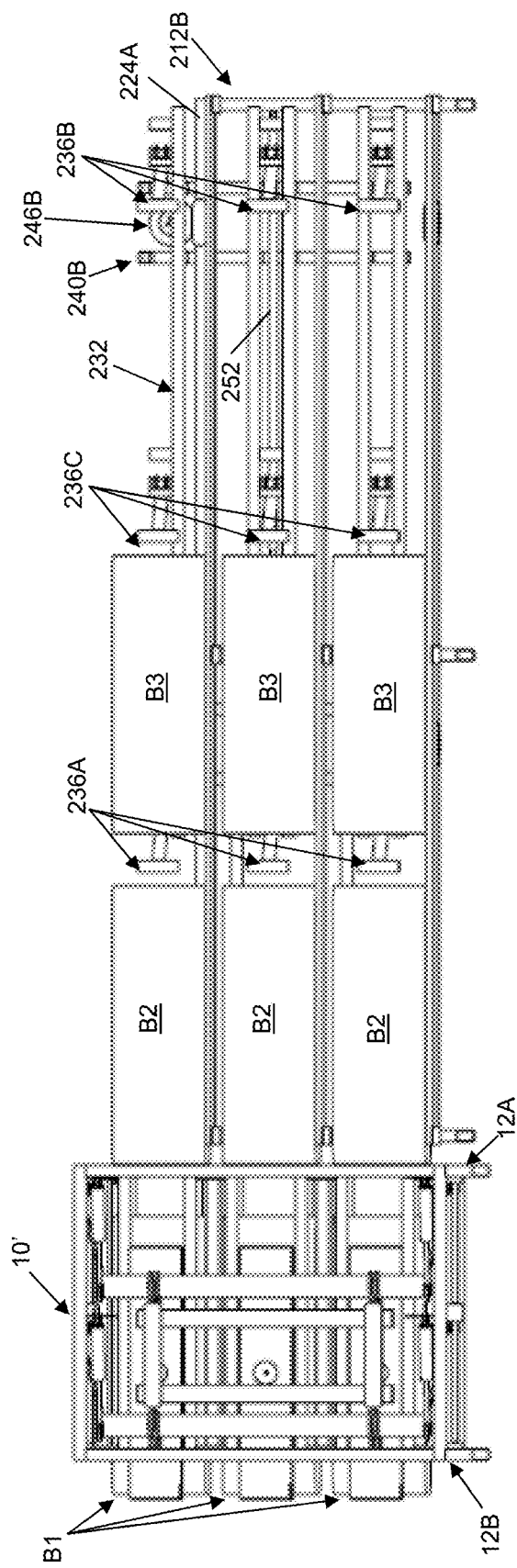
FIG. 43D

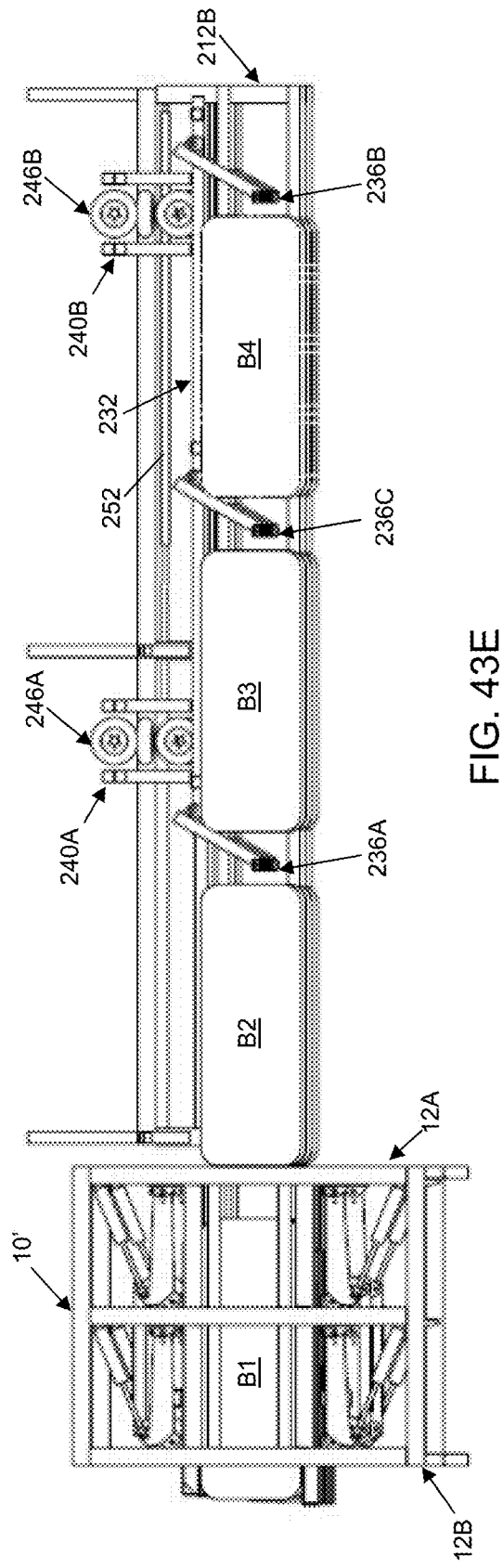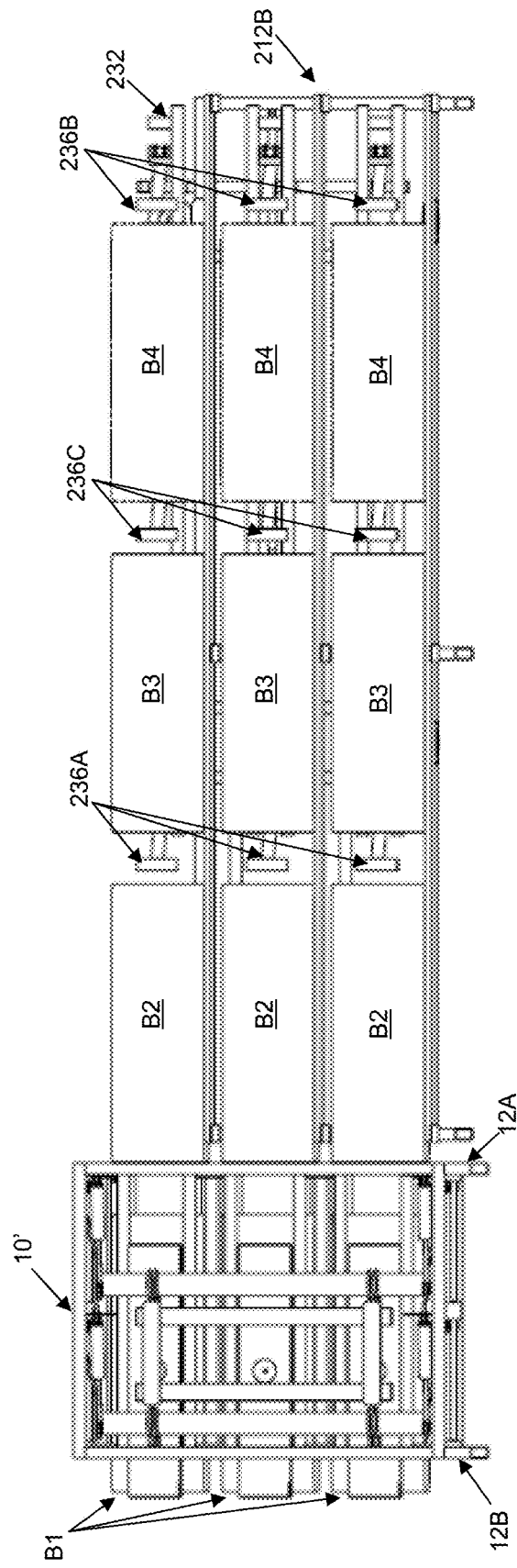
FIG. 43E

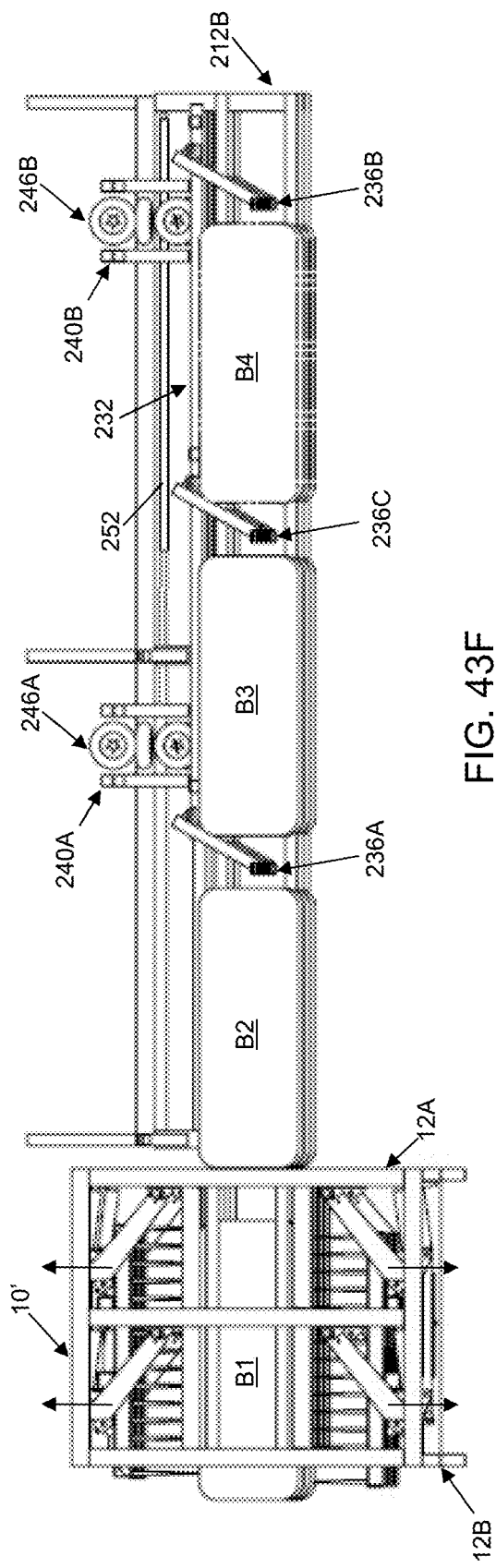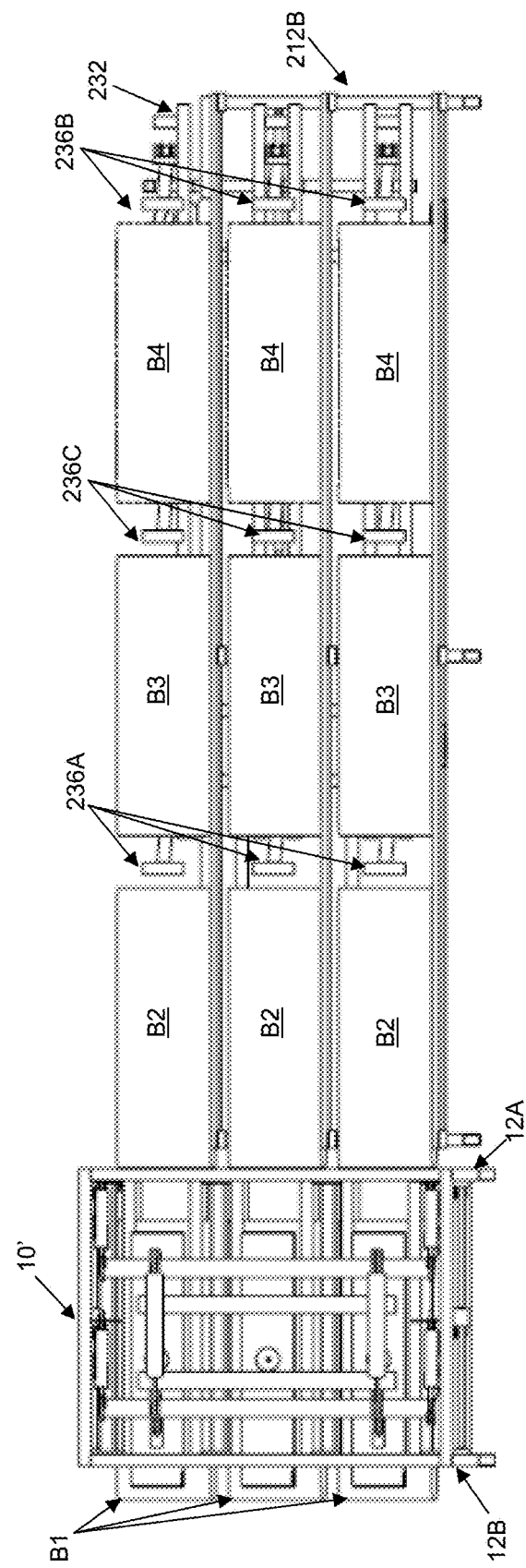
FIG. 43F

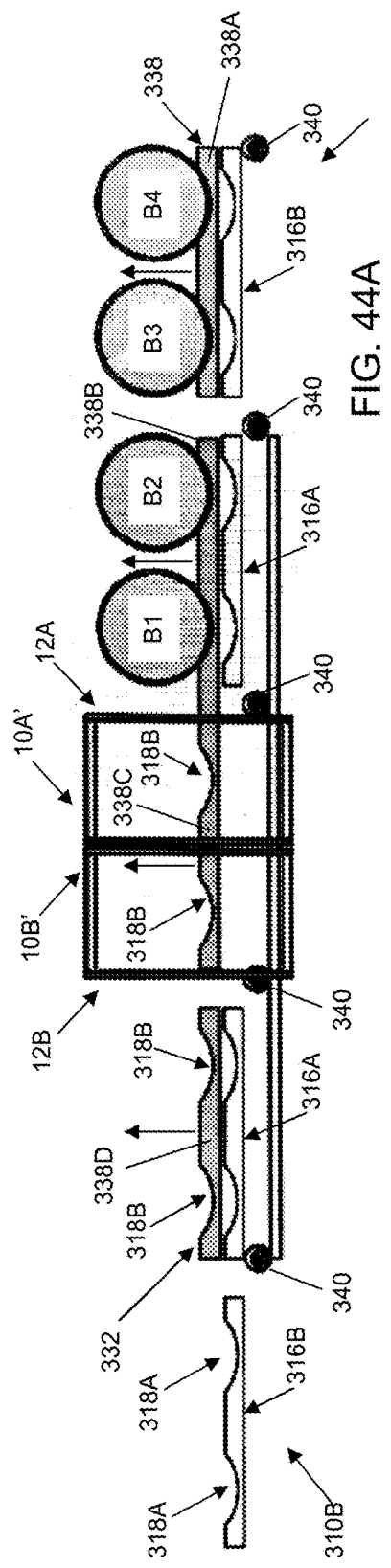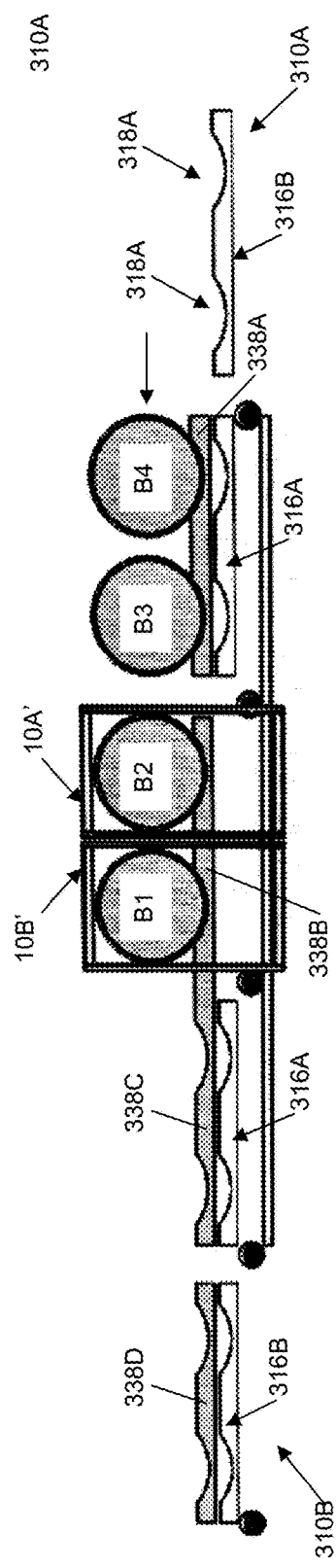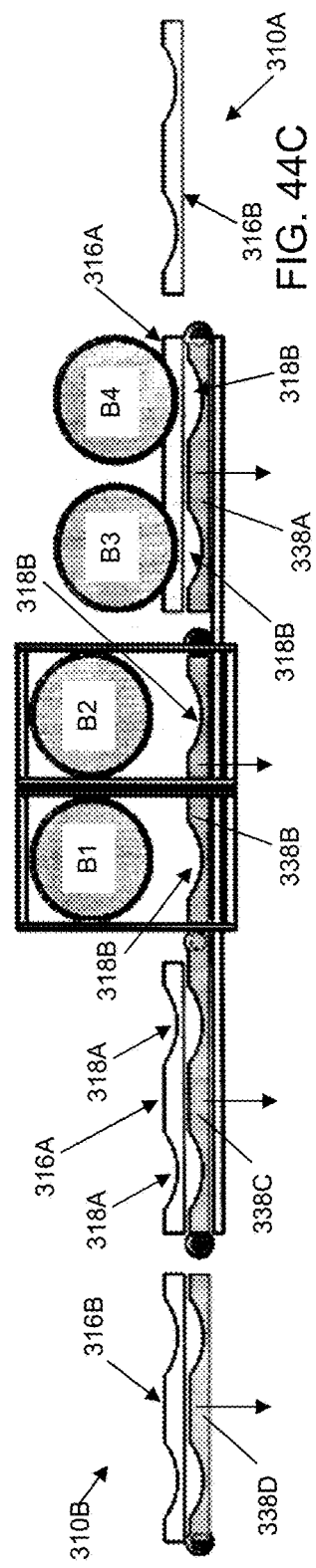

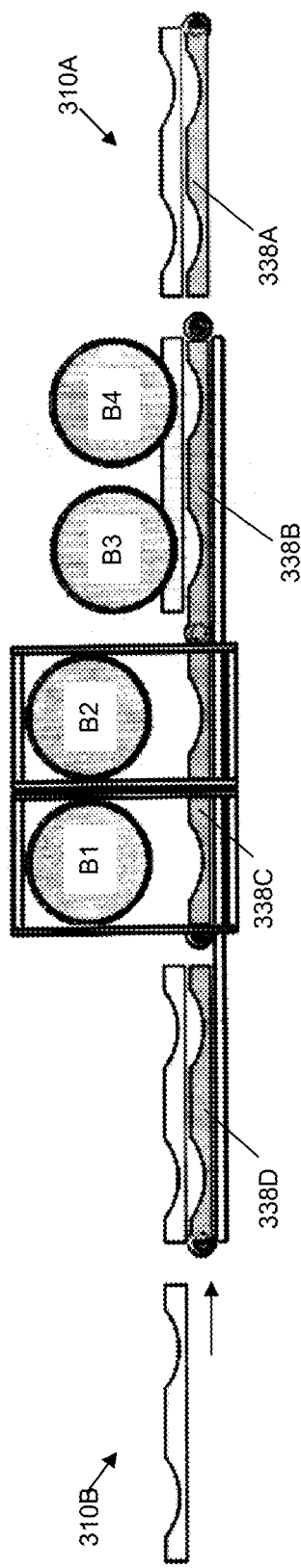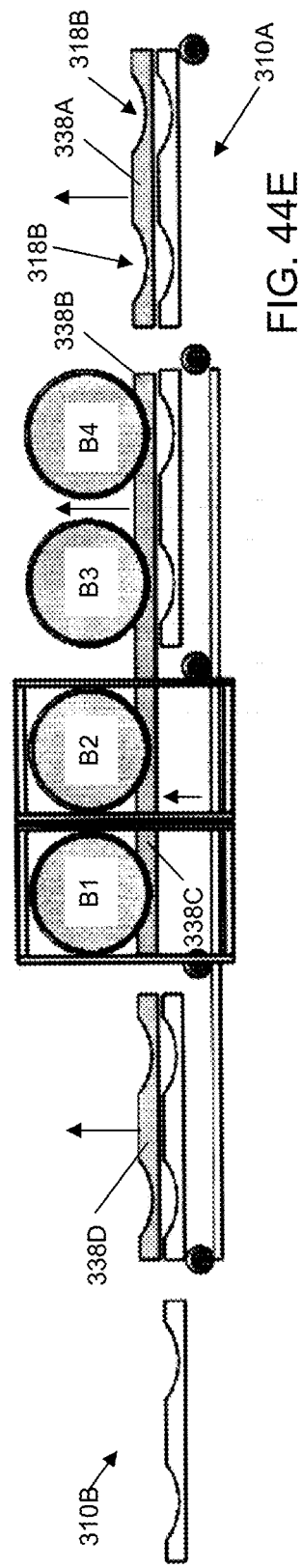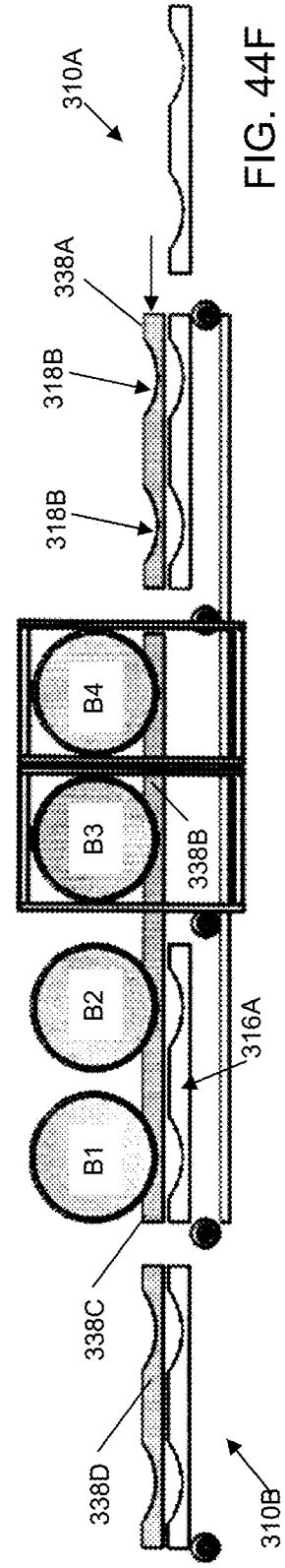

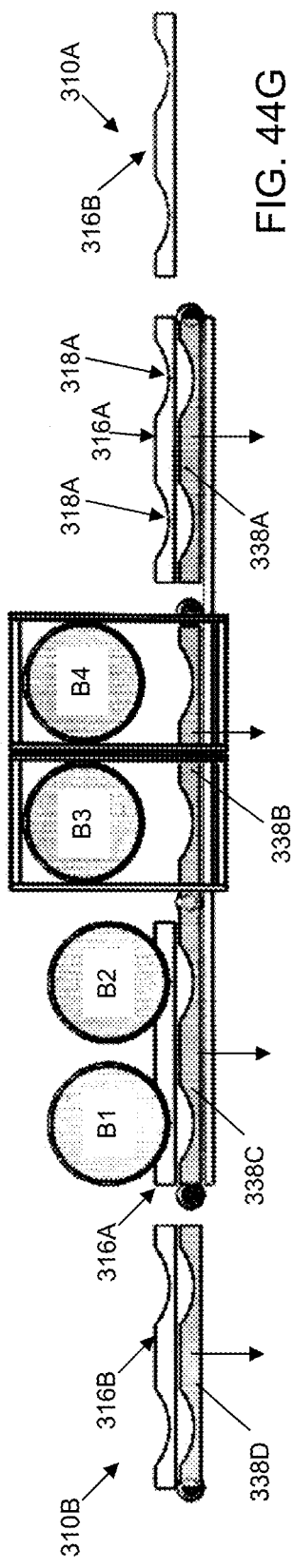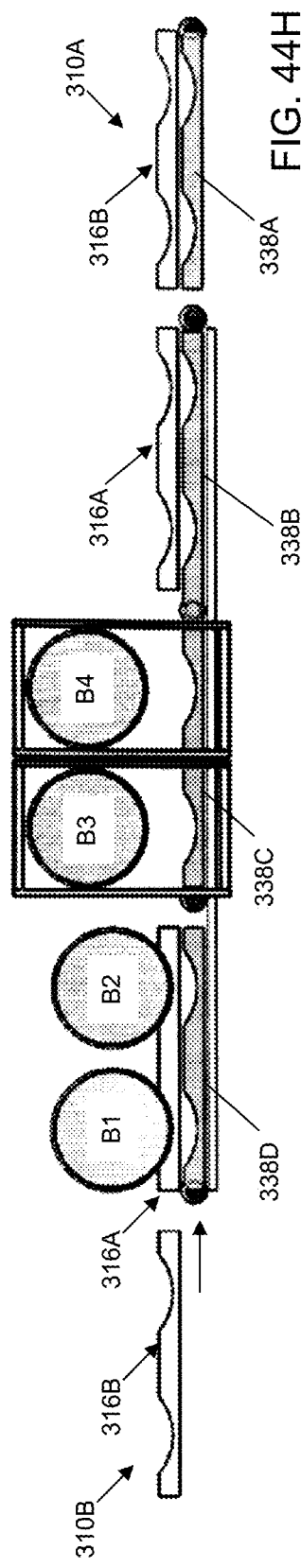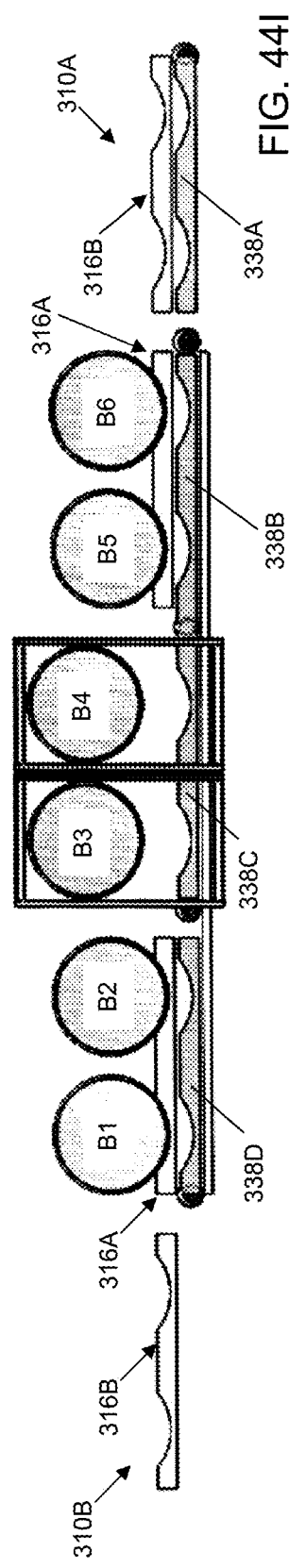

APPARATUSES AND METHODS FOR DRYING HAY BALES

CROSS-REFERENCE TO RELATED APPLICATIONS

This application claims foreign priority benefit under 35 U.S.C. 119(a) of Canadian Patent Application 3,076,779, filed Mar. 24, 2020, the entirety of which is incorporated herein by reference.

FIELD OF THE INVENTION

The present invention relates generally to agriculture, and more particularly to equipment and techniques for drying baled hay.

BACKGROUND

In the field of agriculture, it has been previously proposed to construct equipment capable of drying hay bales in the interest of overcoming problems with the more conventional approach leaving cut hay in the field to dry before baling. Examples of such prior bale drying equipment can be seen in Published US Patent Applications US20180306503 and US20190024973.

The former reference discloses a hay bale dryer in which a rack of spikes is movably carried atop a platform on which a hay bale is seated. The rack is lowered into a working position driving the spikes downwardly into the bale, and forced air is supplied through the hollow spikes, and permeates into the bale through slots or holes in the spikes. Hydraulic cylinders linearly displace the spike rack between its lowered working position penetrating the bale, and its raised non-working position withdrawn from the bale.

The latter reference similarly uses hollow needles to distribute drying air into the bale, but employs two sets of such needles carried on respective air manifolds disposed above and below a bale holding space in order to penetrate a group of bales from both the topside and underside thereof. Hydraulic cylinders are used to linearly displace the two manifolds toward and away from one another between the bale-penetrating working position and the retracted non-working position withdrawn from the bale. In addition to the hydraulic the cylinders, a system of tracks, gears, chains and driveshafts is used to balance the air manifolds during the cylinder-powered displacement thereof.

Despite these prior innovations in the art, there remains room for improvements and alternatives in hay drying equipment, and associated equipment for loading and unloading bales to and from such dryers.

SUMMARY OF THE INVENTION

According to a first aspect of the invention, there is provided a bale drying apparatus comprising:
  a support frame;
  a bale space delimited within said support frame and sized to receive at least one hay bale within said bale space;
  an air manifold movably coupled to the support frame and connected or connectable to an air source from which air is supplied to said manifold;
  a plurality of spears each attached to the air manifold, each comprising a hollow interior fluidly connected to an interior space of the air manifold therewith to receive the supplied air therefrom, and each comprising a plurality of apertures therein through which the supplied air can exit the hollow interior of the spear;
  wherein:
  the air manifold is movable between a deployed position in which the plurality of spears penetrate into the bale space, and a retracted position in which the plurality of spears are retracted out of said bale space; and
  each spear, at locations within a longitudinal span of the hollow interior of said spear, includes a plurality of locations possessing different respective cross-sectional sizes in respective cross-sectional planes lying normal to said longitudinal span, and said different respective cross-sectional sizes, in at least a first dimension measured transversely of said longitudinal span, grow sequentially narrower toward a distal end of the spear situated furthest from the air manifold.

According to a second aspect of the invention, there is provided an aeration spear for a bale dryer, said aeration sphere comprising a hollow elongated body connected or connectable to an air manifold of the bale dryer in a position fluidly communicating a hollow interior of the hollow elongated body with the air manifold to receive supplied air therefrom, and a plurality of apertures in said hollow elongated body through which the supplied air can exit the hollow interior thereof, wherein, within a longitudinal span of the hollow interior, said hollow elongated body includes a plurality of locations possessing different respective cross-sectional sizes in respective cross-sectional planes lying normal to said longitudinal span, and said different respective cross-sectional sizes, in at least a first dimension measured transversely of said longitudinal span, grow sequentially narrower toward a distal end of the hollow elongated body.

According to a third aspect of the invention, there is provided a method of manufacturing an aeration spear for a bale dryer, said method comprising:
  (a) obtaining a pipe having a hollow interior; and
  (b) at least at a terminal end of an originally cylindrical portion of said pipe, deforming said originally cylindrical portion of said pipe into non-cylindrical form by forcibly squeezing together opposing sides of said originally cylindrical portion to reduce a cross-sectional size of said originally cylindrical portion in a dimension in which said opposing sides are opposed, thereby creating a narrowed piercing end of said aeration spear at said terminal end of the originally cylindrical portion of said pipe.

According to a fourth aspect of the invention, there is provided a bale drying apparatus comprising:
  a support frame;
  a bale space delimited within said support frame and sized to receive at least one hay bale within said bale space;
  an air manifold movably coupled to the support frame and connected or connectable to an air source from which air is supplied to said manifold;
  a plurality of spears each attached to the air manifold, each comprising a hollow interior fluidly connected to an interior space of the air manifold therewith to receive the supplied air therefrom, and each comprising a plurality of apertures therein through which the supplied air can exit the hollow interior of the spear;
  wherein
  the air manifold is movable between a deployed position in which the plurality of spears penetrate into the bale space, and a retracted position in which the plurality of spears are retracted out of said bale space;

the air manifold is movably carried on the support frame by at least one crank arm pivotably coupled to the support frame; and at least one actuator is connected between the support frame and said at least one crank arm and operable to pivot said at least one crank arm in both a deployment direction moving the air manifold toward the deployed position and a retraction direction moving the air manifold toward the retracted position.

According to a fifth aspect of the invention, there is provided a bale feeding apparatus for feeding bales into a bale dryer, said apparatus comprising:

a structure defining an elongated lane having a proximal end for residing adjacent the bale dryer and a distal end for residing opposite of the bale dryer, said lane having a sufficient length to support a plurality of bales thereon in queued fashion in a plurality of queuing spots residing between said proximal end distal ends;

a bale mover in co-operably installed relation to said structure and configured to advance the plurality of bales sequentially through the plurality of queuing spots toward the proximal end of the lane and into the bale dryer from said proximal end of the lane; and at least one actuator connected to the bale mover and operable to displace the bale mover longitudinally back and forth of the structure in an advancing direction toward the proximal end of the lane and a retreating direction back toward the distal end;

wherein the bale mover comprises one or more bale engagement units movable between a working position protruding into the lane to displace the plurality of bales during movement in the advancing direction, and a reset position withdrawn from the lane bypass the plurality bales during movement in the retreating direction.

BRIEF DESCRIPTION OF THE DRAWINGS

Preferred embodiments of the invention will now be described in conjunction with the accompanying drawings in which:

FIG. 1 is a rear perspective view of a bale dryer of a first embodiment of the present invention, showing the bale dryer in a closed state operable to dry hay bales previously received in the dryer in an open state thereof.

FIG. 6 is a side elevational view of the bale dryer of FIG. 1, but in the open state ready to accept and release hay bales thereto and therefrom.

FIG. 7 is a rear elevational view of the bale dryer of FIG. 6.

FIG. 8 is a cross-sectional view of the bale dryer of FIG. 7, as viewed along line D-D thereof.

FIG. 9 is a perspective view of an aeration spear from the bale dryer of FIG. 1, with associated mounting components shown in exploded relation to the spear.

FIG. 10 is an end view of the aeration spear of FIG. 9 from a distal penetrating end thereof, with the mounting components installed thereon at an opposite proximal mounting end thereof.

FIG. 11 is an end view of the aeration spear and installed mounting components of FIG. 10 as viewed from the proximal mounting end.

FIG. 12 is a cross-sectional view of the aeration spear and installed mounting components as viewed alone line D-D of FIG. 10 and line C-C of FIG. 13.

FIG. 13 is a top plan view of the aeration spear and installed mounting components of FIG. 12.

FIG. 14 is a side elevational view of the aeration spear and installed mounting components of FIG. 12.

FIGS. 15A through 15I illustrate numerous variants of the spear and mounting components of FIGS. 9 through 14.

FIG. 16 is a perspective view of a bale feeding table having a set of bale movers operable to feed bales into the dryer of FIGS. 1 to 8, the bale movers being shown in a starting position and lowered state.

FIG. 17 is an elevational end view of the bale feeding table of FIG. 16 from a distal end thereof that resides opposite the bale dryer when installed in working relation thereto.

FIG. 18 is an overhead plan view of the bale feeding table of FIG. 16.

FIG. 19 is a side elevational view of the bale feeding table of FIG. 16.

FIG. 20 is an overhead plan view of the bale feeding table of FIG. 16, with the bale movers once again shown in their lowered state, but in a fully advanced position.

FIG. 21 is a side elevational view of the bale feeding table of FIG. 20.

FIG. 22 is an end elevational view of the bale feeding table of FIG. 20 from the distal end thereof.

FIG. 23 is an overhead plan view of the bale feeding table of FIG. 20, with the bale movers once again shown in their fully advanced position, but in a raised state.

FIG. 24 is a side elevational view of the bale feeding table of FIG. 23.

FIG. 25 is a cross-sectional view of the bale feeding table of FIG. 23 as viewed along line C-C thereof.

FIG. 26 is an isolated perspective view of select components of the bale feeding table of FIGS. 23 to 25 to reveal constructional details of a shared subframe on which the bale movers are carried, and of a lifting mechanism on the subframe by which bale lifters are changeable between their raised and lowered states.

FIG. 27 is a perspective view of a dual-dryer setup featuring a pair of bale dryers of the type shown in FIGS. 1 to 8 installed in series with one another for increased bale capacity, and accompanied by the bale feeding table of FIGS. 16 to 25 for feeding bales into the dual-dryer setup.

FIG. 28A through 28S show sequential operational steps in feeding of the bales into the two dryers of the dual-dryer setup of FIG. 27, and drying of the bales therein.

FIG. 30 is a rear elevational view of the bale dryer of FIG. 29.

FIG. 31 is a side elevational view of the bale dryer of FIG. 29.

FIG. 32 is a top plan view of the bale dryer of FIG. 29.

FIG. 37 is a perspective view of a single-dryer setup featuring a singular bale dryer of the type shown in FIGS. 29 to 36, and an accompanying bale feeding rack for feeding bales into the singular dryer.

FIG. 38 is a side elevational view of the single dryer setup of FIG. 37.

FIG. 39 is a top plan view of the single dryer setup of FIG. 37.

FIG. 40 is another side elevational of the single dryer setup of FIG. 38 from an opposing side thereof.

FIG. 41 is a front elevational view of the single dryer setup of FIG. 37.

FIG. 42 is a rear elevational view of the single dryer setup of FIG. 37.

FIGS. 43A through 43G show sequential operational steps in feeding of the bales into the dryer of the single-dryer setup of FIG. 37, and drying of the bales therein, each figure including both a top plan view and a side elevational view, as seen from an open outer side of the feeding rack.

FIGS. 44A through 44I schematically illustrate sequential operational steps of an alternate dual dryer and feeding table setup, which is reconfigured for handling of round bales, rather than the rectangular bales of the earlier embodiments.

DETAILED DESCRIPTION

Figure 2:
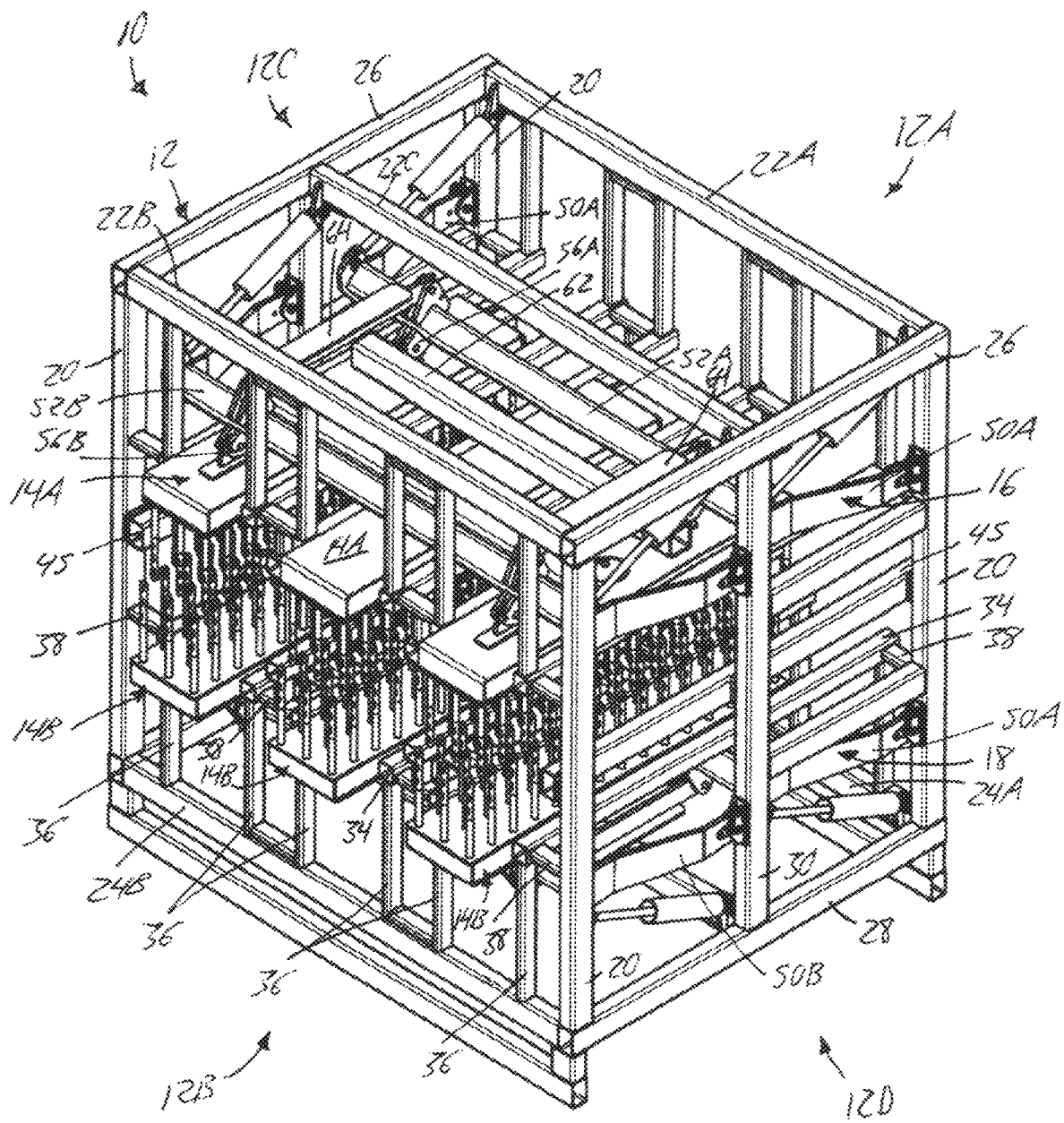
FIG. 2 is an overhead plan view of the bale dryer of FIG. 1.
Figure 2:
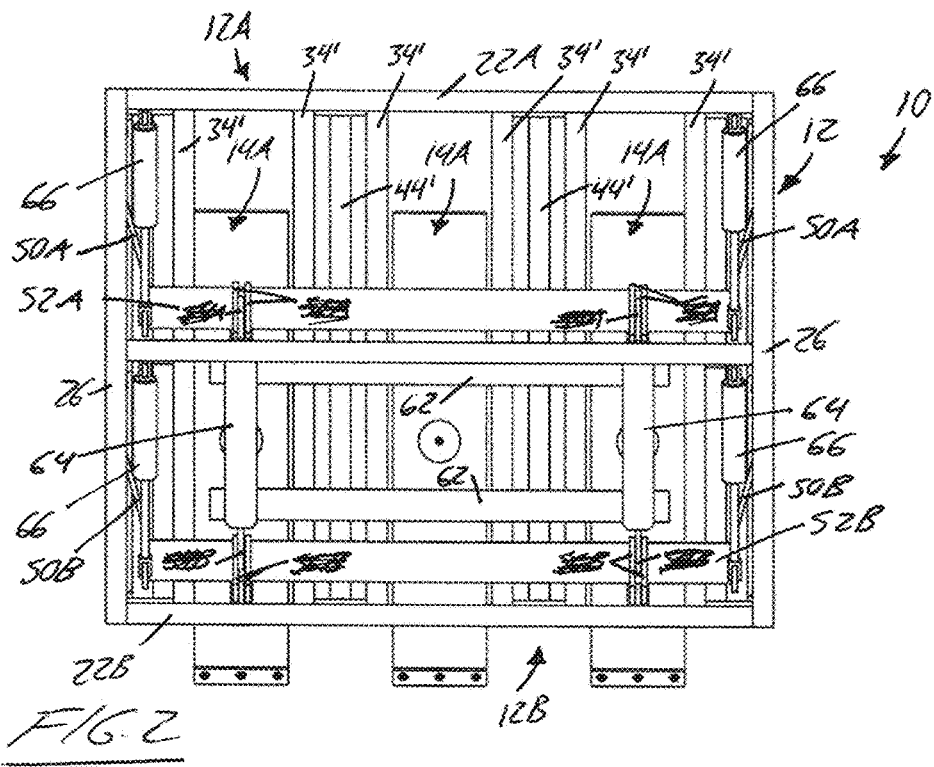
Figure 3:
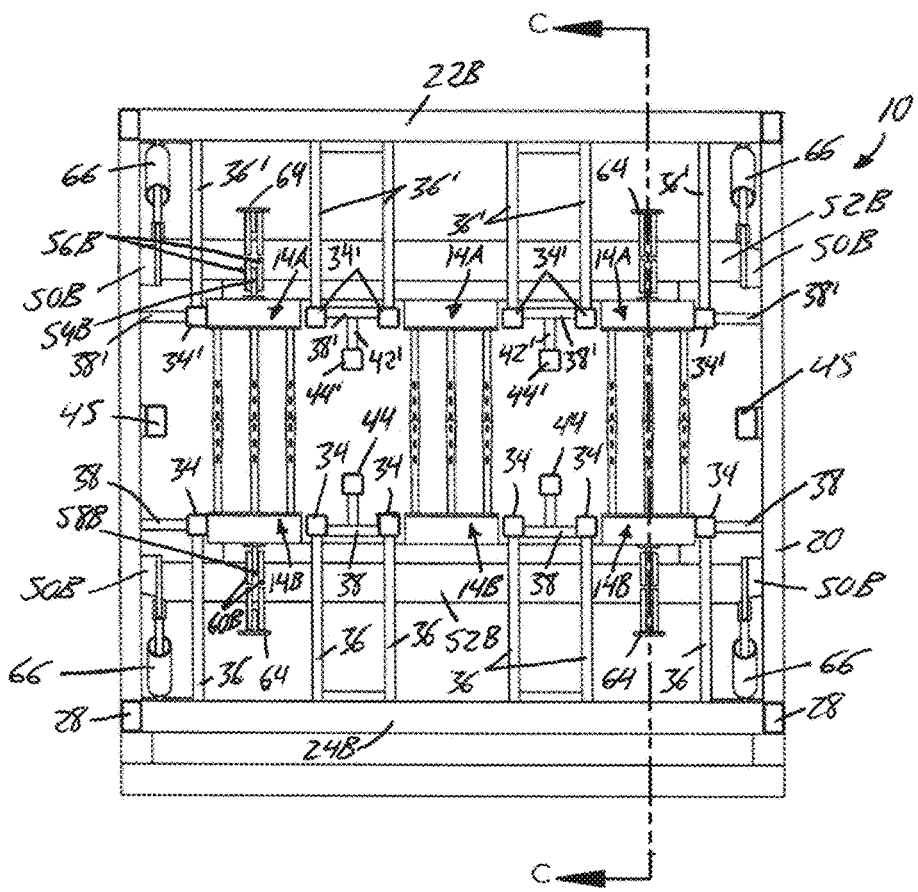
FIG. 3 is a rear elevational view of the bale dryer of FIG. 1.

FIG. 1 shows a bale drying apparatus 10 (bale dryer, for short) of a first embodiment of the invention, which in the illustrated example is a multi-bale dryer capable of drying multiple hay bales at once. More particularly, the illustrated bale dryer 10 has a three-bale capacity, though the bale capacity may be decreased to two-bale or one-bale capacity, or expanded to any quantity of bales beyond the illustrated three-bale example. The bale dryer 10 features a support frame 12, on which there are carried multiple pairs of air manifolds, each pair comprising an upper manifold 14A and a corresponding lower manifold 14B. The quantity of manifold pairs is equal to the bale capacity of the dryer, and so there are three pairs of air manifolds in the illustrated case, and hence three upper manifolds 14A and three lower manifolds 14B. Each upper manifold 14A resides in generally aligned relation over the respective lower manifold 14B. The three upper manifolds 14A are collectively carried by an upper linkage assembly 16 on an upper half of the support frame 12, and the three lower manifolds 14B are likewise collectively carried by a lower linkage assembly 18 on a lower half of the support frame 12.

The support frame 12 of the illustrated example features four vertically upright corner posts 20 delimiting a rectangular volume of the support frame. A front end of 12A of the support frame 12 denotes to an inlet end thereof at which bales enter the dryer 10, and an opposing rear end 12B of the support frame 12 denotes an outlet end thereof at which bales exit the dryer 10. The two corner posts 20 at the front end 12A of the support frame 12 are interconnected at their top ends by a front upper cross beam 22A, and at their bottom ends by a front lower cross beam 24A. Likewise, the two corner posts 20 at the rear end 12B of the support frame 12 are interconnected at their top ends by a rear upper cross beam 22B, and at their bottom ends by a rear lower cross beam 24B. At each of two opposing lateral sides of the support frame, the two respective corner posts are interconnected at their top ends by an upper header beam 26, and at their bottom ends by a lower footer beam 28. Each lateral side 12C, 12D of the support frame further features an upright mid post 30 spanning between the header and footer beams 26, 28 at an intermediate location approximately midway between the two corners posts 20.

The support frame 12 not only supports the upper and lower linkage assemblies 16, 18 on which the upper and lower manifolds 14A, 14B are movably carried, but also supports a plurality of bale holders 32, the quantity of which is equal to the quantity of manifold pairs. The illustrated embodiment with three manifold pairs thus features three bale holders 32. Each bale holder 32 features a respective pair of elongated holder rails 34 running horizontally in a longitudinal direction from the front end 12A of the support frame 12 to the rear end 12B thereof in perpendicular relation to the vertical planes occupied by the corner posts 20 and upper and lower cross-beams at the front and rear ends 12A, 12B of the support frame. This longitudinal direction coincides with a travel direction in which the hay bales move through the bale dryer 10, and the holder rails 34 are referred to as such as they are the components on which the bales are held by when received inside the dryer 10.

Each holder rail 34 is supported in space elevation above the two lower cross-beams 24A, 24B by respective standoffs 36 affixed thereto and standing vertically upright therefrom. The position of each holder rail 34 in the lateral direction of the support frame (measured horizontally, in perpendicularly transverse relation to the longitudinal direction, between the two lateral sides of the support frame) may be reinforced by shorter stub-like cross-members 38 each extending laterally between a corner post 20 and the nearest holder rail 34, or between two adjacent holder rails 34 of two adjacent bale holders 32. The space between the two holder rails 34 of each bale holder 32 is left open to accommodate movement of a respective lower manifold 14B and a respective set of aeration spears 40 installed thereon for the purpose of penetrating into a hay bale when seated atop the two holder rails 34 of the bale holder 32.

Atop the stub-like cross-members 38 that each span between two adjacent holder rails 34 are installed respective uprights 42, of which those at the front and rear ends 12A, 12B of the support frame 12 carry opposite ends of a set of lower buffer rails 44 that run parallel to the holder rails 34 at a short elevation thereabove. The lateral distance between the two lower buffer rails 44 is selected to accommodate the width of a rectangular hale bale therebetween. This way, as a bale is slid onto and along the two holder rails 34 of the bale holder 32 situated between the two lower buffer rails 44, the respective lower buffer rail 44 between that bale holder and the adjacent bale holder keeps the bale properly aligned on its respective bale holder, with the lengthwise dimension of the bale lying parallel to the longitudinal holder rails 34. This prevents skewing of and impact between two bales being slid onto the adjacent bale holders at the front end 12A of the support frame 12 or slid off of the bale holders 32 at the rear end 12B of the support frame. The two outer bale holders that reside adjacent the two opposing lateral sides 12C, 12D of the support frame 12 each also feature a respective longitudinal guide rail 45 affixed to the two corners posts 20 at the respective lateral side 12C, 12D of the support frame 12. Like the lower buffer rails 44, these guide rails 45 each reside at an elevation spaced above the holder rails 34 to cooperate with the respective buffer rail 44 on the opposing side of the outer bale holder 32 to maintain the proper alignment of the bale in this outer bale holder.

When a bale is received on a respective bale holder 32, it is constrained against any significant lifting of the bale from the holder rails 34 of the bale holder by a corresponding bale constrainer 32' that resides in aligned relation above the bale holder 32 at a spaced elevation thereabove. In the illustrated example, each bale constrainer 32' is of identical but vertically mirrored relation to the corresponding bale holder, and thus has a pair of longitudinal constrainer rails 34' that are of parallel and aligned relation to the longitudinal holder rails 34, and that are affixed to the upper cross-members 22A, 22B by standoffs 36' hanging vertically downward therefrom. Adjacent constrainer rails 34' of adjacent bale constrainers 32' are interconnected by stub-like upper cross members 38', and a pair of upper buffer rails 44' lie in parallel and aligned relation over the lower buffer rails 44, and are held in such position by short hangers 42' depending downward from the stub-like upper cross members 38'. Like the lower buffer rails 44, the upper buffer rails 44' are positioned to accommodate a singular bale width therebetween, and maintain the proper alignment of received bales on the respective bale holders 32.

Each bale holder 32 and the respective bale constrainer 32 co-operably define a respective bale retainer for receiving a hay bale, and holding it in place during penetration of the bale by the aeration spears of the respective pair of air manifolds 14A, 14B. Each bale retainer thus defines a bale space that is delimited vertically between the holder rails 34 and the constrainer rails 34', and is delimited horizontally in the lateral direction either between pairs of upper and lower buffer rails 44, 44', or between a pair of upper and lower buffer rails 44, 44' and a respective guide rail 45. FIGS. 1 to 5 show the air manifolds 14A, 14B in deployed positions in which the respective sets of aeration spears 40 thereof penetrate into the bale spaces in order to penetrate respective hay bales when received therein. On the other hand, FIGS. 6 to 8 show the air manifolds 14A, 14B in retracted positions in which the respective sets of aeration spears 40 are fully withdrawn from the bale spaces to permit loading and unloading of the hay bales into and out of the bale spaces. The deployed and retracted positions of the upper manifolds 14A correspond to lowered and raised positions thereof, respectively; while the deployed and retracted positions of the lower manifolds 14B conversely correspond to raised and lowered positions thereof, respectively.

Movement of the upper and lower manifolds 14A, 14B are controlled and constrained by the upper linkage assembly 16 and lower linkage assembly 18, respectively. Each linkage assembly comprises at least one parallelogram linkage, and in the illustrated example, two parallelogram linkages, each respectively coupled to the support frame 12 at a respective one of the two opposing lateral sides 12C, 12D thereof. The two cranks of each parallelogram linkage are defined by two parallel crank arms 50A, 50B, of which a front crank arm 50A is pivotably coupled to the corner post 20 at the front end 12A of the support frame, and a rear crank arm 50B is pivotably coupled to the mid-post 30 at the same lateral side 12C, 12D of the support frame as said front crank arm 50A. Each crank arm is pivotable relative to the support frame 12 about a laterally oriented pivot axis, and is thereby pivotable in a vertical working plane lying longitudinally of the support frame 12 just inside the respective lateral side 12C, 12D thereof. The two crank arms 50A, 50B are pivotably coupled to the corner post 20 and mid post 30 at equal elevation to one another, and both reach rearwardly from the respective posts 20, 30 on which they are supported. The ground link of each parallelogram linkage is defined by the stationary support frame 12 to which the crank arms 50 of the linkages are pivotably coupled.

In each linkage assembly 16, 18, the two front crank arms 50A are rigidly interconnected by a front cross-member 52A spanning horizontally therebetween in the lateral direction. Likewise, the two rear crank arms 50B are rigidly interconnected by a rear cross-member 52B spanning therebetween in parallel to the front cross-member 52A. At each of the two outer bale retainers adjacent the two lateral sides 12C, 12D of the support frame 12, the respective upper or lower manifold 14A, 14B carried by each linkage assembly 16, 18 forms a floating coupler of the respective parallelogram linkage at this side of the support frame. Accordingly, the outer two of the upper manifolds 14A feature upright lugs 54A, 54B affixed to the topsides thereof near longitudinally opposing front and rear ends of the manifold. By way of these lugs 54A, 54B, these outer two of the upper manifolds 14A are pivotably pinned to the front and rear cross members 52A, 52B of the upper linkage assembly 16 via corresponding lugs 56A, 56B affixed to these front and rear cross members 52A, 52B. Likewise, the outer two of the lower manifolds 14B feature hanging lugs 58A, 58B affixed to the undersides thereof near the longitudinally opposing front and rear ends of the manifolds. By way of these lugs 58A, 58B, the these outer two of the lower manifolds 14B are pivotably pinned to the front and rear cross members 52A, 52B of the lower linkage assembly 18 via corresponding lugs 60A, 60B affixed to the cross members 52A, 52B. The pivot axes of these pinned connections are parallel to those by which crank arms 50A, 50B are pivotally coupled to the support frame 12. The two outer manifolds of both the upper set of manifolds 14A and the lower set of manifolds 14B are thus each pivotally coupled between the two crank arms 50A, 50B of a respective parallelogram linkage to form the floating coupler link thereof.

In the illustrated embodiment, in which there are three upper manifolds 14A and three lower manifolds 14B, the middle manifold between the two outer manifolds of each set, instead of being pivotally pinned to the front and rear cross-members 52A, 52B, is instead rigidly coupled to the two outer manifolds in a position suspended centrally therebetween by a pair of intermediate cross-members 62 that lie parallel to and between the front and rear cross-members 52A, 52B. These intermediate cross-members 62 are affixed, rather than pivotally coupled, to the two outer manifolds, and are also affixed to the third central manifold therebetween. More particularly, the two intermediate cross-members 62 of the upper linkage assembly 16 are welded to the three upper manifolds 14A at the topsides thereof; while the two intermediate cross-members 62 of the lower linkage assembly 18 are welded to the three lower manifolds 14B at the undersides thereof. This rigid coupling together of all manifolds in each set imparts extra rigidity in the lateral direction to maintain consistent uniform spacing between the manifolds of each set, but it will be appreciated that in other embodiments, the central manifold, or multiple inner manifolds between the two outer manifolds in the case of more than three manifolds per set, may instead be pivotally coupled to the front and rear cross-members 52, 52B in the same or similar manner as the two outer manifolds.

In the illustrated embodiment, each parallelogram linkage further comprises a redundant coupler link 64 lying parallel to the respective outer manifold. This redundant coupler link 64 is pivotally pinned to the front and rear cross-members 52A, 52B on the side thereof opposite the respective outer manifold. The redundant coupler links 64 of the upper linkage assembly 16 reside above the front and rear cross-members 52A, 52B, while the redundant coupler links 64 of the lower linkage assembly 18 reside below the front and rear cross-members 52A, 52B. The redundant coupler links 64 impart additional longitudinal rigidity to the parallelogram linkages beyond that which is provide by the manifolds 14A, 14B themselves, which may simply be rectangular parallelepipeds of relatively thin sheet metal construction as show in the illustrated example. If the manifold construction itself is more robust, the added rigidity impart by the redundant links 64 may be unnecessary.

To control movement of each set of manifolds 14A, 14B via the respective linkage assembly 16, 18, a respective actuator 66, preferably a hydraulic cylinder, is connected between at least one of the crank arms 50A, 50B and the support frame 12 in order to drive movement of the linkage assembly 16, 18. In the illustrated example, all four crank arms 50A, 50B of each linkage assembly is provided with a respective actuator 66 to ensure optimally smooth, balanced movement and consistent alignment during via synchronous control of all the actuators 66. For the front crank arms 50A, each actuator 66 has one end pivotally pinned to the front upper cross-beam 22A of the support frame 12, and the other pivotally pinned to the front crank arm 50A near the distal end thereof. For the rear crank arms 50B, one end of each actuator 66 is pivotally pinned to the rear crank arm 50B near the distal end thereof, and the other end of the actuator is pivotally pinned to a mid cross-beam 22C of the support frame 12 that spans across the top end of the support frame 12 between the header beams 26 at the top ends of the mid posts 30. The actuators 66 of each linkage assembly 16, 18 are operated synchronously, with extension of the actuators moving the respective set of manifolds 14A, 14B into the deployed position penetrating the bale spaces with the aerations spears, and collapse of the of the actuators moving the respective set of manifolds 14A, 14B into the retracted position withdrawing the aeration spears 40 from the bale spaces.

Figure 4:
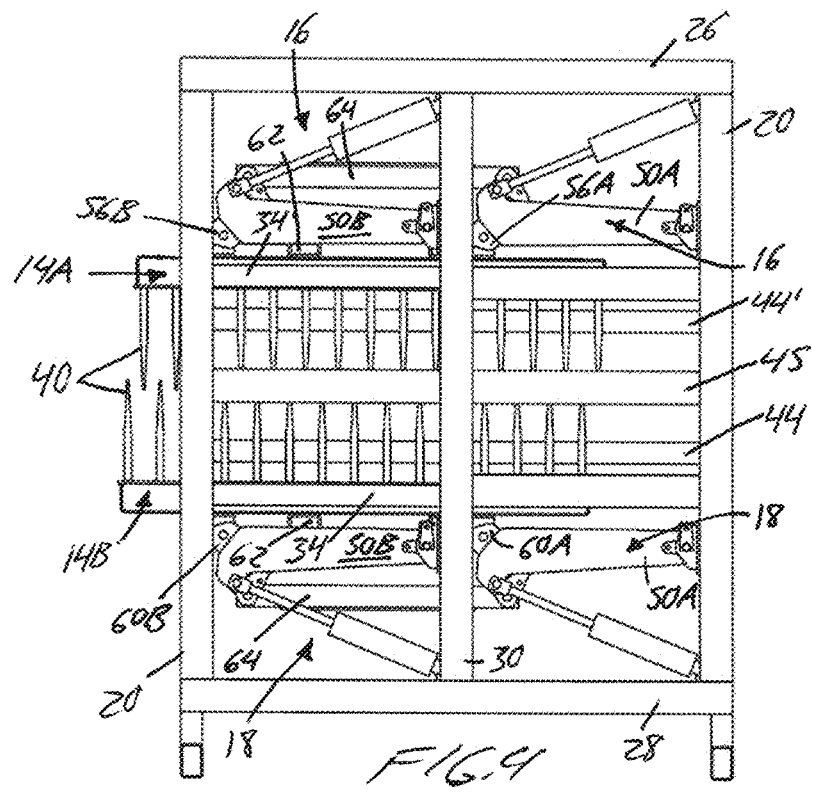
FIG. 4 is a side elevational view of the bale dryer of FIG. 1.
Figure 5:
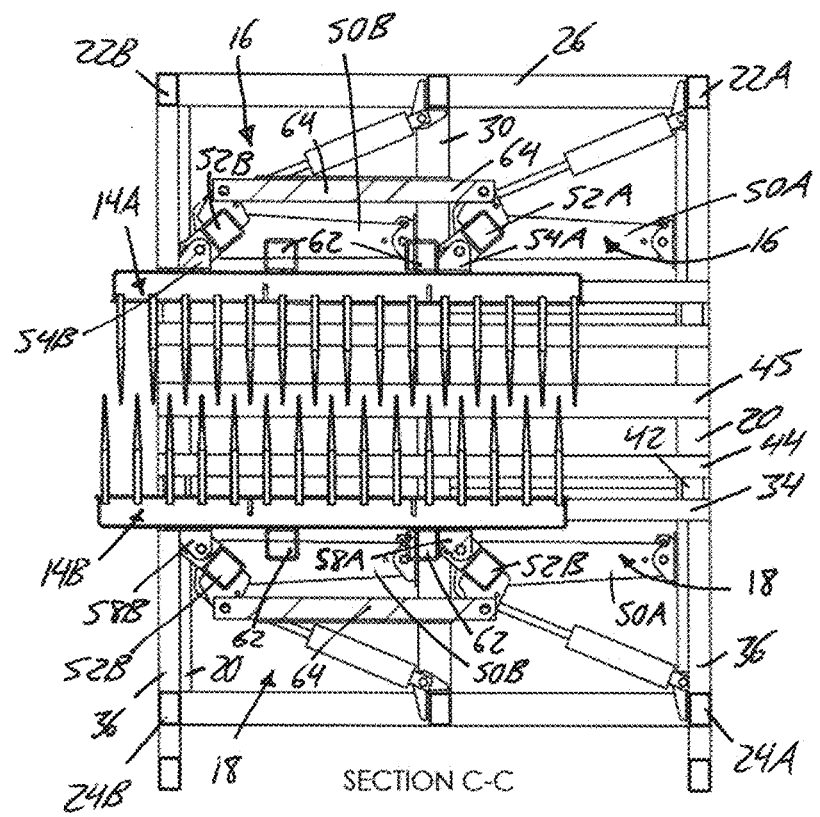
FIG. 5 is a cross-sectional view of the bale dryer of FIG. 3, as viewed along line C-C thereof.
Figure 29:
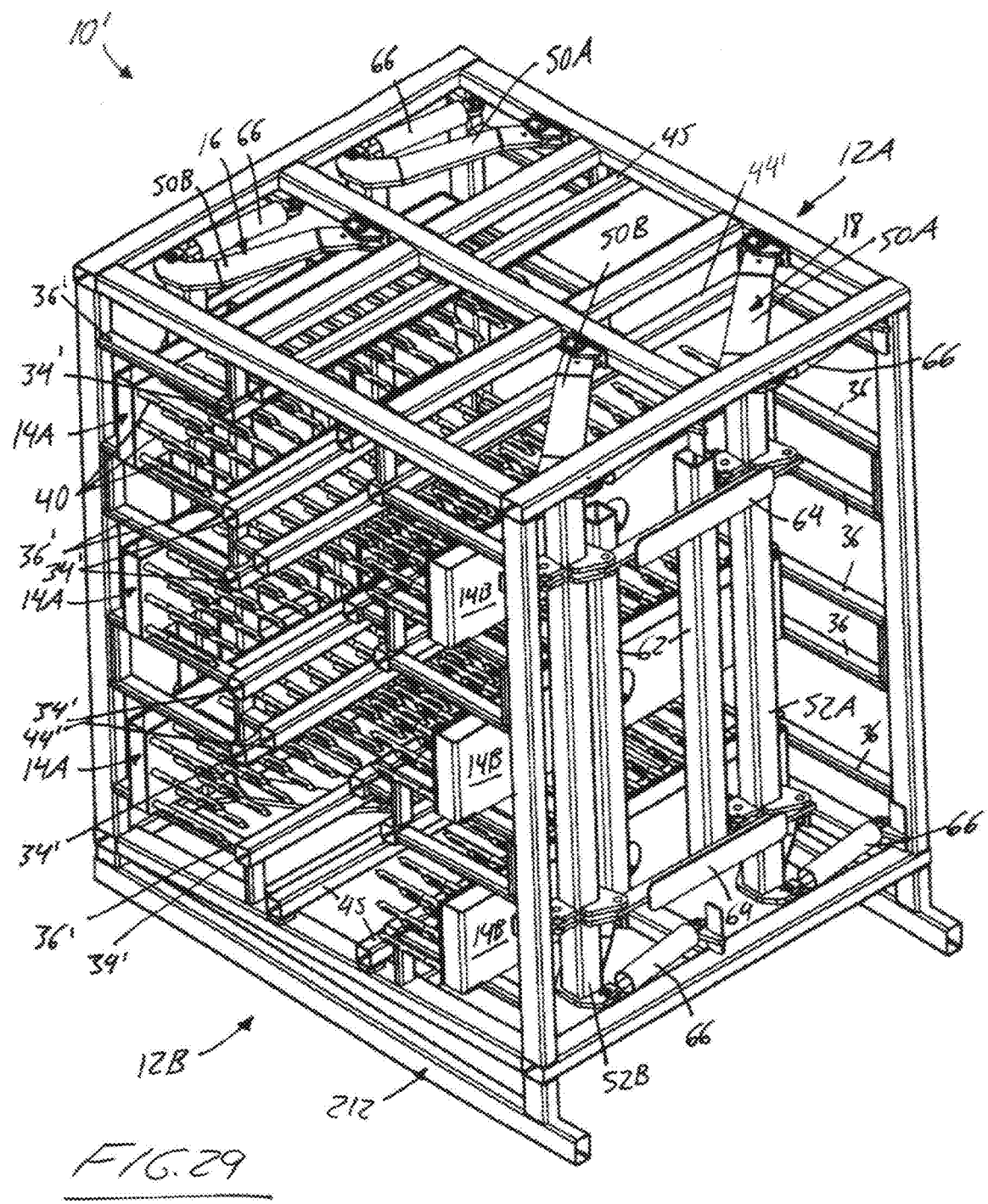
FIG. 29 is a rear perspective view of a bale dryer of a second embodiment of the present invention, showing the bale dryer in the open state for acceptance and release of hay bales thereto and therefrom.
Figure 33:
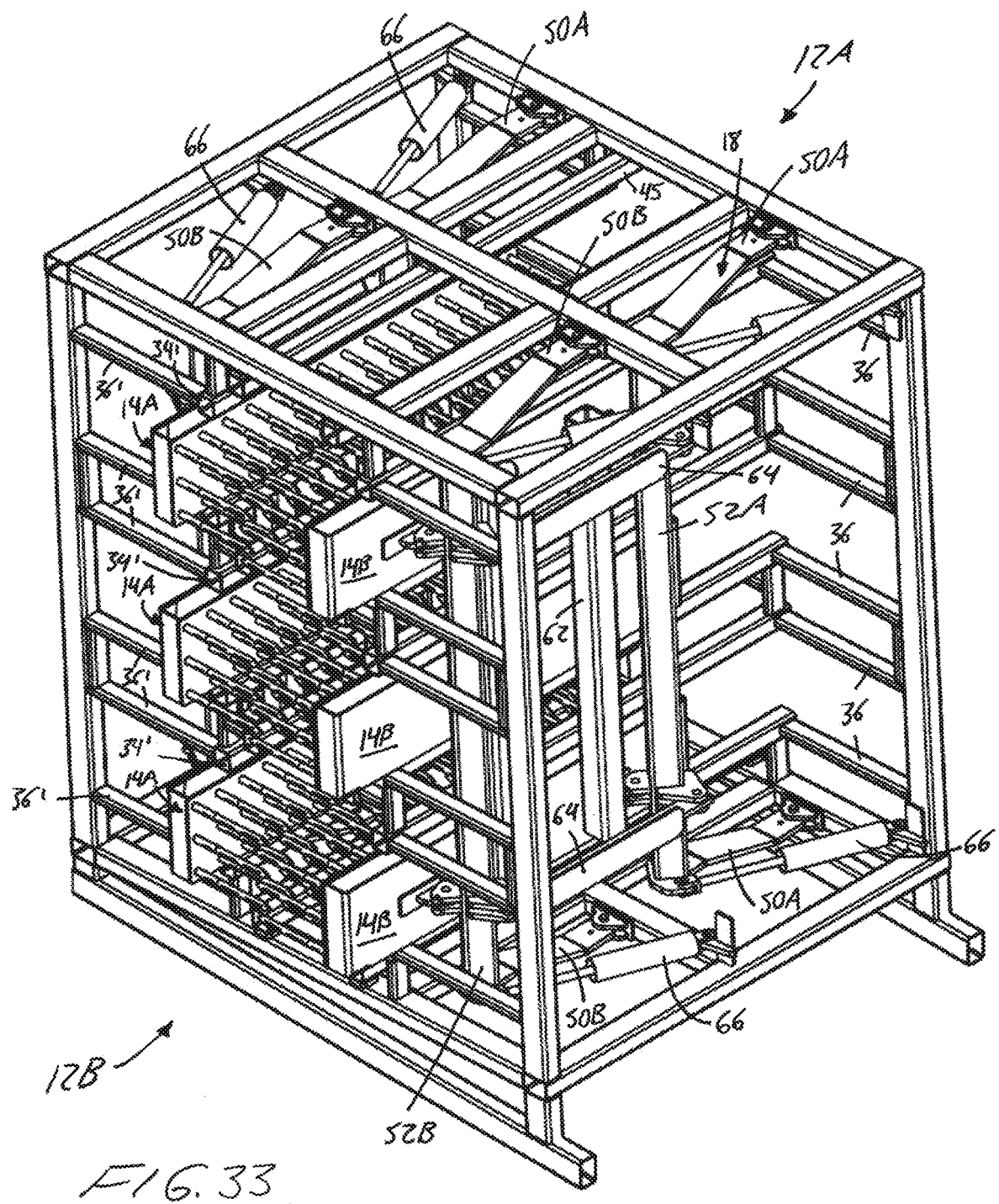
FIG. 33 is a rear perspective view of the bale dryer of FIG. 29, but in the closed state in which the aeration spears penetrate the bales spaces of the dryer for drying of any bales received therein.
Figure 34:
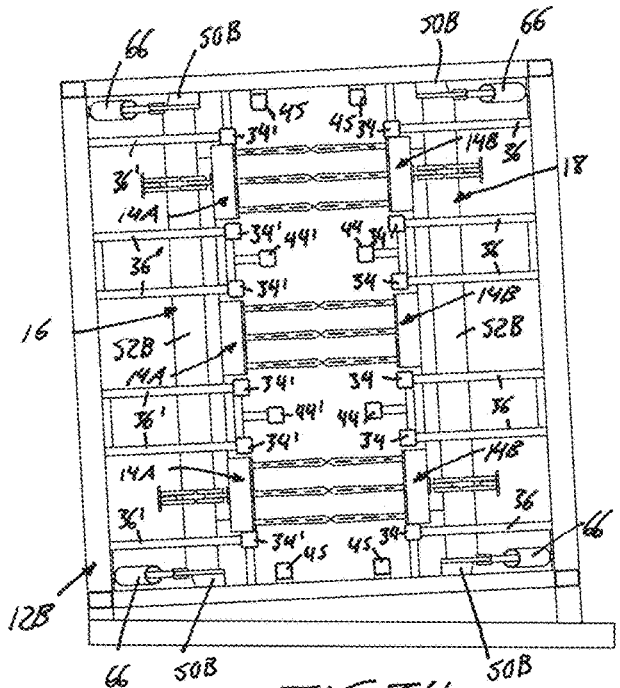
FIG. 34 is a rear elevational view of the bale dryer of FIG. 33.
Figure 35:
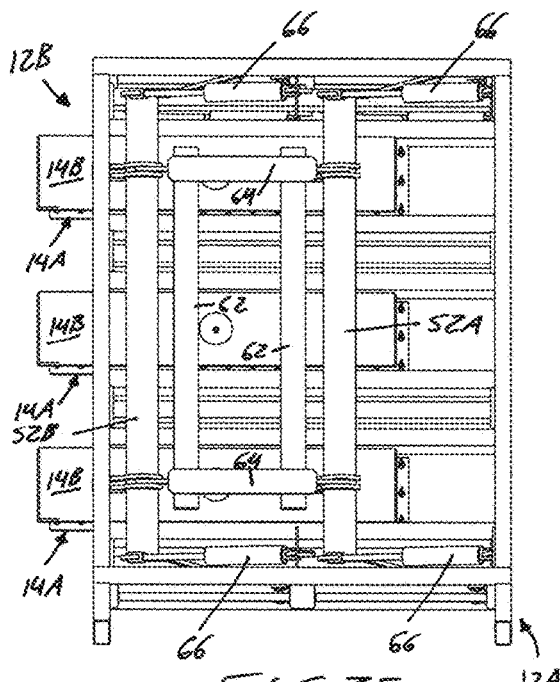
FIG. 35 is a side elevational view of the bale dryer of FIG. 33.
Figure 36:
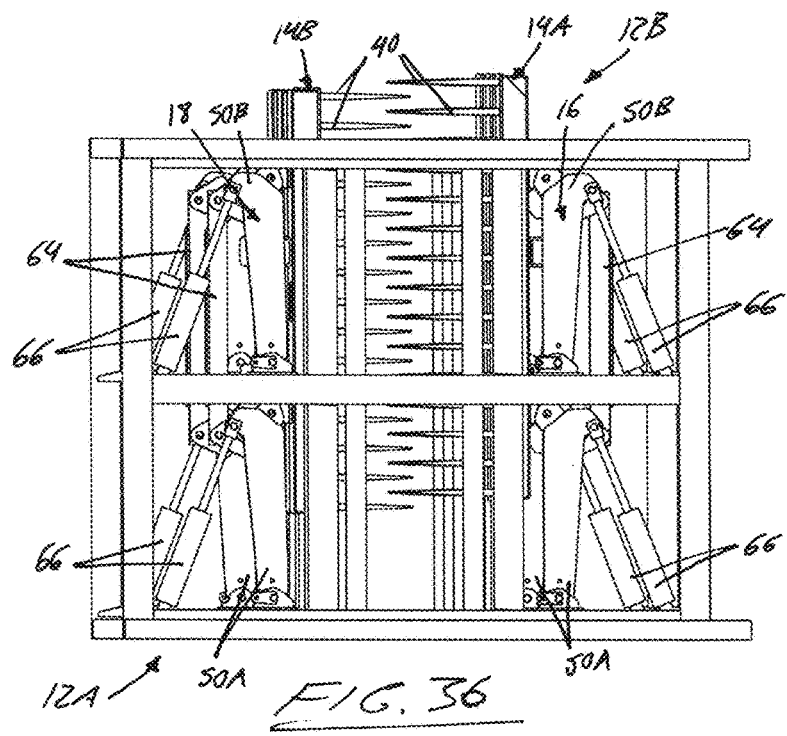
FIG. 36 is a top plan view of the bale dryer of FIG. 33.

Each set of aeration spears 40 are arranged in a rectangular array distributed uniformly over the rectangular underside of an upper manifold 14A, or the rectangular topside of a lower manifold 14B. As best shown in FIGS. 4 and 5, it can be seen that in the closed state of the dryer, where both sets of manifolds are in the deployed positions to penetrate the bale spaces with the spears, the laterally oriented rows of spears on the upper manifolds are offset in the longitudinal direction of the bale dryer from the laterally oriented rows of spears on the lower manifolds by an offset distance equal to half of the row-to-row distance in each array of spears. Such offsetting of the spears of the upper and lower manifolds ensures no impact between the tips of the upper and lower spears during closure of the dryer, while allowing the tips of both sets of spears to reach, and even penetrate slightly through, a horizontal midplane of the bale space for optimal depth penetration into the bale from both the topside and underside thereof for maximum aeration and drying effect. This is best seen in FIG. 5, where the tips of the upper spears can be seen to reach a slightly lower elevation than the tips of the lower spears in the closed state of the dryer. In the illustrate example, the longitudinal offset between the two sets of spears is accomplished by using two identical manifolds of equal spear distribution, but having one of the manifolds of each pair longitudinally offset from the other. In the illustrated example, the lower manifold 14B can be seen to be rearwardly offset from the upper manifold 14A.

As best shown at the topside of the middle upper manifold in the top plan view of FIG. 2, each manifold upper manifold features an air inlet at the topside thereof, where a cylindrical mounting collar surrounds an opening in the top wall of the manifold to enable coupling of a flexible duct or bellows (not shown) to the manifold to feed thereinto from an external fan (not shown). Use of flexible ducts or bellows accommodates movement of the manifolds relative to a more rigid plenum or duct through which the supplied air from the fan may be sourced. The lower manifolds 14B feature the same type of air inlet at the undersides thereof to likewise receive the supplied air via flexible ducts or bellows, where from the same or a different fan source as the upper air manifolds 14A.

FIGS. 9 to 11 illustrate one of the aeration spears 40 in isolation from the rest of the bale dryer 10. The description applied to the singular spear 40 shown in isolation in these figures likewise applies to the other spears shown in the installed context in the bale dryer of FIGS. 1 to 8. The spear 40 comprises a hollow elongated body 70 having a length dimension measured in an axial direction denoted by longitudinal axis L, a width dimension measured in a width direction perpendicularly transverse of said axial direction, and a thickness dimension measured in a thickness direction perpendicularly transverse to both said axial direction and said width direction. The width dimension and thickness dimension can thus be measured in cross-sectional planes lying normal to said longitudinal axis L. The hollow body has a proximal mounting end 70A and a longitudinally opposite distal end 70B, and a hollow interior that spans the entire length dimension between said proximal and distal ends 70A, 70B, and is open at said proximal end 70A.

The cross-sectional shape of the elongated body 70 varies over the length thereof. A cylindrical portion 74 of the elongated body 70 spans a partial length thereof, preferably less than 50% of the overall length, starting from the proximal end 70A. A tapered remainder 76 (the "tapered section") of the elongated body spans longitudinally from the cylindrical portion 74 to the distal end 70B, and is made of up two distinct subsections: a tapered intermediate subsection 78 that joins with the cylindrical portion and grows narrower in the thickness dimension and wider in the width dimension toward the distal end 70B, and a tapered distal subsection 80 that continues longitudinally from the intermediate section to the distal end 70B, and grows narrower in both the thickness and width dimensions. The tapered distal subsection 80 tapers to a point at the distal end 70B of the elongated body, which denotes a penetrating end of the spear 40 that penetrates into the hay bale during use of the bale dryer.

In the illustrated example, the angle at which the thickness of the spear is tapered (the "thickness taper) is uniform among the two subsections, while at the distal subsection 80, the angle at which the width of the spear is tapered (the "width angle") is more aggressive than the thickness taper. The two opposing sides of the elongated body in the thickness direction are in close adjacency or abutting contact with one another at the distal end 70B, and may be welded together to close off the hollow interior of the elongated body 70 at this distal end 70B. The widest point of the elongated body 70 resides at the meeting place of the intermediate and distal subsections 78, 80, from which the distal subsection 80 then narrows in width to a terminal point at the distal end 70B. In the axial direction, the intermediate subsection 78 spans a greater fraction of the tapered section 76 than the distal subsection 80.

Unlike prior art bale dryers whose spikes or needles feature a solid conical tip fitted onto a separate cylindrical pipe to form the penetrating end, the presently disclosed spear thus incorporates a relatively flattened, sword-like pointed tip for penetrating into the hay bale. In the installed position of each spear 40 in the bale dryer 10, where the longitudinal axis of the spear lies generally vertically, and the cross-sectional planes in which the width and thickness dimensions are measured thus lie generally horizontally, the spear 40 is oriented so that the width dimension of the spear 40 lies in the lateral direction of the bale dryer 10, and the thickness dimension of the spear lies in the longitudinal travel direction of the bale dryer 10. The width dimension of the spear 40 thus lies parallel to the horizontal width dimension of the rectangular bales fed into the bale dryer 10, while the thickness dimension of the spear lies parallel to the length dimension (i.e. the longest dimension) of the rectangular bales. Since the width of the spear 40, i.e. the dimension of the elongated body 70 embodying the larger of its two cross-sectional dimensions, lies parallel to the width of the bale, and the thickness of the spear 40, i.e. the dimension in which the body is substantially flattened at the distal end 70B, lies parallel to the length the bale, the thin distal end 70B of the spear can effectively penetrate the hay bale with less likelihood of bale breakup at the areas where adjacent flakes of the bale meet one another.

The proximal end 70A of the hollow elongated body 70 is an open end, which in the installed position of the spear 40 on one of the air manifolds 14A, 14B of the dryer communicates with an interior space of the manifold 14A, 14B. Accordingly, a stream of forced air is induced into to the hollow interior of the elongated body 70 when the air manifold is pressurized by the connected fan. The wall of the hollow elongated body 70 features a plurality of apertures therein at longitudinally distributed locations over the length thereof appropriately positioned so as to reside within the hay bale when the spear is fully penetrated thereinto in the fully deployed position of the air manifold. In the first illustrated example, the apertures 82 are slot-like apertures of elongated shape in the axial direction of the spear 40, include apertures at the cylindrical portion 74 and tapered intermediate subsection 78 of the spear 40, and are positioned particularly at the two sides of the elongated body 70 that oppose one another in the thickness dimension, though the shape, quantity, distribution and location of apertures may vary. As mentioned previously, the hollow elongated body 70 may be welded or otherwise sealed shut at the distal end 70B thereof, whereby all forced air introduced into the body 70 is forced to escape through the apertures 82 in the sides of the elongated body 70.

The proximal end 70A of the elongated body 70 features a tapered external thread, as shown at 84, thereby forming a coupling portion for attaching the spear 40 to one of the air manifolds of the finished bale dryer 10 via cooperating mounting components, one optional arrangement of which can be seen in FIGS. 9 to 11. The illustrated mounting components include an internally threaded nut 86 for sliding receipt over the proximal end 70A of the elongated body 70 past the external threading 84 thereof to a neighbouring smooth-walled area of the cylindrical portion 74, a tapered sleeve 88 for likewise sliding over the proximal end 70A of the elongated body 70 past the external threading 84 thereof to the smooth-walled area, and a fitting 90 for welded attachment to either the bottom wall of an upper manifold 14A, or the top wall of a lower manifold 14B. The fitting 90 has an externally threaded first end of compatible thread type for mating with the internal threading of the nut 86. This externally threaded end of the fitting 90 has a smooth-walled (i.e. non-threaded) internal taper that narrows toward an opposing second of the fitting. Beyond this smooth walled taper, closer to the second end of the fitting, the fitting has a tapered internal thread for mating with the externally threaded proximal end 70A of the elongated body 70. Tightening of the fitting's threaded connections to both the elongated body 70 and the nut 84 forms a first seal at the tapered threads, and a second seal where the tapered sleeve 88 is compressed between the smooth walled cylindrical area of the elongated body 70 and the smooth-walled internal taper of the fitting, thereby securing the spear 40 to the air manifold 14A, 14B in an air-tight manner. This is of course only one possible example of how the spear may be suitably coupled to the air manifold to receive airflow therefrom for the purpose of injecting fan-supplied drying air into the bales.

To form the uniquely shaped hollow elongated body 70 of the aeration spear 40, a pipe of initially cylindrical shape throughout its full length, and having the tapered external threading 84 at one end, has a partial span of its overall length deformed via one or more hydraulic press operations in which two opposing sides of the pipe's initially uniform cylindrical shape are squeezed together to create the tapered section 76 of the spear. Preferably this is performed using cooperating dies having working surfaces whose angular orientation to one another matches the desired thickness taper of the finished spear 40, though a gradual tapering process may alternatively be employed through stepwise repetition of press operations performed in a distally moving direction toward a terminal end of the initially cylindrical pipe, and increasing in the amount of press force applied at each step in order to displace the opposing sides of the pipe closer together toward said terminal end, until the opposing sides of the pipe are in abutting contact or closely adjacent relationship at the terminal end in order to form the flattened distal penetrating end of the finished spear 40.

In the same pressing operation flattening the terminal end of the pipe, or in a separate punching or cutting process, the terminal portion of the pipe immediately adjacent this terminal end is trimmed in converging fashion toward the terminal end, thus creating the pointed tip of the tapered distal subsection 80 of the finished spear 40, which may then be welded shut, as mentioned previously. Before or after the press-based deformation of the pipe, the elongated slots or other apertures 82 are cut in the opposing side walls thereof. During the pressing operation(s), the externally threaded end of the pipe and a neighbouring smooth-walled portion of the pipe is not subjected to any press force, and thereby retains its original cylindrical form to define the non-deformed cylindrical portion 74 of the finished spear 40, from which the deformed remainder 76 of the originally cylindrical pipe tapers in thickness toward the flattened distal penetrating end 70B.

FIGS. 15A through 15I show numerous variants on the spear and/or its mounting components. Referring to the cross-sectional views of FIGS. 15A through 15C, variations of the mounting componentry include use of a threaded fitting 90' alone without an accompanying nut 86 and sleeve 88 (FIG. 15A); use of a threaded fitting 90" again without an accompanying nut 86 and sleeve 88, but adding a set screw 92 that penetrates through a radial bore in the fitting 90" to prevent loosening of the threaded connection between the spear and fitting (FIG. 15B); or use of a threaded fitting 90''' with an accompanying nut 86' and sleeve 88', but reversing the taper direction of the sleeve 88' and accordingly moving and reversing the smooth-walled internal taper responsible for the sleeve compression from the fitting to the nut 86' (FIG. 15C).

FIGS. 15D and 15E show that the relative lengths of the cylindrical portion 74, tapered intermediate subsection 78 and tapered distal subsection 80 may be varied. In the first example (FIG. 15D), the length of the cylindrical portion 74 is minimized and the length of the tapered section 76' is maximized by increasing the length of the tapered intermediate subsection 78'. In the second example (FIG. 15E), the length of the tapered section 76" is minimized by reducing the length of the tapered intermediate subsection 78"', for example to a length lesser than that of the cylindrical portion 74", and optionally lesser than that of the tapered distal subsection 80. So, whereas in FIGS. 12 to 14, the tapered section 76 spans more than 50% but less than 75% of the overall spear length (about 65% in the illustrated example), the longer tapered section 76' in FIG. 15D spans more than 75% of the overall spear length (about 90% in the illustrated example), and the shorter tapered section 76" in FIG. 15E spans less than 25% of over the overall spear length (about 10-15% in the illustrated example).

FIGS. 15F through 15I illustrate how the shape, size and locations of the apertures 82 in the spear 40 may be varied, for example employing round apertures 82' (FIG. 15F) rather than slot-shaped apertures, employing a larger quantity of shorter slot-shaped apertures 82" (FIG. 15G), positioning the apertures 82" at opposing sides of the elongated body 70 in the width direction instead of the thickness direction (FIG. 15H), or distributing the slots at different locations circumferentially around the elongated body so as to occupy opposing sides in both the width and thickness directions (FIG. 15I).

FIGS. 16 through 25 illustrated a bale feeding table 110 for feeding bales into the above described bale dryer. The feeding table 110 features a framework structure 112 defining a number of elongated feed lanes of equal quantity to the number of bale spaces in the bale dryer 10, hence their being three feed lanes 114A, 114B, 114C in the illustrated example in order to respectively feed bales into the three bale spaces of the bale dryer 10. A bottom plane of each lane is defined by a respective track composed of a pair of parallel elongated track rails 116 running in a longitudinal travel direction, which matches the longitudinal travel direction of the dryer. The track rails 116 span a full length of the framework structure 112 in said longitudinal travel direction, thus spanning from a proximal end 112A of the table 110 that resides adjacent the front end 12A of the bale dryer 10 when the feeding table 110 is installed in working relation thereto, all the way to an opposing distal end 112B of the table 110 that resides distally opposite the bale dryer 10 in the installed state of the feeding table 110. The elevation of, and the spacing between, the track rails 116 of the feeding table 110 matches those of the holder rails 34 of the bale dryer's three bale holders 32. The track rails 116 serve the same purpose as the holder rails, thus allowing seated support of the bales on the track rails 116, as well as sliding displacement of the bales thereatop.

The framework structure 112 features three ground leg assemblies seated on the ground in order to support the track rails 116 in spaced elevation thereover at longitudinally spaced positions along said track rails 116. A proximal leg assembly 118A resides at the proximal end 112A of the framework structure 112, a distal leg assembly resides at the distal end 112B of the framework structure 112, and a middle leg assembly 118C resides approximately midway between the proximal and distal leg assemblies. Each leg assembly features a pair of upright ground legs 120 disposed at laterally opposite sides of the framework structure 112, and one or more lower cross-beams 122 spanning laterally between the two upright legs 120. The outer two lanes 114A, 114C that reside adjacent the two laterally opposing sides of the feeding table 110 each have one their two track rails 166 mounted atop the ground legs 120 that reside at the respective side of the framework structure 112. The other track rails 116 are mounted atop respective rail support posts 124 that stand upright from the cross-beams 122 of the leg assemblies.

Like the buffer rails 44 of the bale holders 32 in the bale dryer 10, the feeding table 110 likewise feature buffer rails 126 running parallel to the longitudinal track rails 116 at a slightly greater elevation thereabove at positions between adjacent track rails 116 of adjacent lanes of the feeding table. These buffer rails 126 are supported in the same manner as those of dryer, by small uprights 127 mounted atop short stub-like cross-members 128 connected between the adjacent track rails 116 of adjacent lanes. Also like the bale dryer 10, the feeding table 110 features a pair of outer guide rails 130 running parallel to the buffer rails 126 at the opposing lateral sides of the feeding table. Accordingly, the bales placed on the track rails 116 in each outer lane 114A, 114C are laterally constrained between the respective outer guide rail 130 and a respective one of the buffer rails 126, while the bales placed on the track rails 116 in the center lane 1146 are laterally constrained between the two buffer rails 126. The outer rails are shown schematically without mounting details, but may be attached to the nearest track rail 116, or to the set of ground legs at the respective side of the framework structure 112, by any suitable support means.

Each lane 114A, 114B, 114C is equipped with a respective bale mover 132 operable to move a respective group of bales queued in that lane in an advancing direction through said lane toward the proximal end 112A of the feeding table 110, and into the bale dryer through the neighbouring front end 12A thereof. In this embodiment, each bale mover 132 has two distinct modes of bale engagement, each performed by a respective movable engagement unit of the bale mover, namely a bale lifter 134 responsible for lifting of one or more queued bales upwardly off of the track rails 116 of the respective lane, and a bale pusher 136 responsible for pushing of a leading bale into the bale dryer from the proximal end 112A of the feeding table 110.

The bale lifter 134 comprises a narrow and elongated lifting platform 138 spanning longitudinally of the respective lane within the laterally measured horizontal space between the two respective track rails 116 of the lane. The lifting platform is movable between a lowered position residing at an elevation below the lane's bottommost plane, which is denoted by the coplanar topsides of the two track rails, and a raised position residing at an elevation slightly above this bottommost plane of the lane. Accordingly, the bale lifter's lowered position places it entirely outside, and more particularly below, the respective lane; while the bale lifter's raised position protrudes upwardly into the respective lane to engage with the underside of one or more queued bales of that lane to lift said bale(s) up off the track rails 116. The raised position of the lifting platform 138 thus denotes a working position of physical engagement with one or more bales.

The bale movers 132 share a common movable subframe 140 that carries both the bale lifter 134 and the bale pusher 136 of each bale mover 132. This subframe 140 is longitudinally displaceable relative to the framework structure 112 below the track rails 116 thereof. The subframe of the illustrated example has a skeletal box structure, of which a proximal end 140A resides between the proximal and middle leg assemblies 118A, 118C of the table's framework structure 12 in a proximal section thereof, while a distal end 140B of the subframe's skeletal box structure resides between the distal and middle leg assemblies 118B, 118C in a distal section of the table's framework structure 12. Bottom longitudinal rails 141 of the subframe 140 are supported in longitudinally slidable fashion, for example atop a set of skid plates that are mounted atop a pair of longitudinal support rails 142 that span between the proximal and distal leg assemblies 118A, 118B atop the lower cross-beams 122 thereof at respective positions beneath the two outer lanes 114A, 114C. The lifting platform 138 of each bale lifter 134 resides above the subframe 140 and spans the full length thereof in the longitudinal direction. Each lifting platform 138 is supported near its proximal end by a respective upright arm 144A of an output link of a proximal lifting linkage 146A that is mounted to the subframe near the proximal end 140A thereof. The opposing distal end of each lifting platform 138 is supported by a respective upright arm 144B of a matching distal lifting linkage 146B that is mounted to the subframe near the distal end 140B thereof. The three upright arms 144A, 144B of the output link of each lifting linkage 146A, 146B are rigidly coupled together by a cross-bar 148 of the output link that lies in the lateral direction of the feeding table 110 (i.e. horizontally perpendicular to the longitudinal travel direction thereof), and is pivotally pinned to the two bottom longitudinal rails 141 of the subframe.

With reference to FIG. 26, at least one of the two lifting linkages 146A, 146B is driven by a respective actuator, for example a hydraulic cylinder 147 that has one end pivotally coupled to a respective one of the bottom longitudinal rails 141 of the subframe 140 via a mounting bracket on an inner side thereof, and the other end pivotally coupled to an input link 149 of the lifting linkage that is pivotally coupled to the bottom longitudinal rails 141 of the subframe. The input link in the illustrated example features a lever arm 149A that is situated just inside the respective bottom longitudinal rail 141 of the subframe, and to which the hydraulic cylinder 147 is pivotally pinned. A cross-beam 149B of the input link has its opposing ends pivotally pinned to the two bottom longitudinal rails 141 of the subframe 140 via mounting lugs 141A mounted thereatop, thereby forming the input link's pivotal connection to the subframe 140.

Extension of the hydraulic cylinder 147 pivots the input link 149 on one direction forcing the upright arms 144A of the output link upward to lift the respective end of the lifting platforms 138, while collapse of the hydraulic cylinder 147 pivots the input link 149 in the reverse direction lowering the upright arms 144A of the output link back down to lower the respective end of the lifting platforms 138. If both lifting linkages having respective hydraulic cylinders 147, these cylinders are operated in synchronous fashion so that both ends of the platforms 138 are likewise lifted and lowered in synchronous fashion to maintain a horizontal orientation of the lifting platform 138 throughout its movement between the lowered and raised positions. In the illustrated example however, only one of the two lifting linkages is powered by a respective hydraulic cylinder, and a connecting link 150 is pivotally pinned between the input links 149 of the two lifting linkages 146A, 146B to cause the synchronous movement thereof.

The cross-beam 148 of each lifting linkage's output link is pivotally pinned to the lever arms 149A of the input link via a pair of coupling lugs affixed to the underside of the cross beam 148. The pivotally pinned connection between the lever arms 149A of the input link 149 and the coupling lugs of the output link resides above the pivotally pinned connection of the lever arms 149A to the mounting lugs 141A of the subframe 140. The pivotally pinned connection between the hydraulic cylinder 147 and the respective lever arm 149A is below the pivotally pinned connection between the lever arms 149A and the mounting lugs 141A. Accordingly, extension of the hydraulic cylinder 147 raises the output link and attached lifting platforms 138, while collapse of the hydraulic cylinder 147 lowers the output link and attached lifting platforms 138.

The proximal lifting linkage 146A resides in the proximal section of the framework structure 112 with the proximal end 140A of the subframe 140, and the distal lifting linkage 146B resides in the distal section of the framework structure 112 with the distal end 140B of the subframe 140. In addition to the one or more hydraulic cylinders 147 actuating the lifting linkages (the "lifting cylinder(s)"), an additional hydraulic cylinder 152 of substantially greater length is operable to longitudinally displace the subframe 140 back and forth along the tracks of the three lanes, and is therefore referred to as the "displacement cylinder" 152. The displacement cylinder has one end coupled to the distal leg assembly 118B in the distal section of the framework structure 112, and the other end coupled to the subframe 140 near the proximal end 140A thereof in the proximal section of the framework structure 112. The reach of the displacement cylinder 152 from one section of the framework structure to the other is accommodated through a suitably placed opening in the middle leg assembly 118C.

FIGS. 16 to 19 show the subframe 140 and the three bale movers 132 carried thereby in a starting position with the distal end 140B of the subframe 140 residing closely adjacent the distal end 112B of the framework structure 112, and with the proximal end 140A of the subframe 140 residing closely adjacent the middle leg assembly 118C at the approximate longitudinal midpoint of the framework structure. Extension of the displacement cylinder 152 moves the subframe and attached bale movers 132 in the advancing direction toward the proximal end 112A of the framework structure 112. FIGS. 20 to 25 show the subframe 140 and the three bale movers 132 carried thereby in a fully advanced position achieved by full extension of the displacement cylinder 152, with the proximal end 140A of the subframe 140 residing closely adjacent the proximal end 112A of the framework structure 112, and with the distal end 140B of the subframe 140 residing closely adjacent the middle leg assembly 118C. FIGS. 23 to 25 also show the bale lifters 134 in the raised position with the lifting platforms 138 situated above the track rails 116 in order to lift queued bales upwardly therefrom, whereas FIGS. 16 to 22 show the bale lifters 134 in the lowered position which leaves the queued bales seated on the track rails 116.

The bale pusher 136 of each bale mover 132 comprises a spring-loaded pusher arm 160 pivotally pinned to a respective proximal extension 162 of the subframe 140. Each extension 162 protrudes longitudinally from the proximal end 140A of the subframe, and thereby protrudes beyond the proximal end 112A of the feeding table 110 through an open proximal end of the respective lane when the subframe 140 is in the fully advanced position. In this position, the subframe extension 162 thus also reaches through the front end 12A of the bale dryer 10 into an open space left between the holder rails 34 of the respective bale holder 32 and in front of the respective lower manifold 14B. The pusher arm 160 is rotatably journaled on a small stub shaft that spans in the lateral direction between two sides of the respective subframe extension 162. The pusher arm 160 is spring biased into a default working position angling obliquely upward from the subframe extension 162 in a direction sloping upwardly away from the subframe 140, and reaching an elevation greater than that shared by the topsides of the feeding table's track rails 116 and the bale dryer's holder rails 34.

In this default working position, the pusher arm 160 is operable during advancement of the bale movers 132 to push on the distal/trailing end of any bale that leads the pusher arm 160 in the advancing direction, thereby pushing such bale initially toward the proximal end 112A of the feeding table, and eventually off this end of the feeding table 110 and into the bale dryer 10. As shown, the pusher arm 160 may carry a smaller pusher bar 164 lying cross-wise thereto at the working end thereof that resides in the lane and bale space in the working position of the bale pusher in order to increase the contact area with the bale to ensure the bale pusher pushes, rather than penetrates, the distal/trailing end of the bale during advancement of the bale mover 132. The illustrated bale pushers thus have a T-shaped configuration created by the combination of the pusher arm and cross-wise pusher bar.

Having described the feeding table 110, attention is now turned to its use, as illustrated in FIGS. 28A to 28S. These figures also illustrated how multiple dryers may be placed in longitudinal series with one another, with the rear end of a first dryer 10A fed by the feeding table 110 being placed in adjacent and communicating relation with the front end of a second dryer 10B in order to form a multi-dryer setup of greater capacity than the single dryer 10 of the earlier figures, but while using only a singular shared feeding table 110. A third dryer may be subsequently added in series with the second dryer at the rear end thereof, and so on.

Firstly, it is pointed out that the feeding table 110 in the illustrated example has an overall length exceeding the collective length of three rectangular hay bales, but optionally less than the collective length of four rectangular hay bales, to enable three hay bales to be seated on the track rails of each lane with the bale lengths oriented longitudinally of the feeding table 110 so as to lie in end-to-end relation to one another, but with some clearance space left between them. In this example of a three-bale lane capacity, the length of the lifting platform 138 in each lane exceeds the collective length of two bales, but is less than three hay bales, to enable lifting of two adjacent bales in the respective lane by the lifting platform. The length of the lifting platform 138 is therefore approximately two-thirds of the overall length of the feeding table, as measured between the proximal and distal ends 112A, 112B of its framework structure 112.

Referring to FIG. 28A, three bales $B_1$, $B_2$, $B_3$ are queued in each lane atop the track rails 116 thereof, of which the bale nearest to the dryers is referred to as the first bale, followed by the second bale, which in turn is followed by the final third bale of the queued group. With the three bale movers 132 in the starting position, the lifting platform of each bale mover thus underlies the second and third bales $B_2$, $B_3$ nearest to the distal end 112B of the feeding table 110. The second and third bales may also be referred to as "trailing" bales, distinguished the first "leading" bale $B_1$ that is nearest to the proximal end 112A of the feeding table 110, and will thus will lead the remaining "trailing" bales in the advancing direction into the dryers. FIG. 28A represents a "ready" state of the feeder/dryer setup, where a current group of three bales $B_1$, $B_2$, $B_3$ are queued in each lane of the feeding table 110 and the dryers 10A, 10B are both in their open state with all manifolds thereof in their retracted positions ready to accommodate entry of bales into the bale spaces. The three locations along each lane at which the three bales reside at this ready state are referred to as sequential queuing "spots" through which the bales will be indexed forwardly in sequential fashion toward and into the dryers.

At the first step shown in FIG. 28B, the lifting platforms 138 of the bale mover 132 are lifted into their raised working positions by extension of the lifting cylinder(s) 147, whereby the lifting platforms 138 engage the undersides of the second and third bales $B_2$, $B_3$ in each lane, and lift these trailing bales $B_2$, $B_3$ up off the track rails 116 of the feeding table. Next, with reference to FIG. 28C, the three bale movers 132 are displaced in the advancing direction by extension of the displacement cylinder 152, during which the bale pushers 136 push the leading first bale $B_1$ of each lane toward and subsequently past the proximal end 112A of the feeding table into the respective bale space of the first dryer 10A through the front end 12A thereof. Meanwhile, the two trailing bales $B_2$, $B_3$ on the raised lifting platform 138 of each bale lifter are likewise advanced toward the dryer by this displacement of the bale movers 132, thus moving each of these bales one spot closer to the dryers 10A, 10B.

Having fed the leading first bales $B_1$ into the first dryer 10A, the bale movers 132 then need to be reset back to the starting position. First, with reference to FIG. 28D, the lifting platforms 138 of the three bale movers are lowered back down by collapse of the lifting cylinder(s) 147 to withdraw the lifting platforms 138 from their respective lanes, thus reseating the two trailing bales $B_2$, $B_3$ of each lane back onto the track rails 116 thereof. The lowered position of the bale lifters 134 is thus also referred to as a reset position thereof, as it enables to the bale movers 132 to be reset back to the starting position without moving or otherwise disrupting the trailing bales $B_2$, $B_3$ that were just seated back on the track rails 116 after their initial advancement atop the lifting platform 138. Turning to FIG. 28E, the displacement cylinder 152 is collapsed, thus pulling the subframe 140 and three bale movers 132 back toward the starting position adjacent the distal end 112B of the feeding table 110, during which the bale pushers 136 are pulled back against the leading ends of the second bales $B_2$ of the three lanes. This causes pivoting of each bale pusher 136 downwardly against its biasing spring force, until the bale pusher 136 clears the bottom perimeter edge of the leading end of the second bale $B_2$ of the respective lane. As a result, the bale pusher 136 can subsequently ride along the underside of the second bale $B_2$ during continued retraction of the bale movers 132, as shown in FIG. 28F.

As shown in FIG. 28G, as retraction of the bale movers 132 back toward the starting position continues, the bale pushers 136 pop back up into their respective lanes as they clear the trailing ends of the second bales $B_2$. Meanwhile, at anytime during the steps shown in FIGS. 28C through 28G, a new fourth bale $B_4$ (i.e. the leading bale of a next group of three bales, which in the drawings distinguished from the first group of bales by way of broken line illustration) has been loaded into each lane at the distalmost spot thereof that was opened up during the first advancement of the bale movers 132 in FIG. 28C. Turning to FIG. 28H, once the bale movers 132 have been fully returned to the starting position, the bale lifters 134 are actuated again by extension of the lifting cylinder(s) 147 to lift the third bale $B_3$ (i.e. the final bale of the original group of three) of each lane again, this time together with the newly added fourth bale $B_4$.

As shown in FIG. 28I, the bale movers 132 are advanced once again by extension of the displacement cylinder 152, which causes the bale pushers 136 to push the three second bales $B_2$ into the first dryer 10A, which in turn push the three leading first bales $B_1$ onward through the first dryer 10A and into the three bale spaces of the second dryer 10B. Meanwhile, this second advancement of the bale movers 132 also carries the third and fourth bales $B_3$, $B_4$ of each lane one spot forward on the feeding table 110, thus moving the third bale $B_3$ of each lane into the proximal spot thereof nearest to the dryers 10A, 10B, and also moving the fourth bale $B_4$ of each lane into the intermediate spot next closest to the dryer. At this point, all bale spaces in the two dryers 10A, 10B are now occupied by respective bales $B_1$, $B_2$, and so the spear-equipped air manifolds 14A, 14B of the two dryers are moved to their deployed positions by extension of the linkage actuators 66, thereby driving the aeration spears 40 into penetrating relation to the received bales $B_1$, $B_2$, as shown in FIG. 28J. At this point, the one or more fans feeding the forced air to the manifolds 14A, 14B of the two dryers 10, 10B are activated, and left running for a drying cycle of selected or predetermined duration.

As the drying cycle runs, the bale lifting platforms 138 are once again lowered by collapse of the lifting cylinder(s) 147, as shown in FIG. 28K, thus lowering the third and fourth bales $B_3$, $B_4$ of each lane back onto the track rails 116 of the feeding table 110. The bale movers are then again reset back to the starting position by collapsing the displacement cylinder 152, as shown in FIG. 28L. During this retraction, the bale pushers 136 are once again deflected down into their lowered reset positions by contact with the leading ends of the third $B_3$, and then allowed to run along the undersides thereof. As shown in FIG. 28M, once the bale movers 132 have fully returned to their starting position, completion of the drying cycle is awaited. Meanwhile, at anytime during the steps shown in FIGS. 28I through 28M, a new fifth bale $B_5$ (i.e. the second bale of the second group of three) is loaded into each lane at the distalmost spot thereof that was opened up during the second advancement of the bale movers 132 in FIG. 28I.

Turning to FIG. 28N, once the first drying cycle is complete, the fan(s) is/are turned off to discontinue the forced air supply to the manifolds 14A, 14B and aeration spears 40 of the dryers 10, 10B, and the manifolds are moved back to their retracted positions by collapse of the linkage assembly actuators 66, thereby withdrawing the aeration spears 40 from the dried bales $B_1$, $B_2$ and reopening the dryers. Also at this stage, the lifting platforms 138 of the bale movers 132 are once again lifted into their raised working positions by extension of the lifting cylinder(s) 147, whereby the lifting platforms 138 engage the undersides of the fourth and fifth bales $B_4$, $B_5$ in each lane, and lift these bales $B_4$, $B_5$ up off the track rails 116. Next, turning to FIG. 28O, the bale movers 132 are once again advanced by extension of the displacement cylinder 152, during which the bale pushers 136 push the third and final bales $B_3$ of the first group off the proximal end 112A of the feeding table 110 and into the bales spaces of the first dryer 10A. This in turn pushes the leading first bale $B_1$ of each lane out of the second dryer 10B at the rear end 12B thereof, where a receiving table of matching lane quantity to the feeding table (but lacking the bale movers thereof) may be positioned to accept discharged bales from the dryers. This same displacement of the bale movers 132 advances the fourth and fifth bales $B_4$, $B_5$ of each lane to the proximal and intermediate spots thereof, whereupon the lifting platforms 138 of the three bale movers 132 are lowered back down to reseat the fourth and fifth bales $B_4$, $B_5$ at these newfound spots.

Though at this time all bale spaces of the two dryers 10A, 10B are occupied by respective bales $B_2$, $B_3$, the spear-equipped air manifolds 14A, 14B are yet not deployed for a second drying cycle, as the second bales $B_2$ now residing in the second dryer 10B were already dried in the first dryer 10A during the first drying cycle. So instead, with reference to FIG. 28P, the bale movers 132 are retracted back to the starting position, and a new sixth bale $B_6$ (i.e. final bale of the second group of the three bales) is loaded into each lane of the feeding table 110 at the distalmost spot thereof. The lifting platforms 138 are again raised to lift the fifth and sixth bales $B_5$, $B_6$ of each lane up off the track rails 116, and the bale movers are advanced again to push the fourth bale $B_4$ of each lane into the first dryer 10A, thereby pushing the third bale $B_3$ of each lane out the rear end 12B of the second dryer 10B, while also shifting the fifth and sixth bales $B_5$, $B_6$ forward one spot in the advancing direction, as shown in FIG. 28Q. Now the second dryer 10B is occupied by the undried third bales $B_3$ and the first dryer 10A is occupied by the undried fourth bales $B_4$. Accordingly, the air manifolds 14A, 14B are deployed again by extension of the linkage actuators 66 in order to penetrate the aeration spears 40 into the third and fourth bales $B_3$, $B_4$, as shown in FIG. 28R. The one or more fans are now activated again for the selected or predetermined drying cycle duration. Completion of this second drying cycle denotes completion of a full drying process on the first group of bales $B_1$, $B_2$, $B_3$, and in the illustrated dual-dryer setup where two bales of each lane are dried simultaneously, also serves to dry the leading bales $B_4$ of the second group, the remaining bales $B_5$, $B_6$, of which will be dried in the next drying cycle. As shown in FIG. 28S, during execution of the second drying cycle, the bale movers 132 are once again retracted to the starting position so that the forgoing drying process collectively illustrated by FIGS. 28A through 28S can be repeated to finish the drying of the second group of bales In the instance of a single-dryer setup lacking the second dryer 10B behind the first dryer 10A that's directly loaded from the feeding table 110, the forgoing process follows the same general sequence of repeatedly lifting, advancing and retracting the bale movers 132, but differs only in terms of the quantity and frequency of drying cycles. In the single-dryer instance, the air manifolds 14A, 14B of the table-fed dryer 10A are first deployed upon completion of the bale movers' first advancement pushing the first bales $B_1$ into the dryer, i.e. at the step shown in FIG. 28D. In such case, the first drying cycle operates on the first bales $B_1$ during the first retraction of the bale movers 132 back to the starting position in accordance with FIGS. 28E and 28F. With the bale movers fully reset at the starting position in FIG. 28G, completion of the first drying cycle and retraction of the air manifolds 14A, 14B is awaited, before initiating the next bale lifting and advancement steps of FIGS. 28H and 28I, during which the already dried first bale $B_1$ is pushed out the rear end of the sole dryer 10A instead of into a second dryer.

The steps shown in FIGS. 28J through 28O are then performed in the same manner as described above, except that the drying cycle executed therein is the second such drying cycle in a single-dryer setup and dries only the second bales $B_2$. and the pushing of third bales $B_3$ into the table-fed dryer 10A in accordance with FIG. 28O pushes the second bale $B_2$ out the rear of the sole dryer 10A instead of into a second dryer. A third deployment of the air manifolds and execution of a third dryer cycle is performed upon completion of the bale movers' third advancement pushing the third bales $B_3$ into the dryer, i.e. at the step shown in FIG. 28O, whereby this third drying cycle operates on the third bales $B_3$ during the third retraction of the bale movers 132 back to the starting position in FIG. 28P. In the single-dryer instance, steps 28Q through 28S would denote initial steps of a subsequent drying operation on a second group of three bales.

While the feeding table 110 in the illustrated embodiment is designed to queue three bales in each lane and carry two bales atop the lifting platform 138, a shorter feeding table may be used to queue only two bales in each lane and accordingly carry only one bale on a shorter lifting platform. Alternatively, a longer feeding table may be designed to queue four bales in each lane, and carry three bales atop a longer lifting platform. The table may be made even longer to even further increase the bale queuing capacity, with the bale capacity of the lifting platform of each lane being one less that the overall lane capacity. So if the lane capacity is $C_L$ and the platform capacity is $C_P$, then the platform capacity is calculated as $C_P=C_L-1$ for feed tables of the forgoing type where the first leading bale $B_1$ in each lane is pushed in the advancing direction by the bale pusher 136 of the respective bale mover, and any subsequent trailing bales $B_2 \ldots B_N$ (where $N=C_P$) in that lane are indexed forward by one spot by the raised lifting platform of the respective bale mover. While the illustrated embodiment features three queuing lanes for feeding a dryer with three bale spaces, a single lane or dual lane feed table may be used with a single or dual space bale dryer, or the number of table lanes and corresponding dryer bale spaces may be increased from the illustrated three-lane, three-space embodiment. It will also be appreciated that a feeding table of the present invention may be used in combination with a bale dryer other than the novel bale dryer disclosed herein.

FIGS. 29 through 36 illustrate a second embodiment dryer 10', which is nearly identical in construction to the first embodiment dryer 10 of FIGS. 1 through 8, but having been turned onto one of its sides and then propped up at a slightly tilted angle of inclination in the lateral direction by an angled base stand 212 installed beneath the reoriented support frame. As a result, instead of the manifolds 14A, 14B being arranged in top and bottom sets situated respectively above and below the three horizontally adjacent bales spaces of the dryer, the manifolds 14A, 14B are disposed in left and right sets situated on different respective sides of three vertically adjacent bale spaces of the dryer. The former buffers rails 44, 44' now serve as the holder rails at the bottom of the upper two bale spaces and as the constrainer rails at the top of the lower two bale spaces. The singular guide rail 45 at each of the two lateral sides of the earlier embodiment is now replaced with a pair of longitudinal rails, of which the pair 45 now residing at the bottom of the support frame define the two holder rails of the lowermost bale space, and the pair residing at the top of the support frame define the two constrainer rails at the top of the uppermost bale space. Other than this doubling of these rails 45, and the optional addition of the angled base frame 212 for reasons explained below, the construction of the dryer 10' is the same, just reoriented in space. The former holder rails 34 and constrainer rails 34' now serve as guide rails at opposing sides of each bale space to maintain alignment of the bale received therein, and are supported by the same standoffs 36 as before, the latter of which now jut laterally inwardly from the sides of the support frame rather than hanging downward and standing upward from the top and bottom of the support frame.

The linkage assemblies 16, 18 and associated actuators 66 are the same as before, but now referred to as left and right linkage assemblies 16, 18 rather than upper and lower linkages assemblies, and now pivot about upright axes rather than horizontal lateral axes in order to move the manifolds 14A, 14B laterally side-to-side into and out of the deployed positions to drive the aerations spears into and out of the bale spaces laterally rather than vertically. The second embodiment is thus substantially the same in construction and operation, but the bale spaces reside one over the other in vertically spaced relation to one another rather than side-by-side in horizontally spaced relation to one another, and the manifolds and attached aeration spears move laterally side to side rather than vertically and up and down so as to penetrate the bales from opposing sides thereof rather than from above and below the bales.

FIG. 37 through 42 illustrated the second embodiment bale dryer 10' being used in combination with an upright bale feeding rack 210 that replaces the horizontal bale feeding table 110 of the earlier embodiment. Like the earlier feeding table 110, the feeding rack 210 features a framework structure 212 defining a number of elongated lanes of equal quantity to the number of bale spaces in the bale dryer 10', hence their being three lanes 214A, 214B, 214C in the illustrated example in order to respectively feed bales into the three bale spaces of the bale dryer 10'. However, the three lanes 214A, 214B, 214C of the feeding rack 210 are organized in an upright stack situated in vertically spaced relation one over another, as opposed to the side-by-side horizontal layout of the feeding table 110. Once again, a bottom plane of each lane is defined by a respective track composed of a pair of parallel elongated track rails 216 running in a longitudinal travel direction matching that of the dryer 10'. The track rails 216 span a full length of the framework structure 212 in said longitudinal direction between a proximal end 212A thereof that resides adjacent the front end 12A of the bale dryer 10' when the feeding rack 210 is installed in working relation thereto, and an opposing distal end 212B that therefore resides distally opposite the bale dryer 10' in the installed state of the feeding rack 210. The elevation of, and the spacing between, the track rails 216 of each lane of the feeding rack 210 matches those of the holder rails 45, 44, 44' of a corresponding one of the bale dryer's three bale spaces, and serve the same purpose of allowing seated support of the bales on the rails 216, as well as sliding displacement of the bales therealong.

The framework structure 212 once again features three ground leg assemblies seated on the ground to support the track rails 216 in spaced elevation thereover at longitudinally spaced positions along said track rails 216, namely a proximal leg assembly 218A residing at the proximal end 218A of the framework structure 212, a distal leg assembly residing 218B at the distal end 212B of the framework structure 212, and a middle leg assembly 218C residing approximately midway between the proximal and distal leg assemblies. Each leg assembly features a horizontal ground member 220 seated atop the ground and spanning in the lateral direction perpendicular to the longitudinal travel direction. At or near a midpoint of the ground member 220, each leg assembly features an upright stanchion 222 standing upward from the ground member 220. These upright stanchions 222 are parallel to the corner posts of the support frame of the bale dryer 10', and therefore in the illustrated example of the slightly tilted dryer orientation, instead of lying truly vertical, lie at a small oblique angle to vertical.

Over the full length of the feeding rack 210, from one leg assembly to the next, spans a pair of upper and lower beams 224A, 224B that horizontally and longitudinally interconnect all three leg assemblies and are affixed to the respective stanchions 222 thereof. The upper beam 224A is mounted at the top ends the stanchions 222, and the lower beam 224B is mounted near the bottom end of the stanchions 222, though at a spaced elevation above the ground members 220 in order to leave some ground clearance below the lower beam 224B. In the illustrated example, the upper beam 224A is a singular beam of continuous length that lies atop the stanchion 222 of the middle leg assembly 218C, while the lower beam 224B is a split beam having two discrete halves each spanning between the middle leg 218C assembly and a respective one of the proximal and distal leg assemblies 218A, 218B. The two halves of the lower beam 224B are thus interrupted by the stanchion 222 of the middle leg assembly 218C, while the upper beam instead caps off the top end of that stanchion 222. The upper and lower beams 224A, 224B and the upright stanchions 222 collectively define an open-framed skeletal wall running longitudinally of the framework structure in a slightly tilted plane matching the slight angular tilt of the bale dryer 10'. It is this skeletal wall, supported in such orientation by the ground-seated positions of the ground members 220, that supports the other working components of the feeding rack 210, as outlined in more detail below.

The two track rails 216 of each lane are supported in cantilevered fashion from the skeletal wall by a set of three cantilever arms 226 whose mounted ends are respectively affixed to the upright stanchions 222 of the three leg assemblies at right angles thereto. The cantilever arms 226 are thus oriented perpendicularly to the slightly oblique plane of the skeletal wall, whereby the cantilever arms 226 have a slight upward incline in an outward direction from that plane. The two track rails 216 of each lane are mounted in coplanar and parallel relation to another atop the respective set of cantilever arms 226, and are thus situated at slightly different elevations. The outer track rail that is situated furthest from the skeletal wall is thus situated at slightly higher elevation than the inner track rail that is situated nearer to the skeletal wall. As a result, when a hay bale is placed on the two track rails 216 of any lane 214A, 214B, 214C of the feeding rack 210, the bale is gravitationally biased toward the skeletal wall.

In the proximal section of the feeding rack 210 residing between the proximal and middle leg assemblies 218A, 218C, a set of three horizontally and longitudinally extending resting rails 228 each run along a respective one of the three lanes 21A, 214B, 214C at the lateral side thereof nearest the skeletal wall. Each such resting rail 228 is supported near its longitudinally opposing ends by a respective pair of cantilever stubs 230 of matching directionality to, but shorter length than, the cantilever arms 226 that support the two track rails 216 of the respective lane. The resting rails 228 of the lower two lanes have their respective cantilever stubs 230 affixed to the stanchions 222 of the proximal and middle leg assemblies 218A, 218C. The uppermost lane has its respective resting rail 228 supported by a pair of right angle brackets 231 that stand upright from the upper beam 224A of the skeletal wall in coplanar relation therewith, and then turn perpendicularly outward therefrom to carry the respective resting rail 228 above and outward from the skeletal wall. These resting rails 228 reside in a shared common plane that lies parallel to the obliquely angled plane of the skeletal wall, and denotes a lateral side of each lane nearest to said skeletal wall, which is referred to as an "inner side" of the lane. At an opposing outer side of the lanes, each lane is left open to allow placement of bales into the lanes from this open outer side. The gravitational bias of the hay bales toward the skeletal wall will thus bias them into resting contact with the resting rails 228, against which the hay bales can rest when seated on, or sliding along, the track rails 216 at the proximal section of the rack 210. The slightly oblique tilt of the feeding rack 210, and corresponding tilt of the dryer 10' so that the lanes of the tilted feeding rack properly align with the bale spaces of the tilted dryer, thus prevents hay bales from potentially falling from the open outer side of the rack.

The feeding rack 210 features three bale movers 232, one for each lane. Each bale mover 232 is configured to displace a respective group of three bales forwardly along the feeding rack into the dryer one at a time, much like the feeding table 110 of the earlier embodiment. However, whereas the bale movers of the feeding table employed a two-bale bale lifter to displace the two trailing bales through a lift and carry action, and a separate singular bale pusher to simply slide the leading bale into the dryer without lifting, each bale mover 232 of the feeding rack 210 uses a set of three bale pushers 236A, 236B, 236C to respective displace the three bales purely through sliding motion on the track rails 216 without any lifting action, and accordingly lacks any separate bale lifter. The bale pushers 236A, 236B, 236C are of similar structure and operative function to those of the earlier table embodiment, but reoriented and repositioned relative to the track rails 216 to accommodate the different between the upright rack context of the present embodiment and the horizontal table context of the earlier embodiment.

Each bale mover 232 features a pair of longitudinally and horizontally oriented resting bars 238A, 238B lying parallel to and coplanar with the resting rails 228 of the framework structure 212. The length of these resting bars 238A, 238B is equal or similar to that of the lifting platform 138 of the earlier embodiment, thus exceeding the length of two rectangular hay bales. For brevity, each pair of resting bars 238A, 238B is referred to as a "bale rester" 238 of the respective bale mover, as two out of three bales being moved by the bale mover at any time will rest against these bars 238A, 238B during such movement, much like the two trailing bales in the feeding table embodiment rested on the raised lifting platform 138 during such movement. The three bale resters 238 are rigidly interconnected so as to cause synchronous movement of the all three bale movers 132 back and forth along the framework structure in the longitudinal travel direction.

Such rigid interconnection in the illustrate embodiment is accomplished by a proximal subframe 240A attached to the bale resters 238 at or near the proximal ends thereof nearest the bale dryer 10', and a distal subframe 240B attached to the bale resters 238 at or near the distal ends thereof furthest from the bale dryer 10'. Each subframe 240A, 240B features two ladder-like units spaced a short horizontal distance apart in the longitudinal travel direction, each having an upright stile 242 residing on the side of the skeletal wall opposite the track rails 216, and a set of six support rungs 244 jutting laterally from the stile 242 through open spaces of the skeletal wall to respectively connect to the six resting rails 238A, 238B of the three bale movers 232. Regardless of the position of the bale movers at any point in time, the proximal subframe 240A resides in a proximal section of the framework structure 212 between the proximal leg assembly 218A and the middle leg assembly 218C, and the distal subframe 240B resides in a distal section of the framework structure 212 between the distal leg assembly 218B and the middle leg assembly 218C.

The bale movers 232 are movably supported on the framework structure 212 for rolling longitudinal displacement therealong by a proximal wheel set 246A rotatably carried on the proximal subframe 240A, and a matching distal wheel set 246B rotatably carried on the distal subframe 240B. Each wheel set operates in rolling contact with the upper beam 224A of the skeletal wall, and features an upright top wheel 248 and a pair of side wheels 250A, 250B. The top wheel 248 is rotatably supported about a laterally oriented rotation axis lying perpendicular to the plane of the skeletal wall and positioned for rolling contact with the topside of the skeletal wall's upper beam 224A. The side wheels 250A, 250B are supported about respective upright rotational axes of parallel relation to the skeletal wall on opposite sides thereof for rolling contact with opposing sides of the skeletal wall's upper beam 224A. The top wheels 248 thus carry the subframes 240A, 240B and attached bale movers 232 on the skeletal wall in hanging fashion from the top beam thereof in rolling relation therealong, while the side wheels stabilize the subframes and attached bale movers in the lateral direction. In the interest of clarity, so as not to overcrowd the drawings and obscure other details, the wheels axles and mounting details thereof are omitted, but options for rotatable mounting of the wheels of each set to the respective subframe will be apparent to those of skill in the art.

Longitudinal displacement of the bale movers 232 back and forth along the rack is controlled by extension and collapse of a hydraulic cylinder 252 coupled between the stanchion 222 of the distal leg assembly 218B and the proximal subframe 240A that carries the proximal ends of the bale movers 232 on the skeletal wall of the framework structure 212. This hydraulic cylinder may once again be referred to as the "displacement cylinder" due to its functional purpose, despite the lack of need to different over any "lifting cylinders", none of which are employed in the rack embodiment.

Each bale pusher 236A, 236B, 236C once again features a spring loaded pusher arm 260 and a pusher bar 264 fixed to the working end thereof in cross-wise relation thereto to impart a T-shaped configuration to the bale pusher. Each bale mover 232 features three bale pushers 236A, 236B, 236C, each rotatably journaled on a small stub shaft supported perpendicularly between the two resting rails 238A, 238B of the bale mover. The three bale pushers of each bale mover include a proximal bale pusher 236A supported near the proximal end of the bale rester, a distal bale pusher 236B supported near the distal end of the bale rester, and a middle bale pusher 236C supported intermediately between the other two bale pushers at or near a midpoint of the bale rester.

The space between each pair of bale pushers in each lane accommodates the length of a singular hay bale therein. Each bale pusher is spring biased into a default working position angling obliquely through the shared plane of the resting rails 228 and resting bars 238A, 238B, and reaching longitudinally toward the dryer. The working position of each bale pusher 236A, 236B, 236C thus reaches laterally into the corresponding lane of the feeding rack from the inner side thereof. In this default working position, the pusher arm is operable during advancement of the bale movers 232 to push on the distal/trailing end of any bale that leads the pusher arm 260 in the advancing direction, thereby pushing such bale initially toward the proximal end 212A of the feeding rack, and eventually off the feeding rack 210 and into the bale dryer 10'.

Using the displacement cylinder 252, the sequence of advancement and retraction of the bale movers 232 to feed bales into the dryer 10' with the feeding rack 210 are substantially the same as those described earlier for the feeding table 110, just without the lifting and lowering steps associated with the bale lifters of the table embodiment that are omitted in the rack embodiment. FIGS. 37 to 42 show the ready state of the feeder/dryer setup, where a current group of three bales are queued in each lane of the feeding rack 210 and the manifolds of all bale spaces in the dryer are in their retracted positions ready to accommodate entry of bales into the bale spaces. As before, this state of the dryer with the manifolds and attached spears retracted may also be referred to as an "open" state of the dryer. The three locations along each lane at which the three bales reside at this ready state are again referred to as sequential queuing "spots", since bales will be indexed forwardly in the advancing direction one spot at time in sequential fashion toward and into the dryer 10'.

In the ready state, the three bale movers 232 reside in a starting position with the distal subframe 240B residing closely adjacent the distal end 212B of the framework structure 212, and with the proximal subframe 240A residing closely adjacent the middle leg assembly 118C at the approximate longitudinal midpoint of the framework structure 212. Extension of the displacement cylinder 252 is operable to move the subframes 240A, 240B and attached bale movers 232 in the advancing direction toward the proximal end 212A of the framework structure 212. In a fully advanced position of the subframes 240A, 240B and attached bale movers 232, shown in subsequent figures and achieved by full extension of the displacement cylinder 252, the proximal subframe 240A instead resides closely adjacent the proximal end 212A of the framework structure 212, and the distal subframe 240B resides closely adjacent the middle leg assembly 118C.

At the first operational step shown in FIG. 43A, the three bale movers 232 are displaced in the advancing direction by extension of the displacement cylinder 252, during which the proximal bale pushers 136 push the first bale $B_1$ of each lane toward and subsequently past the proximal end 212A of the feeding rack 210, and thus into the respective bale space of the dryer 10' through the front end 12A thereof. During their approach to the proximal end 212A of the feeding rack 210, these first bales $B_1$ slide along both the track rails 216, and the resting rails 228 of the rack's proximal section, against which the first bales are gravitationally biased. Simultaneously, the second and third bales $B_2$, $B_3$ of each lane are likewise advanced toward the dryer by this displacement of the bale movers 232, being respectively pushed in sliding fashion along the track rails 216 by the distal and middle sets of bale pushers 236B, 236C, but remaining in static relation to the moving resting bars 238A, 238B of the bale movers, against which the second and third bales $B_2$, $B_3$ are likewise rested through gravitational bias.

Having fed the first bales $B_1$ into the dryer 10', the bale movers 232 then need to be reset back to the starting position. Turning to FIG. 43B, the displacement cylinder 252 is collapsed, thus pulling the bale movers 232 back toward the starting position, thereby returning the distal subframe 240B and adjacent distal ends of the bale movers back to the distal end 212B of the feeding rack 210. During this retraction, the proximal and middle bale pushers 236A, 236C are pulled back against the leading ends of the second and third bales $B_2$, $B_3$, respectively, which causes pivoting of these proximal and middle bale pushers 236A, 236C in counteracting relation to their spring bias, until these proximal and middle bale pushers 136 each clear the inside perimeter edge (i.e. the upright perimeter edge nearest the skeletal wall of the rack) of the leading end of the respective second or third bale $B_2$, $B_3$. As a result, each proximal or middle bale pusher 236A, 236C can subsequently ride along the inner side of the respective second or third bale $B_2$, $B_3$ during continued retraction of the bale movers 232, as shown in the top plan view of FIG. 43B.

Meanwhile, since all bale spaces in the dryer 10' are occupied by the first bales $B_1$, the spear-equipped air manifolds 14A, 14B are moved to their deployed positions by extension of the linkage assembly actuators 66, thereby driving the aeration spears 40 into penetrating relation to the received first bales $B_1$, as shown in FIG. 43C. At this point, the one or more fans feeding the forced air to the manifolds 14A, 14B of the dryer 10' are activated, and left running for an appropriate drying cycle of selected or predetermined duration.

Figure 43G:
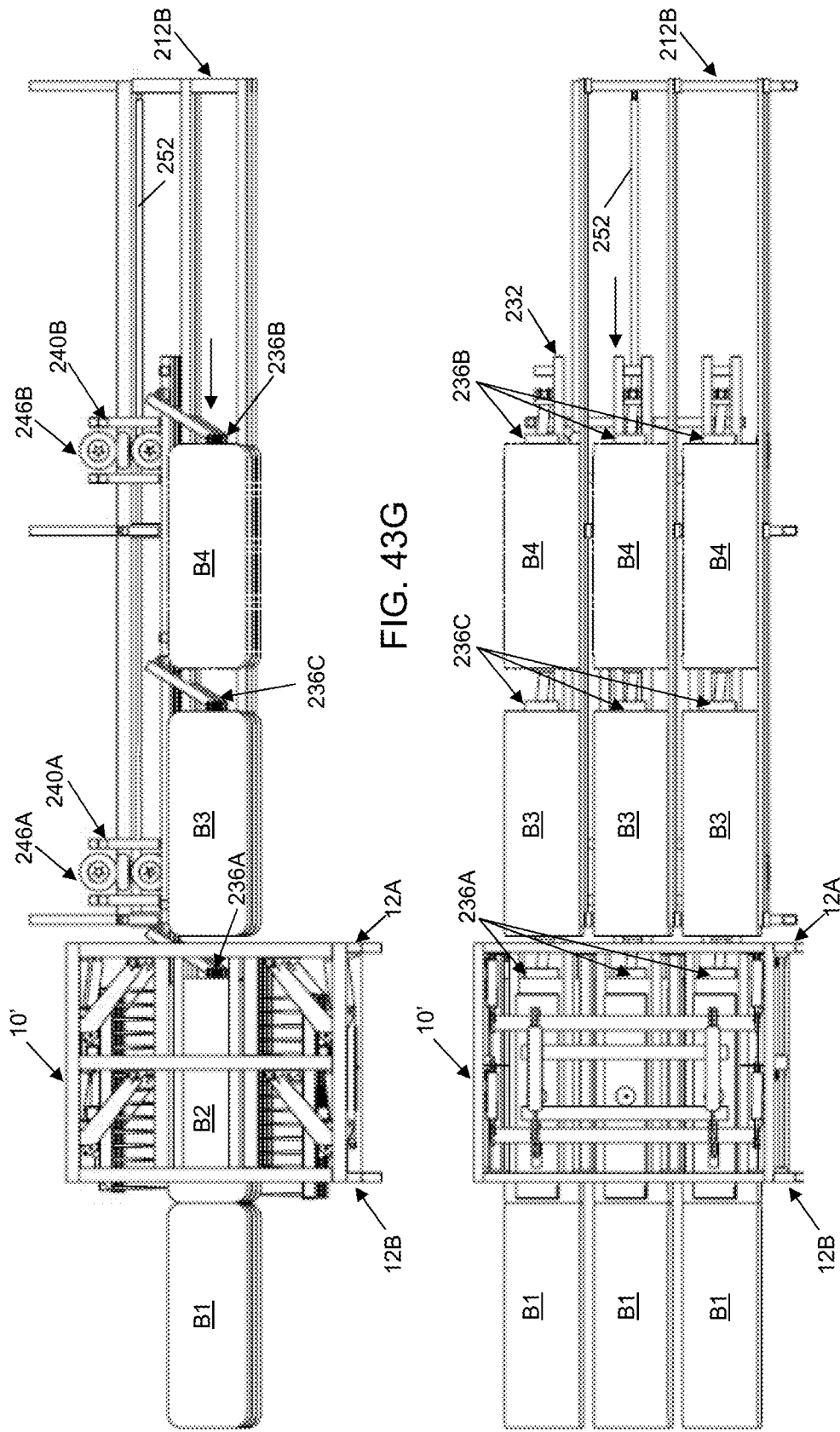

As shown in FIG. 43D, as retraction of the bale movers toward the starting position continues during the first drying cycle, the proximal and middle bale pushers 136 pop back out into their respective lanes as they clear the trailing ends of the second and third bales $B_2$, $B_3$. Turning to FIG. 43E, once the bale movers have been fully returned to the starting position, a new fourth bale $B_4$ (i.e. the first bale of a next group of three bales, which in the drawings distinguished from the first group of bales by way of broken line illustration) is loaded into each lane at the distalmost spot thereof that was opened up during the first advancement of the bale movers 232 in FIG. 43A. Turning to FIG. 43F, once first drying cycle is completed, the manifolds 14A, 14B and attached spears 40 are returned to their retracted positions, thus reopening the dryer 10'. Turning to FIG. 43G, the bale movers 232 are then advanced again by extension of the displacement cylinder 252, which causes the proximal bale pushers 236A to push the second bales $B_2$ into the dryer 10', which in turn pushes the first bales $B_1$ out of the rear end 12B of the dryer 10'. The steps of FIGS. 43B to 43G are then repeated as many times necessary to dry the quantity of bales concerned.

While the forgoing example of the feeding rack operation is in a single-dryer context, it will be appreciated it may be used in a dual-dryer context like the earlier illustrated feeding table example, in which case the dryer is only closed for a drying cycle with every second advancement of the bale movers. In other words, the frequency of the dryer closer and activation (measured in quantity of bale mover advancements) is equal to the number of dryers installed in series: in a single-dryer setup, the dryer is closed and activated with every individual advancement of the bale movers; in a dual-dryer setup, the dryer is closed and activated only every second advancement of the bale movers; in a triple-dryer setup, the dryer is closed and activated only every third advancement of the bale movers; etc.

Like with the feeding table 110, while the illustrated feeding rack 210 is designed to queue three bales in each lane and accommodate two bales in abutted relation against the bale rester 238, a shorter bale rester may be used to queue only two bales in each lane and accordingly accommodate only one bale against the bale rester. Alternatively, a longer feeding rack 210 may be designed to queue four bales in each lane, and receive three bales against the bale rester 238. The feeding rack 210 may be made even longer to even further increase the bale queuing capacity, with the bale capacity of the bale rester 238 of each lane being one less that the overall lane capacity. So if the lane capacity is $C_L$ and the rester capacity is $C_R$, then the rester capacity is calculated as $C_R = C_L - 1$ for feeding racks 210 of the forgoing type where the first leading bale $B_1$ in each lane is pushed in the advancing direction by the proximal bale pusher 236A of the respective bale mover, and any subsequent trailing bales $B_2 \ldots B_N$ (where $N = C_R$) in that lane are indexed forward by one spot by the remaining bale pushers 236B, 236C of trailing relation to the proximal bale pusher. Like with the feeding table 110, while the illustrated feeding rack 210 features three queuing lanes for feeding a dryer with three bale spaces, a single lane or dual lane feed rack may be used with a single or dual space bale dryer, or the number of rack lanes and corresponding dryer bale spaces may be increased from the illustrated three-lane, three-space embodiment. It will also be appreciated that a feeding rack 210 of the present invention may be used in combination with a bale dryer other than the novel bale dryer disclosed herein. Furthermore, while the preferred embodiment has the dryer and rack lanes at a slightly tilted orientation to gravitationally discourage the falling of bales from the open side of the rack, while still allowing initial loading of bales into at any and all open spots due to the open-sided design of the rack, for example using a fork-equipped front end loader, other embodiments may omit the tilted orientation, and employ a truly vertical configuration in which the bale spaces of the dryer, and the stacked queuing lanes of the rack, are in direct vertical alignment over one another.

Turning now to FIGS. 44A through 44I, an alternate reconfiguration of the dual dryer setup of earlier FIGS. 27 and 28 is shown for the purpose of handling round bales, instead of the rectangular bales of the earlier embodiments. In the round bale setup, a horizontal feeding table is once again situated in front of the first dryer 10A' to load the bales into the front end 12A thereof, but is a single-lane feeding table 310A that feeds a singular bale space of the first dryer, and is accompanied by a corresponding single-lane receiving table 310B situated behind the second dryer 10B' to receive bales existing the rear end 12B thereof. Though the manifolds and aerations spears and operating linkages thereof are omitted in the schematic illustration of the round bale embodiment, each single space bale dryer 10A', 10B', instead of having top and bottom air manifolds above the bale space like first embodiment dryer 10, has left and right air manifolds on opposite sides of the bale space like the second embodiment dryer 10'. Instead of a rectangular manifold with a rectangular array of aeration spears, the manifolds are circular and carry a circular array of aeration spears thereon to generally match the circular sides of the round bales in size and shape. Since round bales seated on straight rails would tend to roll, rather than slide, when pushed, the flat-topped holder rails 34 of the dryers and flat-topped track rails 116 of the rectangular bale feeding table are omitted in the round bale embodiment.

Instead of flat-topped track rails 116, each table 310A, 310B has a respective pair of stationary bale holders 316A, 316B supported on its framework structure (not shown), of which the bale holder closest to the dryers is referred to as the proximal bale holder 316A, and the bale holder furthest from the dryers is referred to as the distal bale holder 316B. Each bale holder 316A, 316B has a pair of concave seats 318A in the topside thereof, each having a suitable radius of curvature to cradle the convex underside of a respective round bale, thereby preventing rolling motion of the bale once seated on the bale holder. To move the round bales among the bale holders 316A, 316B and into and out of the bale spaces of the dryers 10A', 10B', there is a bale mover 332 having a multi-section lifting platform 338, but lacking any bale pusher of the type described in the earlier table and rack embodiments.

Like the lifting 138 platform of the rectangular bale feeding table 110 of the earlier embodiment, the lifting platform 338 is linearly displaceable in the longitudinal direction, whether by way one or more a hydraulic cylinders (displacement cylinder(s)) or other options mentioned below, and is also raiseable and lowerable between a raised working position situated inside the lanes and bale spaces of the tables 310A, 310B and dryers 10A', 10B' to engage with the bales situated thereon and therein, and a lowered reset position withdrawn from the lanes and bale spaces and disengaged from the bales to enable return of the lifting platform 338 back an initial starting position. In this embodiment, the raised working position of the lifting platform 338 is one of elevated relation to the stationary bale holders 316A, 316B of the tables 310A, 310B, as these bale holders 316A, 316B denote the bottom plane of the lane that was previously denoted by the track rails 116 in the earlier table embodiment for rectangular bales. The lowered reset position of the bale platform 338 accordingly resides below the stationary bale holders 316A, 316B. Each bale holder 316A, 316B may be composed of a pair of parallel bars spaced laterally apart in a shared horizontal plane (like the track rails 116 of the earlier table embodiment). Each bar has two concave cutouts in the topside thereof that align with matching cutouts in the topside of the other bar to form the two concave seats 318A of the bale holder 316A, 316B. The bale lifting platform 338 can thus be raised and lowered between its two positions via the open space left between the two bars of each bale holder 316A, 316B, in the same way the spaced apart track rails 116 in the earlier table embodiment accommodated raising and lowering of the lifting platform 138 into and out of the lane via the space between the track rails 116.

The lifting platform 338 is composed of four distinct sections 338A, 338B, 338C, 338D in the longitudinal direction, each section having a respective pair of cradle-shaped seats 318B therein of the same concave character as the concave seats 318A of the bale holders, thereby being suitable to cradle the convex undersides of the round bales, unlike the flat-topped planar platform 138 of the earlier table embodiment that instead conformed to the planar undersides of the flat-bottomed rectangular bales. The overall quantity of platform seats 318B is equal to the overall quantity of bale holder seats 318A. The longitudinal space between the two paired seats of each bale holder or platform section is identical, and the longitudinal space from one pair of seats to the next pair of seats from bale holder to bale holder of either table, and from section to section of the lifting platform, is likewise uniform.

While the illustrated schematic shows the bale holders 316A, 316B of each table 310A, 310B being distinctly separate of one another, it will be appreciated that they are nonetheless interconnected by a shared framework structure (not shown), and optionally may also be directly connected to another, for example as integral parts of a pair of elongated bars that span a substantial entirety of the table length. Likewise, while the lifting platform 338 is shown in three distinctly separate parts, of which only the two middle sections 338B, 338C are directly interconnected as integral parts of an elongated platform structure, the level of direct interconnection between the different sections may be varied, provided that the different platform sections are sufficiently linked by physical structure or operational control function to move synchronously with one another during the operational sequence described below. In the illustrated example, multiple sets of support wheels 340 rollably support a travelling subframe (not shown) of the bale mover at longitudinally spaced positions therealong, with each bale section being movably mounted on this travelling subframe between two neighbouring sets of the ground wheels, and being raiseable and lowerable relative to the subframe by one or more lifting actuators, for example via lifting linkages similar to those described in the earlier table embodiment.

In the ready state of the round bale feeder/dryer setup, a set of four bales are seated in the four seats 318A of the two bale holders 316A, 316B of the feeding table 310A, for example having been placed in such positions from beside the table using a fork-equipped front end loader. The four bales $B_1$, $B_2$, $B_3$, $B_4$ are therefore queued in the singular lane of the feeding table 310A. Meanwhile, the dryers are in their open state, with the air manifolds of the bale spaces in their retracted positions ready to accommodate entry of bales into the bale spaces. The four seats 318A of the feeding table's bale holders 316A, 316B therefore denote the queuing spots of the feeding table in this embodiment. However, in the present embodiment, instead of the bales being indexed forwardly in the advancing direction one spot at time in sequential fashion toward and into the dryers, each bale is advanced by two spots for each advancement of the bale mover 332, as will be appreciated from the following description.

In the starting position of the bale mover 332, a distal loading section 338A of the lifting platform 338 resides at the distal bale holder 316B of the feeding table 310A, a proximal loading section 338B of the lifting platform 338 resides at the proximal bale holder 316A of the feeding table 310A, a proximal unloading section 338C of the lifting platform 338 resides inside the dryers 10A', 10B' below the bale spaces thereof, and a final distal unloading section 338D of the lifting platform 338 resides at the proximal bale holder 316A of the receiving table 310B. The distal bale holder 316B of the receiving table is unoccupied by any section of the lifting platform 338 in the starting position thereof. The starting position is thus that in which the lifting platform is at its closest to the distal end of the feeding table 310A, and at its furthest from the distal end of the receiving table. The distal end of each table 310A, 310B refers to the end thereof furthest from the dryers 10A', 10B'.

The first step of the dryer loading process is shown in FIG. 44A, where all four sections of the lifting platform 338 of the bale mover 332 are lifted into their raised working position, for example by extension of one or more lifting cylinders, whereby the proximal and distal loading sections 338A, 338B of the lifting platform engage the undersides of all four queued bales $B_1$, $B_2$, $B_3$, $B_4$ in the lane of the feeding table 310A, and lift all four queued bales $B_1$, $B_2$ $B_3$, $B_4$ up off the bale holders 316A, 316B of the feeding table 310A. Next, with reference to FIG. 44B, the bale mover 332 is displaced in the advancing direction by one or more actuators, for example by extension of one or more displacement cylinders or by advancing rotational drive of one or more wheel motors operating on one or more sets of the ground wheels 340. During such advancement, the proximal loading section 338B of the lifting platform 338 carries the first and second bales $B_1$, $B_2$ past the proximal end of the feeding table 310A and into the dryers 10A', 10B', specifically carrying the first bale $B_1$ fully through bale space of the first dryer 10A' into the bale space of the second dryer 10B', and carrying the second bale $B_2$ into the bale space of the first dryer 10A'. This represents the fully advanced position of the lifting platform 338, in which the distal unloading section 338D thereof now occupies the distal bale holder 316B of the receiving table 310B, while the proximal unloading section 338C occupies the proximal bale holder 316A of the receiving table 310B, the proximal loading section 338B now occupies the dryers 10A', 10B' and the distal loading section 338A now occupies the proximal bale holder 316A of the feeding table 310A. At this point, both dryers 10A', 10B' are then closed, thereby moving their air manifolds into their deployed positions spearing the first and second bales $B_1$, $B_2$ currently seated atop the proximal loading section 338B of the lifting platform 338, and the fan(s) is/are activated to initiate the first drying cycle on these two bales $B_1$, $B_2$.

Next, with reference to FIG. 44C, having been pierced with the aeration spears from both sides, the first and second bales $B_1$, $B_2$ are now suspended inside the bale spaces of the two dryers by this pierced engagement between the manifolds. According, the lifting platform can now be moved back into its lowered reset position below the plane of the bale holders 316A, 316B of the two tables 310A, 310B, which thereby deposits the third and fourth bales $B_3$, $B_4$ from the distal loading section 338A of the lifting platform 338 into the two seats 318A of the proximal bale holder 316A of the feeding table 310A. Next, with reference to FIG. 44D, the lifting platform 338 is retracted back to its starting position, for example by collapse of the aforementioned displacement cylinder(s) or retreating rotational drive of the aforementioned wheel motor(s). On full return of the lifting platform 338 to the starting position, completion of the first drying cycle is awaited. Once the first drying cycle is completed, but before the air manifolds are retracted to reopen the dryers, the lifting platform 338 is raised back up to its working position, as shown in FIG. 44E, to engage the undersides of the now dried first and second bales $B_1$, $B_2$ inside the first dryer. With the platform fully raised 338, thus seating these dried first and second bales $B_1$, $B_2$ onto the proximal unloading section 338C, the air manifolds of the dryers 10A', 10B' are retracted, thereby reopening the dryers and withdrawing the aeration spears from the dried first and second bales $B_1$, $B_2$.

Next, with reference to FIG. 44F, the raised lifting platform 338 is advanced again, thereby carrying the first and second bales $B_1$, $B_2$ on the proximal unloading section 338C rearwardly out from the dryers 10A', 10B', and onward to the proximal bale holder 316A of the receiving table 310B, while simultaneously carrying the third and fourth bales $B_3$, $B_4$ on the proximal loading section 338B into the bale spaces of the dryers 10A', 10B'. The dryer is once again closed, before lowering the lifting platform 338 back down, in order to pierce the third and fourth bales $B_3$, $B_4$ with the aeration spikes and thereby suspend these bales in the respective bale spaces of the dryers, whereupon the one or more fans are again activated to start the second drying cycle. At this point, the lifting platform 338 is lowered back down, as shown in FIG. 44G, thereby seating the first and second bales $B_1$, $B_2$ onto the proximal bale holder 316A of the receiving table 310B just outside the rear end of the second dryer.

Turning to FIG. 44H, next the lifting platform 338 is retracted back to its starting position, and while completion of the first drying cycle is awaited, a next set of bales are loaded onto the feeding table 310A, for example as shown in FIG. 44I by placement of fifth and sixth bales $B_5$, $B_6$ onto the proximal bale holder 316A of the feeding table 310A. These fifth and sixth bales $B_5$, $B_6$ denote the first two of the next group of four bales, the remaining two of which will also be loaded onto the feeding table 310A, but at the distal bale holder 316B thereof, while still awaiting completion of the second drying cycle, which will mark the completed drying process for the first group of four bales.

The forgoing steps shown in FIGS. 44A through 44I will then be repeated to carry out the drying process on the second group of four bales. The initial steps of this second drying process carried out in accordance with FIGS. 44A and 44B will simultaneously serve to advance the first and second bales $B_1$, $B_2$ of the first group from the proximal bale holder 316A of the receiving table 310B to the distal bale holder 316B thereof, provided that the first and second bales $B_1$, $B_2$ have not already unloaded from the proximal bale holder 316A of the receiving table 310B, for example by a fork equipped front end loader. Simultaneously, the first advancement in the drying process of the second group will also serve to advance the dried third and fourth bales $B_3$, $B_4$ of the first group from the dryers 10A', 10B' to the proximal bale holder 316A of the receiving table 310B.

While the forgoing description of the round bale embodiment makes reference to two dryers 10A', 10B', it will be appreciated that the two support frames thereof may be combined into a singular structure, thus denoting a single dryer having two bale spaces situated in series with one another in the longitudinal direction between the front and rear ends of the shared support frame. Also, while the forging example refers to single lane feeding and receiving tables 310A, 310B for feeding bales into and receiving discharged bales from dryers that are only one bale space wide (i.e. a "single width" dryer), multiple single-width dryers may be placed side by side and used with a multi-lane feeding and receiving table layout, whether using separate side-by-side tables or a larger multi-lane table among which the respective bale movers of the different lanes may optionally have integrated or interconnected subframes moveable in the longitudinal direction by one or more shared actuators (e.g. hydraulic cylinders or wheel motors). In a dual-lane setup, the two lanes could be loaded and unloaded from opposite sides thereof. Multi-lane configurations of more than two side-by-side lanes may be possible, but may require additional loading equipment for loading bales into central lanes that are not accessible from the side. Multiple tables and dryers may optionally be stacked atop one another to create a multi-level lane and bale space configuration, similar to that shown in the rack-based embodiment.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A bale feeding apparatus for feeding bales into a bale dryer, said apparatus comprising:
   a structure defining an elongated lane having a proximal end for residing adjacent the bale dryer and a distal end for residing opposite of the bale dryer, said lane having a sufficient length to support a plurality of bales thereon in queued fashion in a plurality of queuing spots residing between said proximal end distal ends;
   a bale mover in co-operably installed relation to said structure and configured to advance the plurality of bales sequentially through the plurality of queuing spots toward the proximal end of the lane and into the bale dryer from said proximal end of the lane; and
   at least one actuator connected to the bale mover and operable to displace the bale mover longitudinally back and forth of the structure in an advancing direction toward the proximal end of the lane and a retreating direction back toward the distal end;
   wherein:
   the bale mover comprises one or more bale engagement units movable between a working position protruding into the lane to displace the plurality of bales during movement in the advancing direction, and a reset position withdrawn from the lane to bypass the plurality of bales during movement in the retreating direction; and
   the lane is delimited or neighboured by a pair of rails against which the plurality of bales rest, and at least one of the bale engagement units reaches into the lane from between said rails when in the working position.

2. The apparatus of claim 1 wherein the one or more bale engagement units comprise a bale lifter movable upwardly and downwardly between the working position and reset positions, respectively, to lift up one or more of the bales when raised into the working position and carry said one or more lifted bales toward the proximal end of the lane when moved in the advancing direction, and to lower the one or more lifted bales back down into a respective one or more of the queuing spots when lowered back into the reset position.

3. The apparatus of claim 2 wherein the bale lifter comprises a flat planar topside for lifting one or more flat-bottomed rectangular bales from a planar underside thereof.

4. The apparatus of claim 2 wherein the bale lifter comprises a non-planar topside comprising one or more concave seats therein for lifting one or more round bales from a convex underside thereof.

5. The apparatus of claim 1 wherein the one or more bale engagement units comprise at least one bale pusher positioned to reside between two of the queuing spots in the working position when the bale mover is in a starting position prior to movement thereof in the advancing direction.

6. The apparatus of claim 5 wherein the lane comprises at least three queuing spots said at least one bale pusher comprises a plurality of bale pushers, each residing between a respective adjacent pair of the queuing spots in the starting position of the bale mover.

7. The apparatus of claim 1 wherein the structure defines a plurality of lanes each equipped with a respective bale mover.

8. The apparatus of claim 7 wherein the respective bale movers of the lanes share a common actuator for moving the respective bale movers in the advancing and retreating directions.

9. The apparatus of claim 7 wherein the plurality of lanes reside side-by-side.

10. The apparatus of claim 7 wherein the plurality of lanes reside one over another.

11. The apparatus of claim 10 wherein each lane resides in an inclined plane sloping downwardly toward a side of the lane from which the bale reaches into said lane when in the working position.

12. A bale feeding apparatus for feeding bales into a bale dryer, said apparatus comprising:
 a structure defining an elongated lane having a proximal end for residing adjacent the bale dryer and a distal end for residing opposite of the bale dryer, said lane having a sufficient length to support a plurality of bales thereon in queued fashion in a plurality of queuing spots residing between said proximal end distal ends;
 a bale mover in co-operably installed relation to said structure and configured to advance the plurality of bales sequentially through the plurality of queuing spots toward the proximal end of the lane and into the bale dryer from said proximal end of the lane; and
 at least one actuator connected to the bale mover and operable to displace the bale mover longitudinally back and forth of the structure in an advancing direction toward the proximal end of the lane and a retreating direction back toward the distal end;
 wherein:
 the bale mover comprises one or more bale engagement units movable between a working position protruding into the lane to displace the plurality of bales during movement in the advancing direction, and a reset position withdrawn from the lane to bypass the plurality of bales during movement in the retreating direction;
 the one or more bale engagement units comprise at least one bale pusher positioned to reside between two of the queuing spots in the working position when the bale mover is in a starting position prior to movement thereof in the advancing direction; and
 each bale pusher is spring biased into the working position, and arranged to be forced out of the working position by contact with one of the bales during movement of the bale mover in the retreating direction.

13. The apparatus of claim 12 wherein the lane is delimited or neighboured by a pair of rails against which the plurality of bales rest, and at least one of the bale engagement units reaches into the lane from between said rails when in the working position.

14. A bale drying apparatus comprising:
 a support frame;
 a bale space delimited within said support frame and sized to receive at least one hay bale within said bale space;
 an air manifold movably coupled to the support frame and connected or connectable to an air source from which air is supplied to said manifold;
 a plurality of spears each attached to the air manifold, each comprising a hollow interior fluidly connected to an interior space of the air manifold therewith to receive the supplied air therefrom, and each comprising a plurality of apertures therein through which the supplied air can exit the hollow interior of the spear;
 wherein
 the air manifold is movable between a deployed position in which the plurality of spears penetrate into the bale space, and a retracted position in which the plurality of spears are retracted out of said bale space;
 the air manifold is movably carried on the support frame by at least one crank arm pivotably coupled to the support frame; and
 at least one actuator is connected between the support frame and said at least one crank arm and operable to pivot said at least one crank arm in both a deployment direction moving the air manifold toward the deployed position and a retraction direction moving the air manifold toward the retracted position.

15. The apparatus of claim 14 wherein the at least one crank arm comprises two crank arms, each of which defines a respective crank of a dual-crank linkage, a ground of which is defined by the support frame and a coupler of which is at least partially comprised of, or at least partially supports, the air manifold in order to effect movement thereof relative to the support frame during pivotal movement of said two crank arms.

16. The apparatus of claim 15 wherein said dual-crank linkage is a parallelogram linkage.

17. The apparatus of claim 15 wherein said dual-crank linkage comprises a redundant coupler of parallel relation to the coupler that is at least partially comprised of, or least partially supports, the air manifold.

18. The apparatus of claim 15 wherein said dual crank linkage is one of a set of linkages operating in parallel planes and whose cranks are interconnected by cross-members lying perpendicular to said parallel planes.

19. The apparatus of claim 18 wherein the air manifold is one of a plurality of air manifolds across which the cross-members span, and which are spaced apart from one another along said cross-members.

20. The apparatus of claim 18 comprising at least one redundant coupler of parallel relation to the coupler that is at least partially comprised of, or at least partially supports, the air manifold; wherein said redundant coupler is coupled between the cross-members.

* * * * *